US009411503B2

(12) United States Patent
Ikeda et al.

(10) Patent No.: US 9,411,503 B2
(45) Date of Patent: Aug. 9, 2016

(54) INFORMATION PROCESSING DEVICE, INFORMATION PROCESSING METHOD, AND INFORMATION PROCESSING PROGRAM

(75) Inventors: Takuo Ikeda, Tokyo (JP); Satoshi Akagawa, Tokyo (JP); Satoshi Asai, Saitama (JP); Takashi Kitao, Tokyo (JP); Dan Li, Tokyo (JP); Kazuto Mugura, Tokyo (JP); Makoto Nishimura, Tokyo (JP)

(73) Assignee: Sony Corporation, Tokyo (JP)

( * ) Notice: Subject to any disclaimer, the term of this patent is extended or adjusted under 35 U.S.C. 154(b) by 1028 days.

(21) Appl. No.: 12/487,995

(22) Filed: Jun. 19, 2009

(65) Prior Publication Data

US 2010/0013780 A1    Jan. 21, 2010

(30) Foreign Application Priority Data

Jul. 17, 2008 (JP) .................................. 2008-186228

(51) Int. Cl.
*G06F 3/041* (2006.01)
*G06F 3/0488* (2013.01)

(52) U.S. Cl.
CPC .................................. *G06F 3/04883* (2013.01)

(58) Field of Classification Search
CPC . G06F 3/0482; G06F 3/0488; G06F 3/04883; G06F 3/04886
USPC ................... 345/173–178; 178/18.01–18.11; 715/808, 843, 863
See application file for complete search history.

(56) References Cited

U.S. PATENT DOCUMENTS

| 5,305,435 | A | * | 4/1994 | Bronson | G06F 3/0481 715/775 |
| 5,333,255 | A | * | 7/1994 | Damouth | 715/776 |
| 5,559,944 | A | * | 9/1996 | Ono | 715/841 |
| 6,011,542 | A | * | 1/2000 | Durrani et al. | 345/156 |
| 6,240,207 | B1 | | 5/2001 | Shinozuka et al. | |
| 6,380,931 | B1 | * | 4/2002 | Gillespie | G06F 3/03547 178/18.01 |
| 6,628,310 | B1 | * | 9/2003 | Hiura et al. | 715/776 |
| 6,938,220 | B1 | | 8/2005 | Shigematsu et al. | |

(Continued)

FOREIGN PATENT DOCUMENTS

| JP | 5-282115 | 10/1993 |
| JP | 6-131109 | 5/1994 |

(Continued)

*Primary Examiner* — Amare Mengistu
*Assistant Examiner* — Crystal A Mathews
(74) *Attorney, Agent, or Firm* — Oblon, McClelland, Maier & Neustadt, L.L.P.

(57) ABSTRACT

An information processing device includes: a main unit to be held; a display unit provided on the main unit such that an information display screen is positioned on a front face thereof, to display information on the information display screen; a touch position detection unit to detect a touch position on the information display screen, and generate touch position detection data represented in terms of coordinates based on two axes intersecting at the detected touch position; and a control unit to display predetermined information on the information display screen, in the event of detecting that the touch position on the information display screen is being continually displaced from within a predetermined region on the information display screen in a predetermined first diagonal direction as to two directions following the two axes, based on the touch position detection data generated by the touch position detection unit.

20 Claims, 32 Drawing Sheets

(56) References Cited

U.S. PATENT DOCUMENTS

| | | | |
|---|---|---|---|
| 7,180,506 B2* | 2/2007 | Lin | G06F 3/023 345/173 |
| 7,256,767 B2* | 8/2007 | Wong et al. | 345/158 |
| 7,676,767 B2* | 3/2010 | Hofmeister et al. | 715/863 |
| 7,706,681 B2* | 4/2010 | Misawa | 396/374 |
| 8,171,432 B2* | 5/2012 | Matas et al. | 715/863 |
| 8,493,338 B2* | 7/2013 | Nakajoh | 345/173 |
| 2003/0210286 A1* | 11/2003 | Gerpheide et al. | 345/863 |
| 2004/0212605 A1* | 10/2004 | Fitzmaurice et al. | 345/184 |
| 2004/0212617 A1* | 10/2004 | Fitzmaurice et al. | 345/440 |
| 2005/0140661 A1* | 6/2005 | Collins | 345/173 |
| 2005/0179645 A1* | 8/2005 | Lin | G06F 3/023 345/156 |
| 2005/0278647 A1* | 12/2005 | Leavitt et al. | 715/765 |
| 2006/0010400 A1* | 1/2006 | Dehlin et al. | 715/856 |
| 2006/0197750 A1* | 9/2006 | Kerr et al. | 345/173 |
| 2006/0284852 A1* | 12/2006 | Hofmeister | G06F 3/0483 345/173 |
| 2007/0008300 A1* | 1/2007 | Yang et al. | 345/173 |
| 2007/0132873 A1 | 6/2007 | Hyodo | |
| 2007/0146337 A1* | 6/2007 | Ording et al. | 345/173 |
| 2007/0177804 A1* | 8/2007 | Elias et al. | 382/188 |
| 2007/0247442 A1* | 10/2007 | Andre et al. | 345/173 |
| 2007/0277123 A1* | 11/2007 | Shin et al. | 715/863 |
| 2008/0278455 A1* | 11/2008 | Atkins et al. | 345/173 |
| 2009/0019397 A1* | 1/2009 | Buffet | G06F 3/0482 715/837 |
| 2009/0094562 A1* | 4/2009 | Jeong | G06F 3/0486 715/863 |
| 2009/0109183 A1* | 4/2009 | Carvajal | G06F 3/0416 345/173 |
| 2009/0109187 A1* | 4/2009 | Noma | 345/173 |
| 2009/0128516 A1* | 5/2009 | Rimon | G06F 3/0412 345/174 |
| 2009/0144661 A1 | 6/2009 | Nakajima et al. | |
| 2009/0160792 A1* | 6/2009 | Morohoshi et al. | 345/173 |
| 2009/0167705 A1* | 7/2009 | Chen | 345/173 |
| 2009/0282370 A1* | 11/2009 | Rainwater | G06F 3/04886 715/863 |
| 2009/0295743 A1* | 12/2009 | Nakajoh | 345/173 |
| 2010/0083190 A1* | 4/2010 | Roberts et al. | 715/863 |
| 2010/0182264 A1* | 7/2010 | Hahn et al. | 345/173 |
| 2010/0214243 A1* | 8/2010 | Birnbaum et al. | 345/173 |
| 2011/0078109 A1* | 3/2011 | Griggs et al. | 707/609 |
| 2012/0075194 A1* | 3/2012 | Ferren | 345/168 |

FOREIGN PATENT DOCUMENTS

| | | |
|---|---|---|
| JP | 9-44143 | 2/1997 |
| JP | 2001-306375 | 11/2001 |
| JP | 2001-326843 | 11/2001 |
| JP | 3282637 | 3/2002 |
| JP | 2003-195998 | 7/2003 |
| JP | 2005-78152 | 3/2005 |
| JP | 2005-267080 | 9/2005 |
| JP | 2005-269243 | 9/2005 |
| JP | 2006-119854 | 5/2006 |
| JP | 2006-163579 | 6/2006 |
| JP | 2007-159014 | 6/2007 |

* cited by examiner

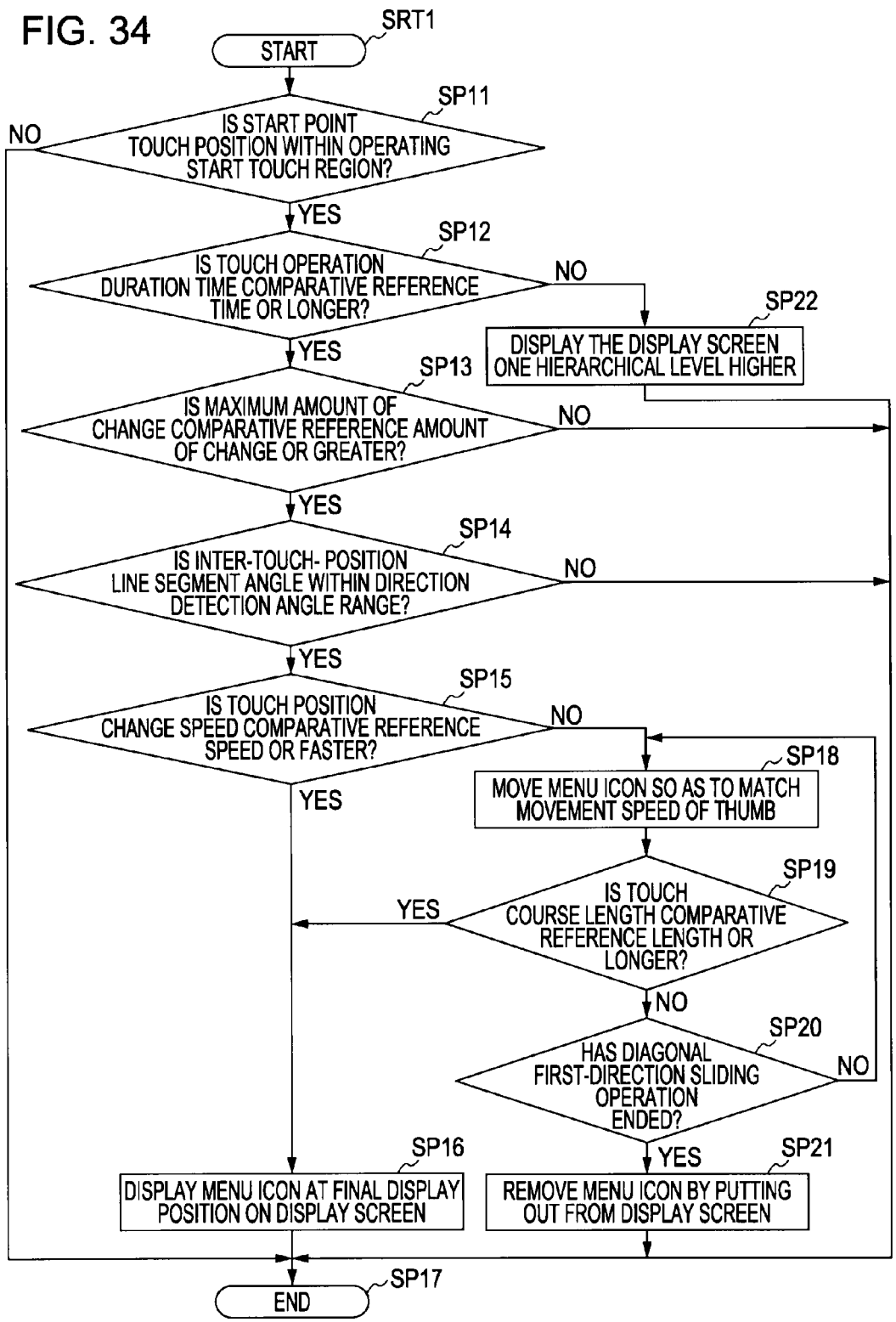

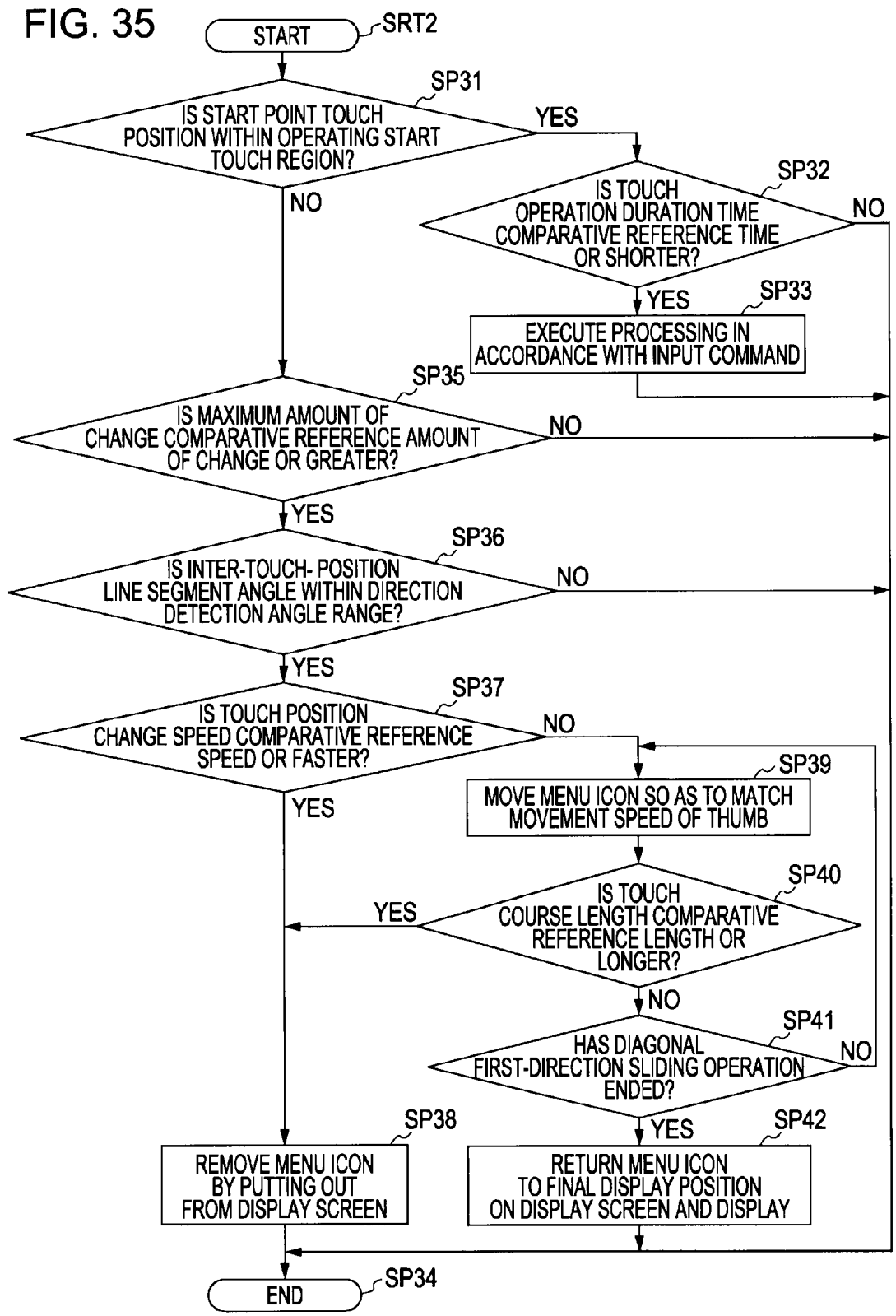

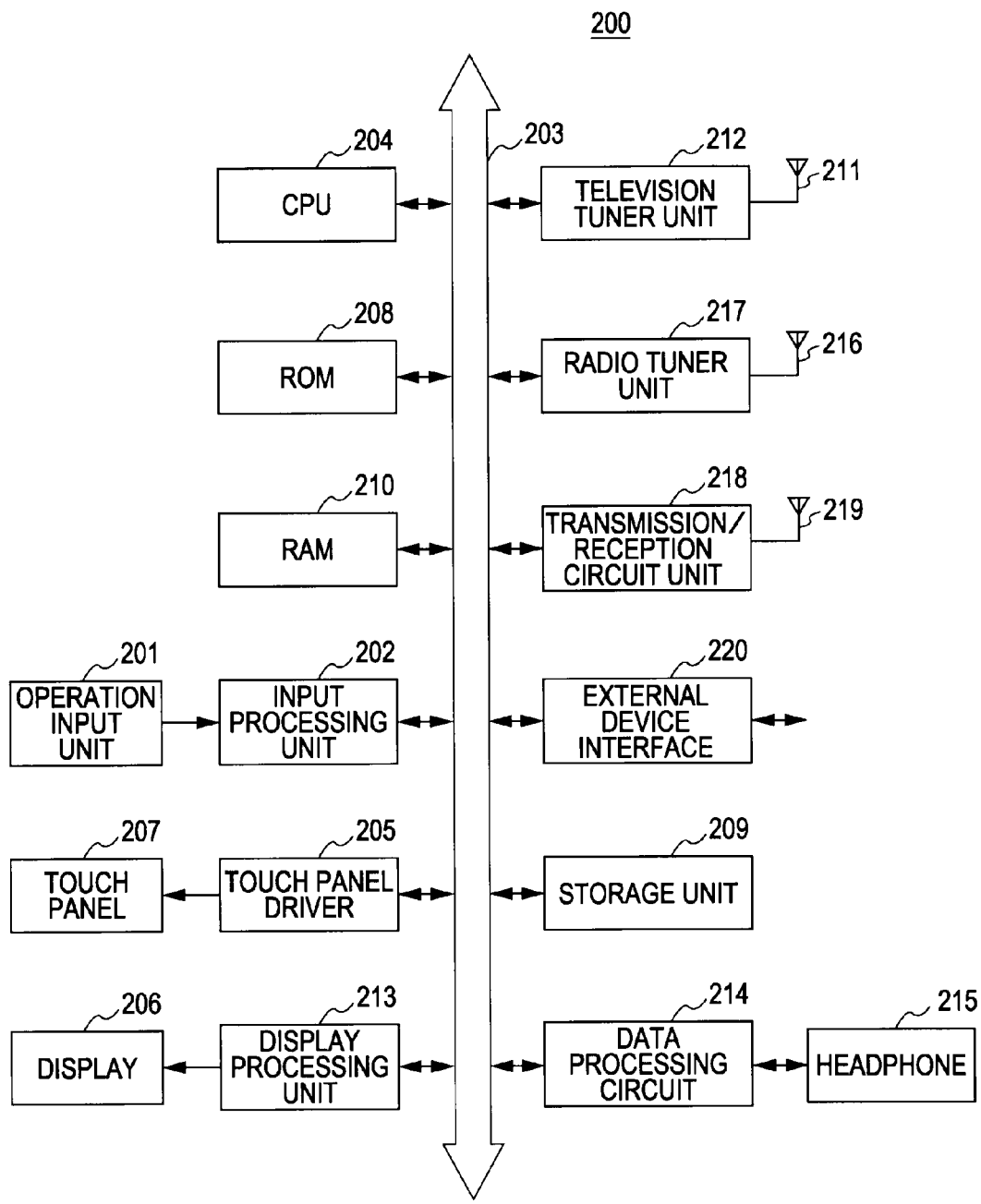

INFORMATION PROCESSING DEVICE, INFORMATION PROCESSING METHOD, AND INFORMATION PROCESSING PROGRAM

BACKGROUND OF THE INVENTION

1. Field of the Invention

The present invention relates to an information processing device, an information processing method, and an information processing program, which can be suitably applied to a portable player device provided with a touch panel, for example.

2. Description of the Related Art

With handwriting input display devices according to the related art, feature amounts of line drawings of predetermined forms, such as L-shapes drawn of multiple strokes, continuous multiple arcs, and so forth (hereinafter also referred to as "gestures"), and the processing method for executing processing in accordance with input of the gestures, are stored in a combined manner in a storage unit. Also, handwriting input display devices display one or multiple characters or line segments input via a keyboard or input table, on a display.

In the event that gestures are drawn and input to the input table using a pen in this state, a handwriting input display device extracts the feature amount of the input gesture and also compares the feature amount that has been extracted with a feature amount in the storage unit. Accordingly, the handwriting input display device identifies the input gestures, and redisplays multiple characters so as to be aligned on a straight line for example, with a processing method corresponding to the identified gestures. Or displays multiple line segments in parallel at equal intervals, for example.

Thus, with handwriting input display devices according to the related art, various types of processing have been executed, such as changing the display state of a display, with simple operations of gestures of a single stroke or multiple strokes on an input tablet (e.g., see Japanese Patent No. 3282637 (pp. 5-7)).

SUMMARY OF THE INVENTION

As of recent, there has been proposed an arrangement wherein a touch panel is disposed on the information display screen of the display unit of a portable player device, and enable commands to be input by drawing gestures of predetermined shapes on the information display screen by way of the touch panel using the fingers, thereby improving operability.

However, with portable player devices, if the shape of a command input gesture is complicated as with the case of command input gestures used with handwriting input display devices, the user is forced to hold the portable player device with one hand while using the other hand solely for input of commands by drawing gestures with the index finger thereof. Accordingly, there has been a problem with application of handwriting input to such portable player devices, since simply applying gesture input functions employed with handwriting input display devices thereto would lead to problems of operability when drawing gestures on the information display screen by way of the touch panel using the fingers, to input commands.

It has been found desirable to provide an information processing device, an information processing method, and an information processing program, which realize marked improvement in such operability.

According to an embodiment of the present invention, with an information processing device, a touch position, on a display unit provided on a main unit configured to be held such that an information display screen is positioned on a front face of the main unit, is detected, touch position detection data which is represented in terms of coordinates based on two axes intersecting at the detected touch position is generated, and in the event of detecting that the touch position on the information display screen of the display unit is being continually displaced from within a predetermined region on the information display screen in a predetermined first diagonal direction as to two directions following the two axes, based on the generated touch position detection data, predetermined information is displayed on the information display screen of the display unit.

The above configuration takes advantage of the fact that, with the thumb of the hand holding the main unit facing the information display screen, the thumb can be easily moved in the first diagonal direction which is diagonal as to the two directions following the two axes, with the base of the thumb as a pivot, and accordingly the user can display predetermined information on the information display screen of the display unit simply by diagonally moving the thumb of the hand holding the main unit over the information display screen of the display unit in the first diagonal direction.

Thus, according to the above configuration, with an information processing device, a touch position, on a display unit provided on a main unit configured to be held such that an information display screen is positioned on a front face of the main unit, is detected, touch position detection data which is represented in terms of coordinates based on two axes intersecting at the detected touch position is generated, and in the event of detecting that the touch position on the information display screen of the display unit is being continually displaced from within a predetermined region on the information display screen in a predetermined first diagonal direction as to two directions following the two axes, based on the generated touch position detection data, predetermined information is displayed on the information display screen of the display unit, whereby the user can display predetermined information on the information display screen of the display unit simply by diagonally moving the thumb of the hand holding the main unit over the information display screen of the display unit in the first diagonal direction, thereby enabling realization of an information processing device, information processing method, and information processing program, which markedly improve operability.

BRIEF DESCRIPTION OF THE DRAWINGS

FIG. 2 is a schematic perspective view illustrating the external 1 configuration of a portable player device according to a first embodiment, to which the information processing device has been applied to;

FIG. 34 is a flowchart illustrating a subroutine for icon take-in processing;

FIG. 35 is a flowchart illustrating a subroutine for icon put-out processing;

FIG. 36 is a block diagram illustrating the hardware circuit configuration of a portable player device according to a second embodiment, to which the information processing device has been applied to, in the form of function circuit blocks;

DESCRIPTION OF THE PREFERRED EMBODIMENTS

Embodiments of the present invention will now be described with reference to the drawings.

(1) Overview of Information Processing Device

Figure 1:
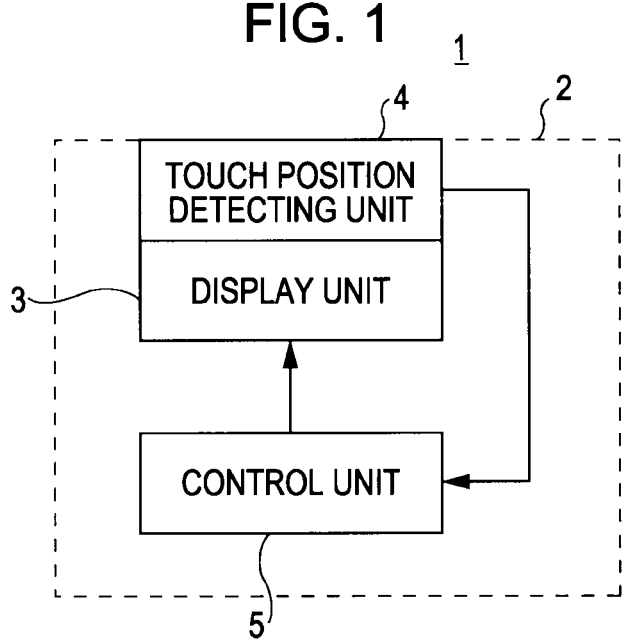
FIG. 1 is a block diagram illustrating an overview of the configuration of an information processing device according to an embodiment of the present invention.

FIG. 1 illustrates an overview of the configuration of an information processing device 1 according to an embodiment of the present invention. This information processing device 1 is shaped such that a main unit 2 has a size and/or shape enabling holding in one hand and/or both hands.

A display unit 3 provided to the information processing device 1 is provided such that an information display screen is positioned on the frontal face of the main unit 2, so as to display information on the information display screen. Also, with the information processing device, a touch position detection unit 4 detects a touch position on the information display screen of the display unit 3, and generates touch position detection data represented in terms of coordinates based on two axes orthogonally intersecting at the detected touch position.

Upon the control unit 5 of the information processing device 1 detecting displacement of the touch position on the information display screen of the display unit 3 in a predetermined diagonal direction which is a direction diagonal as to two directions following the two axes from within a predetermined region on the information display screen, based on the touch position detection data generated by the touch position detection unit 4, predetermined information is displayed on the information display screen of the display unit 3.

The user using the information processing device 1 can hold the main unit 2 such that the thumb of the holding hand faces the information display screen of the display unit 3, and thus can easily move the thumb in the direction diagonal as to the two directions following the two axes with the base of the thumb as a fulcrum. Accordingly, the information processing device 1 enables predetermined information to be displayed on the information display screen of the display unit 3 simply by holding the main unit 2 in a hand and moving the thumb of the holding hand in a direction diagonal as to two directions following the two axes, with the thumb remaining in contact with the information display screen of the display unit 3, taking advantage of this physical structure of the human body. Accordingly, the operability of the information processing device 1 is markedly improved.

(2) First Embodiment (2-1) External View of Portable Player Device

Figure 2:
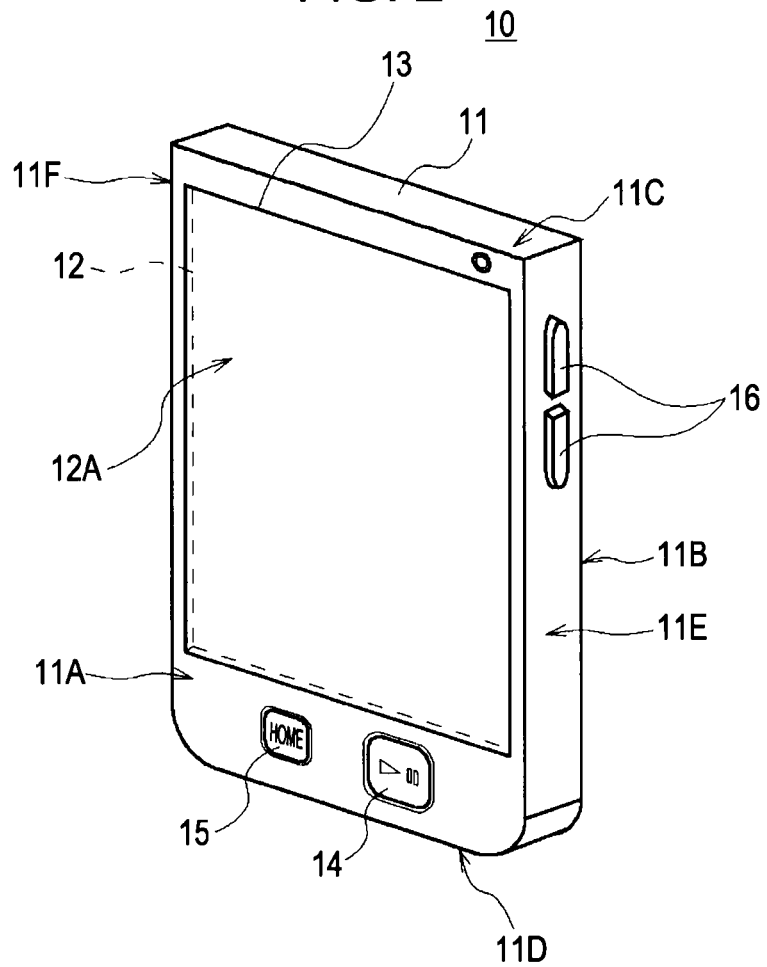

FIG. 2 illustrates the overall external configuration of a portable player device 10 according to a first embodiment, to which the information processing device according to the present invention has been applied. The portable player device 10 has a flat main unit 11 on which a front face 11A and rear face 11B are formed each generally rectangular shapes. Hereinafter, the longitudinal direction of the main unit 11 (i.e., the direction parallel to the long sides of the front face 11A and rear face 11B) may also be referred to as "main unit longitudinal direction".

Also, one end in the main unit longitudinal direction of the main unit 11 will be referred to as "first end 11C" and the other end in the main unit longitudinal direction of the main unit 11 will be referred to as "second end 11D". Further, hereinafter the transverse direction orthogonal to the longitudinal direction of the main unit 11 (i.e., the direction parallel to the short sides of the front face 11A and rear face 11B) may also be referred to as "main unit transverse direction", one side in the main unit transverse direction of the main unit 11 will be referred to as "first side 11E" and the other side in the main unit transverse direction of the main unit 11 will be referred to as "second side 11F".

The main unit 11 is provided with a display unit 12 having a rectangular information display screen 12A. The information display screen 12A of the display unit 12 has a longitudinal direction length which is slightly shorter than the length of the front face 11A of the main unit 11 (i.e., the length of the main unit in longitudinal direction), and a width slightly shorter than the width of the front face 11A of the main unit 11.

The information display screen 12A of the display unit 12 is arranged such that the longitudinal direction of the information display screen 12A is parallel to the front face 11A of the main unit 11, which is parallel to the main unit longitudinal direction, and also shifted upwards (toward the first end 11C side in the longitudinal direction). The information display screen 12A of the display unit 12 is capable of displaying various types of a display screens, such as a display screen having one or multiple display indicators (hereinafter, also referred to as "icons"), a display screen which displays predetermined information as a lost, and so forth. The information display screen 12A of the display unit 12 is further capable of independently display various types of display screens, and also capable of displaying, on a particular display screen, other information such as other display screens, one or multiple icons, and so forth.

A transparent touch panel 13 having a size and shape approximately the same as that of the information display screen 12A is provided on the information display screen 12A of the display unit 12 so as to cover the entirety of the information display screen 12A.

The lower side of the front face 11A of the main unit 11 (i.e., the second end 11D in the main unit longitudinal direction) is provided with a play/stop button 14 for instructing starting and stopping of playing, and a home button 15 for displaying a home menu screen.

Also, upper portion of the first side 11E of the main unit 11 is provided with volume adjusting buttons 16 for adjusting volume. Note that in the following description, in the event that the play/stop button 14, home button 15, and volume adjusting buttons 16 do not have to be individually distinguished, these may be collectively referred to as "operation buttons".

The width of the main unit 11 is designed so as to be shorter than the average length of the palm of the hand of an adult ("length of the palm" meaning the distance from the boundary between the hand and the wrist to the base of the four fingers (not the thumb)).

Figure 3:
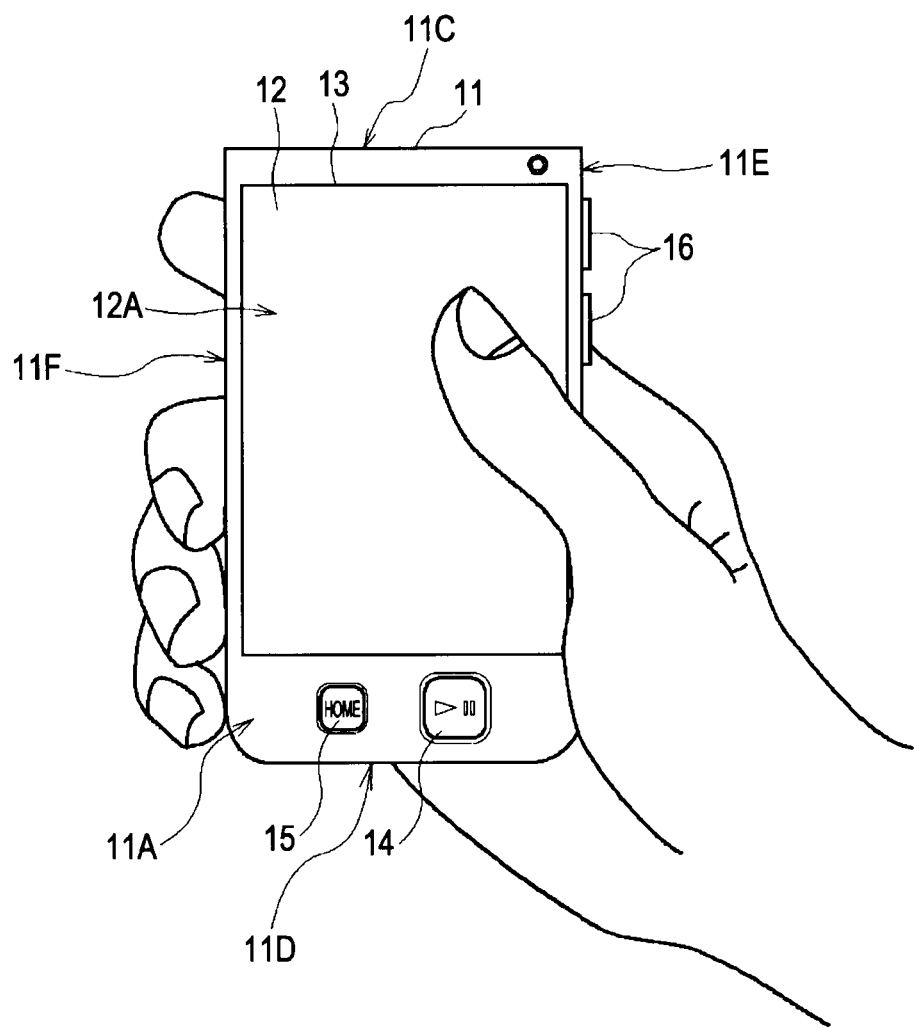
FIG. 3 is a frontal view outline drawing for description of a case of holding a main unit of the portable player device in the right hand.

As shown in FIG. 3, in the event that the user is right-handed, the user holds the main unit 11 by pressing the base of the thumb of the right hand against the lower portion of the first side 11E, while cradling the rear face 11B with the palm of the right hand, such that at least a part of the fingers excluding the thumb are pressed against the second side 11F.

Figure 4:
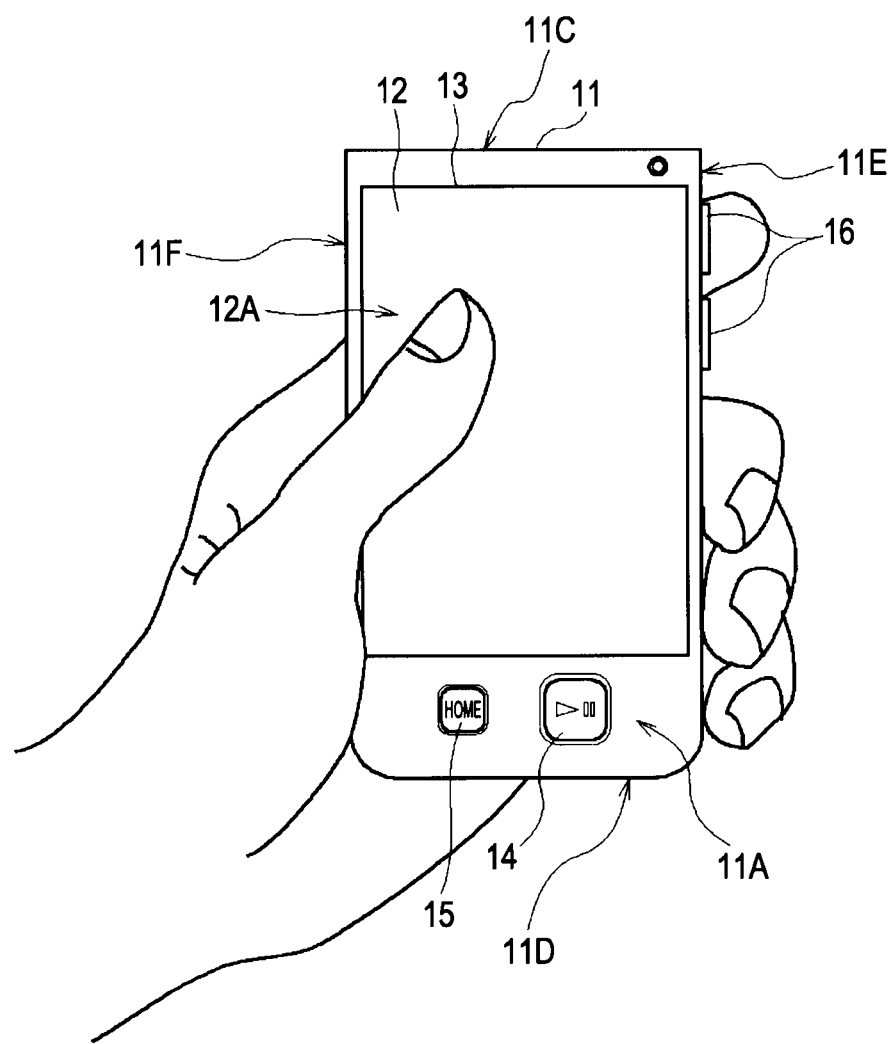
FIG. 4 is a frontal view outline drawing for description of a case of holding a main unit of the portable player device in the left hand.

Also, as shown in FIG. 4, in the event that the user is left-handed, the user holds the main unit 11 by pressing the base of the thumb of the left hand against the lower portion of the second side 11F, while cradling the rear face 11B with the palm of the right hand, such that at least a part of the fingers excluding the thumb are pressed against the first side 11E.

That is to say, the main unit 11 can be held on one hand such that the hand closes on the first side 11E and second side 11F, with the main unit 11 oriented such that the first end 11C and second end 11D are at the upper side and lower side in the field of view of the user, and the first side 11E and second side 11F are at the right and left of the field of view, respectively. Hereinafter, this orientation of the main unit 11 wherein the first end 11C and second end 11D are situated at the upper side and lower side in the field of view of the user and the first side 11E and second side 11F are situated at the right and left of the field of view will be referred to as "vertical holding orientation".

The portable player device 10 is arranged such that, upon the main unit 11 being held by the user in one hand, the thumb of the one hand holding the main unit 11 (i.e., the dominant hand) can be positioned opposing the front face 11A. Thus, upon the main unit 11 being hand in one hand, various types of commands can be input to the portable player device 10 by the thumb of the one hand holding the main unit 11 performing touch operations of the information display screen 12A via the touch panel 13. Also, the portable player device 10 is arranged such that, upon the main unit 11 being held by the user in one hand, the play/stop button 14 and home button 15 can be pressed by the thumb of the one hand holding the main unit 11.

Note that with the information display screen 12A of the display unit 12, the display screen displayed thereon is arranged such that the upper side of the screen and the lower side of the screen are situated at the first end 11C side and second end 11D side respectively, and the right side of the screen and the left side of the screen are situated at the first side 11E side and second side 11F side respectively. Note that hereinafter, the display arrangement wherein the information display screen 12A of the display unit 12 is displayed such that the upper side of the screen and the lower side of the screen are situated at the first end 11C side and second end 11D side respectively, and the right side of the screen and the left side of the screen are situated at the first side 11E side and second side 11F side respectively, will be referred to as a "standard display form".

Accordingly, upon the user holding the main unit 11 in the vertical holding orientation in one hand with a display screen according to the normal display form displayed on the information display screen 12A of the display unit 12, the user can view the text and shapes within the display screen in the correct way vertically in the field of view of the user. The user can perform touch operations of the information display screen 12A with the thumb while correctly viewing the text and shapes displayed on the information display screen 12A of the display unit 12, and also performing pressing operations of the play/stop button 14 and home button 15.

Figure 5:
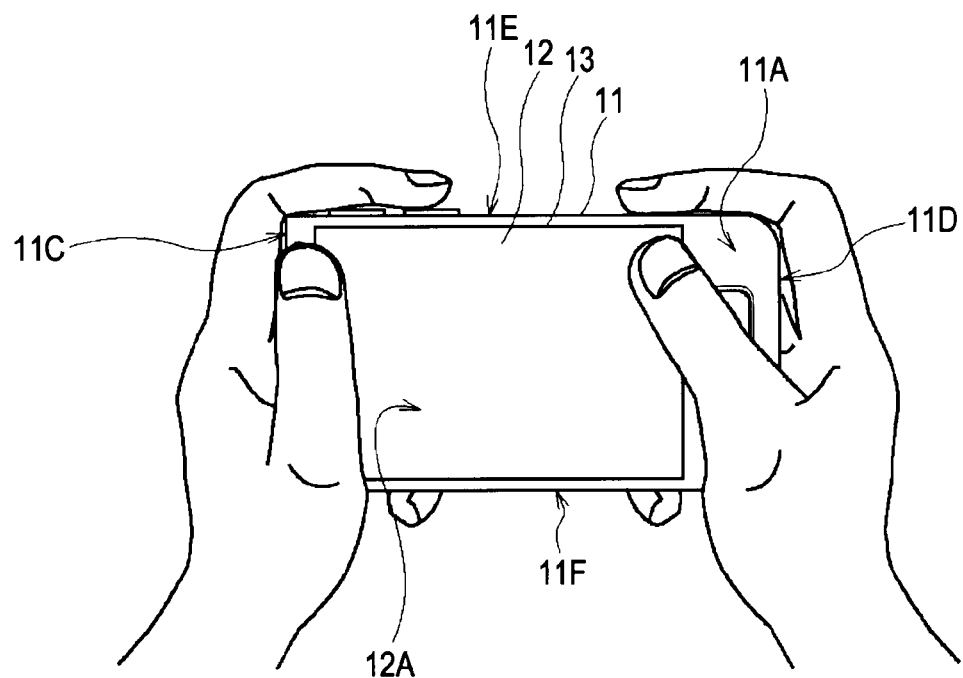
FIG. 5 is a frontal view outline drawing for description of a first way of holding a main unit of the portable player device in both hands.

In addition, as shown in FIG. 5, the main unit 11 can be held in both hands, with the base of the thumb of the right hand being pressed against the second end 11D and the base of the thumb of the left hand pressed against the first end 11C, with at least a part of the other eight fingers excluding the left and right thumbs supporting the rear face 11B, in the event that the user is right-handed.

That is to say, the main unit 11 can be held with the first side 11E and second side 11F situated toward the upper side and lower side of the field of view of the user respectively, and the second end 11D and first end 11C situated toward the right side and left side of the field of view respectively, such that the first end 11C and the second end 11D are clamped between both hands. Note that hereinafter, the orientation wherein the first side 11E and second side 11F are situated toward the upper side and lower side of the field of view of the user, and the first end 11C and second end 11D are situated toward the right side and left side of the field of view, will be referred to as "right-handed horizontal holding orientation".

Figure 6:
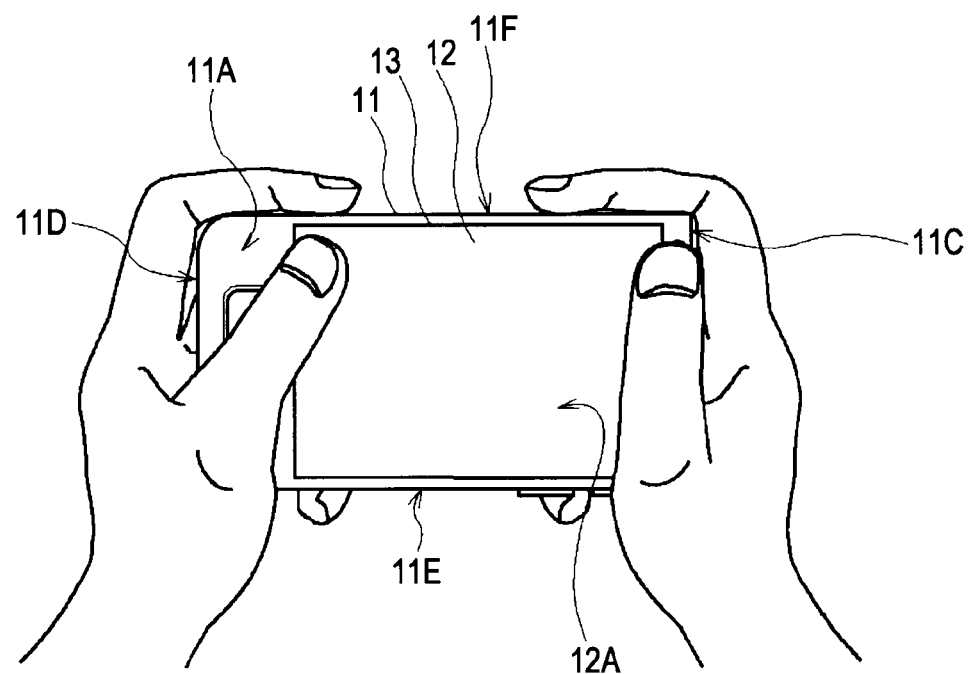
FIG. 6 is a frontal view outline drawing for description of a second way of holding a main unit of the portable player device in both hands.

Moreover, as shown in FIG. 6, the main unit 11 can be held in both hands, with the base of the thumb of the right hand being pressed against the first end 11C and the base of the thumb of the left hand pressed against the second end 11D, with at least a part of the other eight fingers excluding the left and right thumbs supporting the rear face 11B, in the event that the user is left-handed.

That is to say, the main unit 11 can be held with the second side 11F and first side 11E situated toward the upper side and lower side of the field of view of the user, and the first end 11C and second end 11D situated toward the right side and left side of the field of view, such that the first end 11C and the second end 11D are clamped between both hands. Note that hereinafter, the orientation wherein the second side 11F and first side 11E are situated toward the upper side and lower side of the field of view of the user respectively, and the first end 11C and second end 11D are situated toward the right side and left side of the field of view respectively, will be referred to as "left-handed horizontal holding orientation".

With the portable player device 10, upon the user holding the main unit 11 in both hands, the thumb of the at least one dominant hand holding the main unit 11 can be positioned opposing the front face 11A, while holding the main unit 11 in both hands. Thus, with the portable player device 10, upon the user holding the main unit 11 in both hands, various types of commands can be input to the portable player device 10 by at least the thumb of the dominant hand performing touch operations of the information display screen 12A via the touch panel 13.

Note that with the information display screen 12A of the display unit 12, the display screen displayed thereon is arranged such that the upper side of the screen and the lower side of the screen are situated at the first side 11E side and second side 11F side respectively, and the right side of the screen and the left side of the screen are situated at the second end 11D side and first end 11C side respectively. Note that hereinafter, the display arrangement wherein the information display screen 12A of the display unit 12 is displayed such that the upper side of the screen and the lower side of the screen are situated at the first side 11E side and second side 11F side respectively, and the right side of the screen and the left side of the screen are situated at the second end 11D side and first end 11C side respectively, will be referred to as a "right-handed display form".

Accordingly, upon the user holding the main unit 11 in the right-handed horizontal holding orientation in both hands with a display screen according to the right-handed display form displayed on the information display screen 12A of the display unit 12, the user can view the text and shapes within the display screen in the correct way vertically in the field of view of the user. The user can perform touch operations of the information display screen 12A with the thumb of the dominant hand (right hand) while correctly viewing the text and shapes displayed on the information display screen 12A of the display unit 12, and also performing pressing operations of the play/stop button 14 and home button 15.

Also, note that with the information display screen 12A of the display unit 12, the display screen displayed thereon is arranged such that the upper side of the screen and the lower side of the screen are situated at the second side 11F side and first side 11E side respectively, and the right side of the screen and the left side of the screen are situated at the first end 11C side and second end 11D side respectively. Note that hereinafter, the display arrangement wherein the information display screen 12A of the display unit 12 is displayed such that the upper side of the screen and the lower side of the screen are situated at the second side 11F side and first side 11E side respectively, and the right side of the screen and the left side of the screen are situated at the first end 11C side and second end 11D side respectively, will be referred to as a "left-handed display form".

Accordingly, upon the user holding the main unit 11 in the left-handed horizontal holding orientation in both hands with a display screen according to the left-handed display form displayed on the information display screen 12A of the display unit 12, the user can view the text and shapes within the display screen in the correct way vertically in the field of view of the user. The user can perform touch operations of the information display screen 12A with the thumb of the dominant hand (left hand) while correctly viewing the text and shapes displayed on the information display screen 12A of the display unit 12, and also performing pressing operations of the play/stop button 14 and home button 15.

Now, with the portable player device 10, in order to enable input of a greater variety of commands, different touch operations can be performed on the information display screen 12A of the display unit 12, so as to input more commands. With the portable player device 10, the types of commands which can be input by touch operations are stipulated for each display screen which can be displayed on the information display screen 12A of the display unit 12. Also, the types of touch operations for inputting the commands are also stipulated along with the types of commands which can be input, for each display screen which can be displayed on the information display screen 12A of the display unit 12.

One example of a touch operation whereby a command can be actually input is for the user to perform what will hereinafter be referred to as a "tap operation", where the user touches and immediately releases, with the thumb of the right hand or left hand, one point within a predetermined region of the information display screen 12A corresponding to an icon or text within the display screen indicating a command which can be input. This tap operation is performed to input a command assigned to an icon or predetermined region or the like within the display screen, so as to select the icon or predetermined region.

Another example of a touch operation whereby a command can be input is for the user to perform what will hereinafter be referred to as a "long hold operation", where the user presses for a predetermined comparative reference time or longer, with the thumb of the right hand or left hand, one point within a predetermined region of the information display screen 12A corresponding to an icon or text within the display screen indicating a command which can be input. This long hold operation is a touch operation performed for inputting pop-up display commands or the like, to display, on a predetermined display screen, another sub-screen or a text string.

Another example of a touch operation whereby a command can be input is for the user to perform what will hereinafter be referred to as a "screen-left-direction sliding operation", where the user slides the thumb of the right hand (or left hand), already in contact with the information display screen 12A, from the right side of the screen toward the left side of the screen. A further example of a touch operation whereby a command can be input is for the user to perform what will hereinafter be referred to as a "screen-right-direction sliding operation", where the user slides the thumb of the right hand or left hand, already in contact with the information display screen 12A, from the left side of the screen toward the right side of the screen. The screen-left-direction sliding operation and screen-right-direction sliding operation are touch operations performed to input mode switchover commands, to switch over the display mode of the display screen, for example.

A further example of a touch operation whereby a command can be input is for the user to perform what will hereinafter be referred to as a "screen-down-direction sliding operation", where the user slides the thumb of the right hand or left hand, already in contact with the information display screen 12A, from the upper side of the screen toward the lower side of the screen. The screen-down-direction sliding operation is a touch operation performed to input a down-scroll command for a downwards scrolled display of a list within the display screen on the information display screen 12A.

Yet another example of a touch operation whereby a command can be input is for the user to perform what will hereinafter be referred to as a "screen-up-direction sliding operation", where the user slides the thumb of the right hand or left hand, already in contact with the information display screen 12A, from the lower side of the screen toward the upper side of the screen. The screen-up-direction sliding operation is a touch operation performed to input an up-scroll command for an upwards scrolled display of a list within the display screen on the information display screen 12A.

Yet another example of a touch operation whereby a command can be input is for the user to perform what will hereinafter be referred to as a "diagonal first-direction sliding operation", where the user slides the thumb of the right hand or left hand, already in contact with the information display screen 12A, in a direction diagonal to the main unit longitudinal direction and main unit width direction. Note that hereinafter, a predetermined region where the user touches the thumb on the information display screen 12A of the display unit 12 at the time of starting a touch operation such as the diagonal first-direction sliding operation will be referred to as "operation start touch region" to differentiate from other touch operations.

The diagonal first-direction sliding operation is a touch operation performed to input an icon display command for displaying executable items in a processing menu, for example. Note that hereinafter, icons indicating executable items in a processing menu will be referred to as "menu icons.

Yet another example of a touch operation whereby a command can be input is for the user to perform what will hereinafter be referred to as a "diagonal second-direction sliding operation", where the user slides the thumb of the right hand or left hand, already in contact with the information display screen 12A, in a direction opposite to the first diagonal direction. The diagonal second-direction sliding operation is a touch operation performed to input an icon erase command for erasing one or multiple menu icons displayed superimposed on the display screen in accordance with the diagonal first-direction sliding operation.

As described above, the portable player device 10 is capable of displaying various display forms of the display screen on the information display screen 12A of the display unit 12, such as the standard display form, right-handed display form, and left-handed display form. Also, the portable player device 10 is arranged such that the main unit 11 can be held with a dominant one hand in the vertical holding orientation, or with both hands in the right-handed horizontal holding orientation or the left-handed horizontal holding orientation, in accordance with the display form of the display screen on the information display screen 12A of the display unit 12.

Accordingly, with the portable player device 10, even if the holding orientation of the main unit 11 differs, the user has the impression of performing the same sort of motions with the thumb at the time of performing touch operations on the information display screen 12A with the thumb of the dominant hand to input the same command.

Figure 7A:
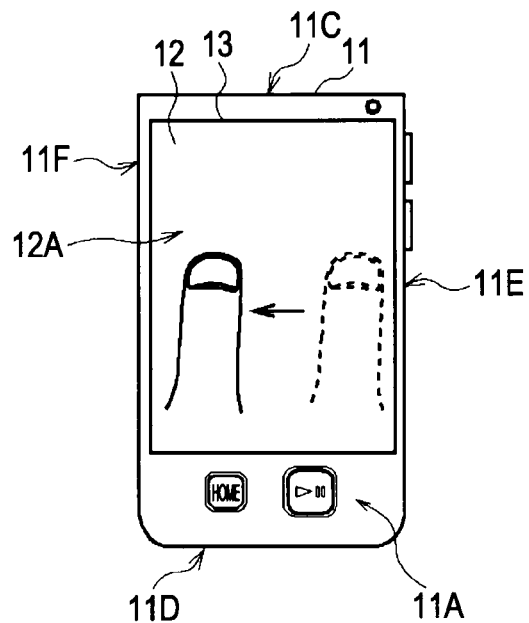
FIGS. 7A through 7C are frontal view outline drawings for description of a sliding operation toward the left of the screen, in accordance with the orientation of holding the main unit.

Now, description will be made regarding the screen-left-direction sliding operation performed as a touch operation described above, with reference to FIGS. 7A through 7C. With the portable player device 10 as shown in FIG. 7A, in the event that the main unit 11 is held in the vertically holding orientation, a touch operation where the user slides the thumb of the dominant hand (right hand or left hand), already in contact, over the information display screen 12A from the first side 11E side toward the second side 11F side, is the screen-left-direction sliding operation.

Figure 7B:
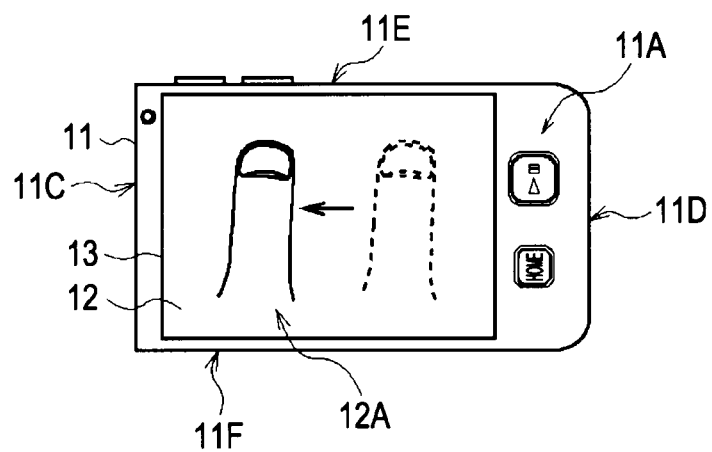

Also, with the portable player device 10 as shown in FIG. 7B, in the event that the main unit 11 is held in the right-handed horizontal holding orientation, a touch operation where the user slides the thumb of the dominant hand (right hand), already in contact, over the information display screen 12A from the second end 11D side toward the first end 11C side, is the screen-left-direction sliding operation.

Figure 7C:
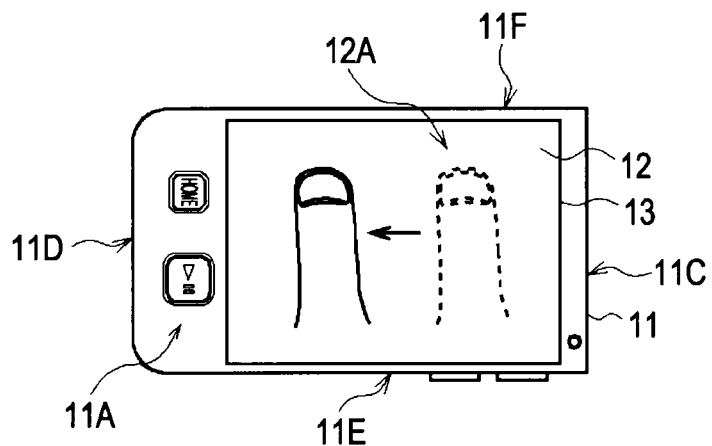

Further, with the portable player device 10 as shown in FIG. 7C, in the event that the main unit 11 is held in the left-handed horizontal holding orientation, a touch operation where the user slides the thumb of the dominant hand (left hand), already in contact, over the information display screen 12A from the first end 11E side toward the second end 11F side, is the screen-left-direction sliding operation.

Accordingly, with the portable player device 10, even in the event that the holding orientation of the main unit 11 differs, the same command can be input for the screen-left-direction sliding operation on the information display screen 12A without changing the way that the thumb of the dominant hand (right hand or right hand) is moved in particular.

Figure 8A:
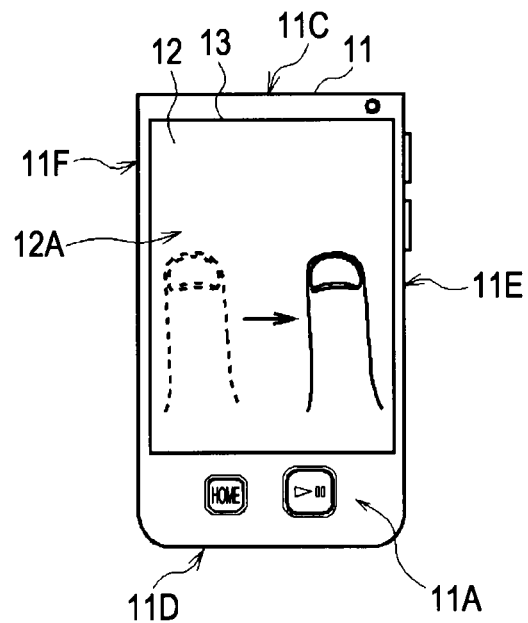
FIGS. 8A through 8C are frontal view outline drawings for description of a sliding operation toward the right of the screen, in accordance with the orientation of holding the main unit.

Also, description will be made regarding the screen-right-direction sliding operation as the touch operation described above, with reference to FIGS. 8A through 8C. With the portable player device 10 as shown in FIG. 8A, in the event that the main unit 11 is held in the vertically holding orientation, a touch operation where the user slides the thumb of the dominant hand (right hand or left hand), already in contact, over the information display screen 12A from the second side 11F side toward the first side 11E side, is the screen-right-direction sliding operation.

Figure 8B:
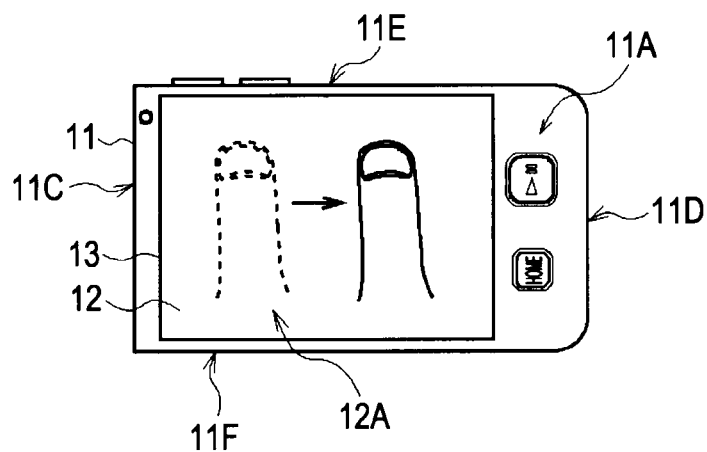

Also, with the portable player device 10 as shown in FIG. 8B, in the event that the main unit 11 is held in the right-handed horizontal holding orientation, a touch operation where the user slides the thumb of the dominant hand (right hand), already in contact, over the information display screen 12A from the first end 11E side toward the second end 11F, is the screen-right-direction sliding operation.

Figure 8C:
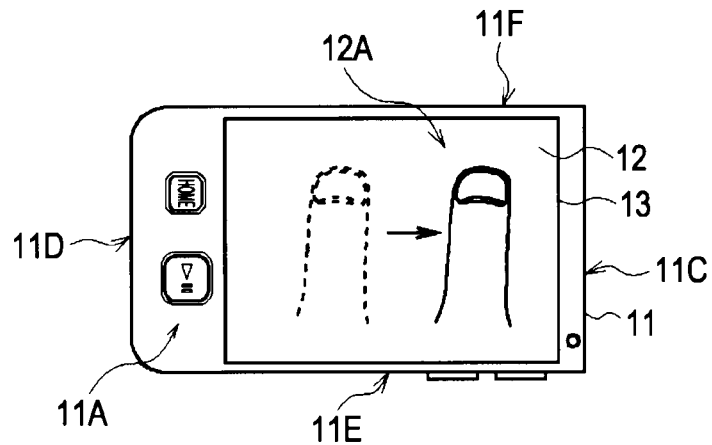

Further, with the portable player device 10 as shown in FIG. 8C, in the event that the main unit 11 is held in the left-handed horizontal holding orientation, a touch operation where the user slides the thumb of the dominant hand (left hand), already in contact, over the information display screen 12A from the second end 11D side toward the first end 11C, is the screen-right-direction sliding operation.

Accordingly, with the portable player device 10, even in the event that the holding orientation of the main unit 11 differs, the same command can be input for the screen-right-direction sliding operation on the information display screen 12A without changing the way that the thumb of the dominant hand (right hand or right hand) is moved in particular.

Figure 9A:
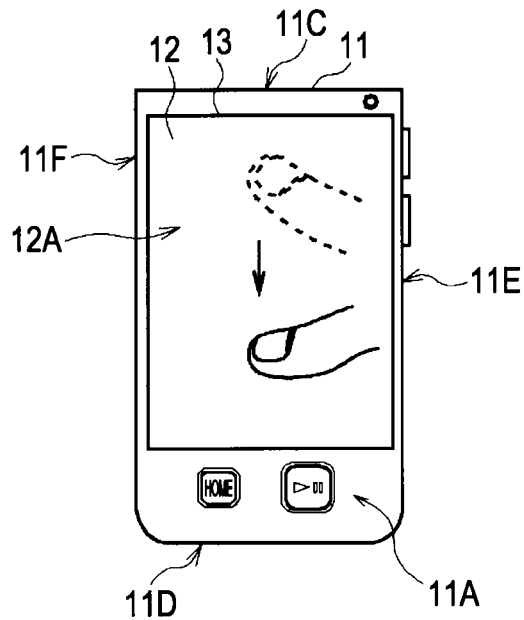
FIGS. 9A through 9C are frontal view outline drawings for description of a downwards sliding operation on the screen, in accordance with the orientation of holding the main unit.

Also, description will be made regarding the screen-down-direction sliding operation as the touch operation described above, with reference to FIGS. 9A through 9C. With the portable player device 10 as shown in FIG. 9A, in the event that the main unit 11 is held in the vertically holding orientation, a touch operation where the user slides the thumb of the dominant hand (right hand or left hand), already in contact, over the information display screen 12A from the first end 11C side toward the second end 11D side, is the screen-down-direction sliding operation.

Figure 9B:
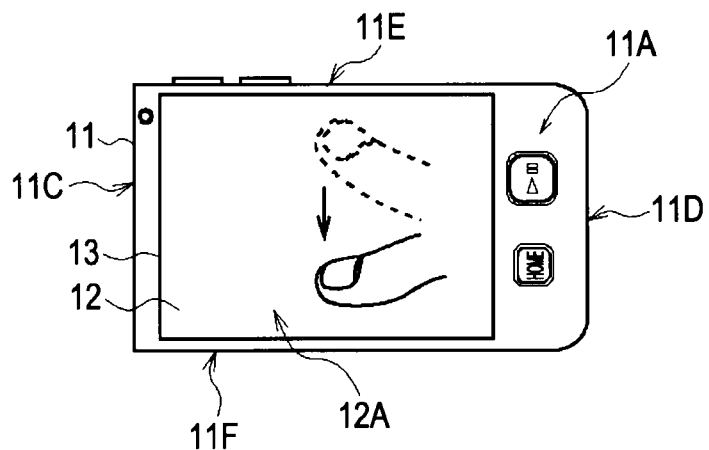

Also, with the portable player device 10 as shown in FIG. 9B, in the event that the main unit 11 is held in the right-handed horizontal holding orientation, a touch operation where the user slides the thumb of the dominant hand (right hand), already in contact, over the information display screen 12A from the first side 11E side toward the second side 11F, is the screen-down-direction sliding operation.

Figure 9C:
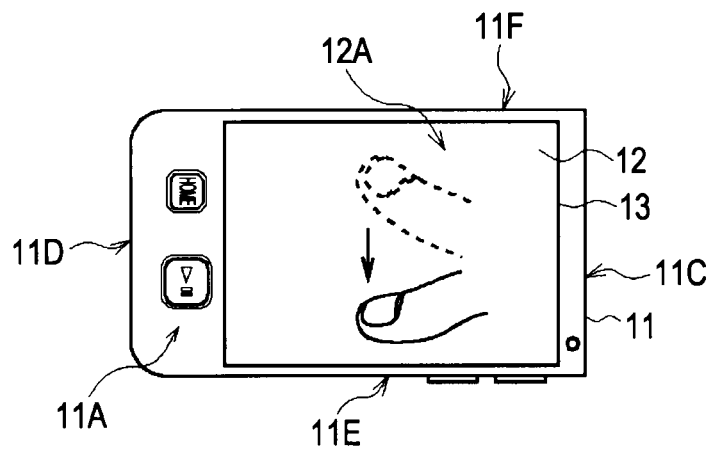

Further, with the portable player device 10 as shown in FIG. 9C, in the event that the main unit 11 is held in the left-handed horizontal holding orientation, a touch operation where the user slides the thumb of the dominant hand (left hand), already in contact, over the information display screen 12A from the second side 11F side toward the first side 11E, is the screen-down-direction sliding operation.

Accordingly, with the portable player device 10, even in the event that the holding orientation of the main unit 11 differs, the same command can be input for the screen-down-direction sliding operation on the information display screen 12A without changing the way that the thumb of the dominant hand (right hand or right hand) is moved in particular.

Figure 10A:
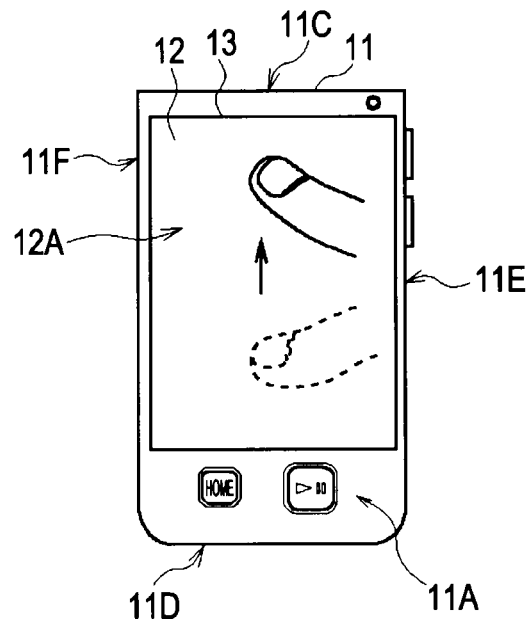
FIGS. 10A through 10C are frontal view outline drawings for description of an upwards sliding operation on the screen, in accordance with the orientation of holding the main unit.

Also, description will be made regarding the screen-up-direction sliding operation as the touch operation described above, with reference to FIGS. 10A through 10C. With the portable player device 10 as shown in FIG. 10A, in the event that the main unit 11 is held in the vertically holding orientation, a touch operation where the user slides the thumb of the dominant hand (right hand or left hand), already in contact, over the information display screen 12A from the second end 11D side toward the first end 11C side, is the screen-up-direction sliding operation.

Figure 10B:
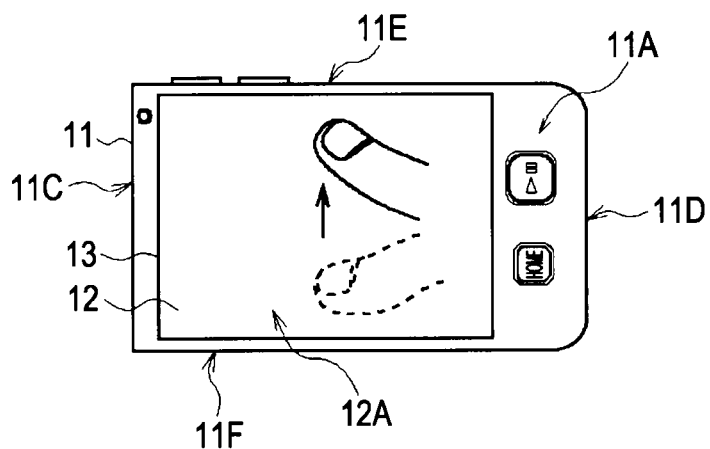

Also, with the portable player device 10 as shown in FIG. 10B, in the event that the main unit 11 is held in the right-handed horizontal holding orientation, a touch operation where the user slides the thumb of the dominant hand (right hand), already in contact, over the information display screen 12A from the second side 11F side toward the first side 11E, is the screen-up-direction sliding operation.

Figure 10C:
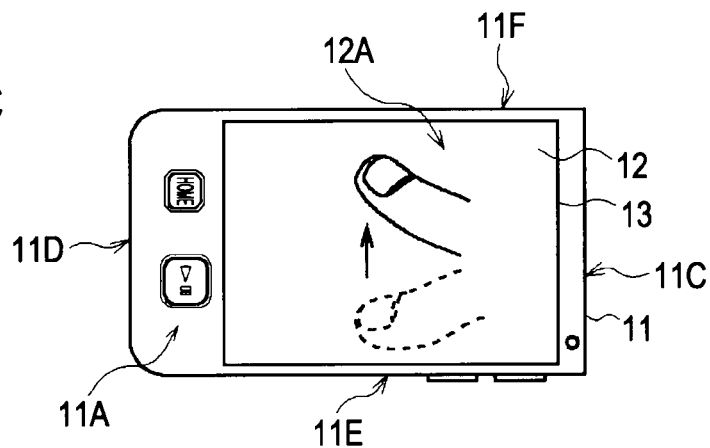

Further, with the portable player device 10 as shown in FIG. 10C, in the event that the main unit 11 is held in the left-handed horizontal holding orientation, a touch operation where the user slides the thumb of the dominant hand (left hand), already in contact, over the information display screen 12A from the first side 11E side toward the second side 11F, is the screen-up-direction sliding operation.

Accordingly, with the portable player device 10, even in the event that the holding orientation of the main unit 11 differs, the same command can be input for the screen-up-direction sliding operation on the information display screen 12A without changing the way that the thumb of the dominant hand (right hand or right hand) is moved in particular.

Figure 11:
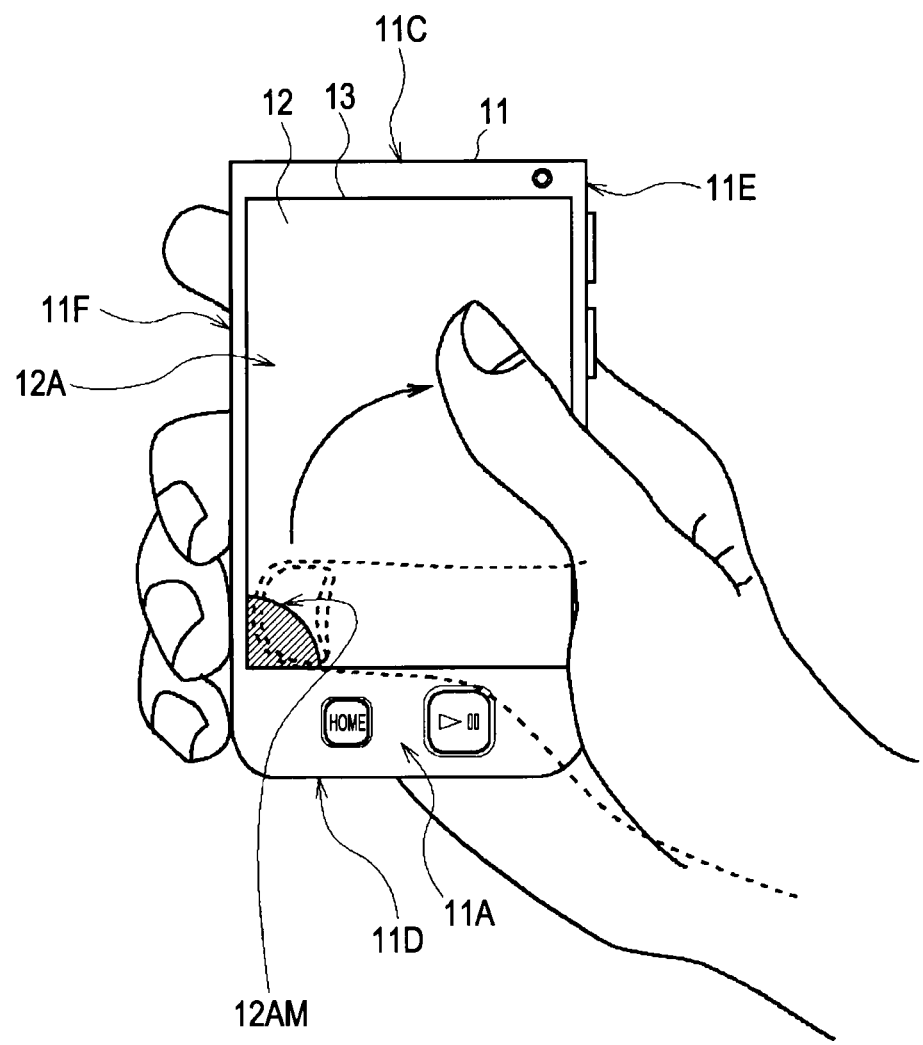
FIG. 11 is a frontal view outline drawing for description of a diagonal first-direction sliding operation in a case where the main unit is held in the right hand in a vertical orientation.

Also, a diagonal first-direction sliding operation will be described with reference to FIGS. 11 through 14 as an aforementioned touch operation. As shown in FIG. 11, with the portable player device 10, a fan-shaped operation start touch region 12AM is provided on the information display screen 12A at the corner closest to the little finger (i.e., the portion corresponding to the lower left corner of the display screen) when the main unit 11 is held in the vertical holding orientation with the dominant right hand.

With the portable player device 10, a touch operation where the user slides the thumb of the right hand, already in contact with the operation start touch region 12AM of the information display screen 12A, in a first diagonal direction over the information display screen 12A from the operation start touch region 12AM toward the first side 11E side, i.e., toward the upper right of the display screen, is the diagonal first-direction sliding operation.

Figure 12:
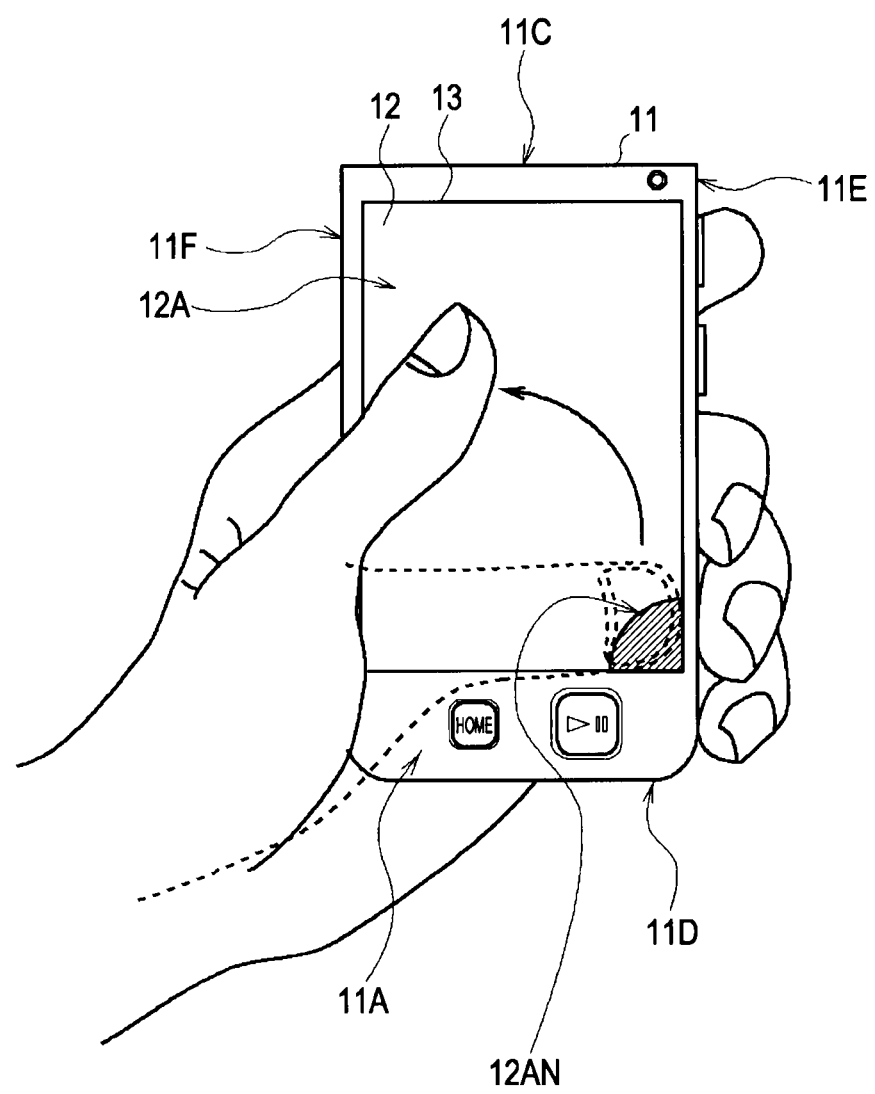
FIG. 12 is a frontal view outline drawing for description of a diagonal first-direction sliding operation in a case where the main unit is held in the left hand in a vertical orientation.

Also, as shown in FIG. 12, with the portable player device 10, a fan-shaped operation start touch region 12AN is provided on the information display screen 12A at the corner closest to the little finger (i.e., the portion corresponding to the lower right corner of the display screen) when the main unit 11 is held in the vertical holding orientation with the dominant left hand.

With the portable player device 10, a touch operation where the user slides the thumb of the left hand, already in contact with the operation start touch region 12AN of the information display screen 12A, in a first diagonal direction over the information display screen 12A from the operation start touch region 12AN toward the second side 11F side, i.e., toward the upper left of the display screen, is the diagonal first-direction sliding operation.

Figure 13:
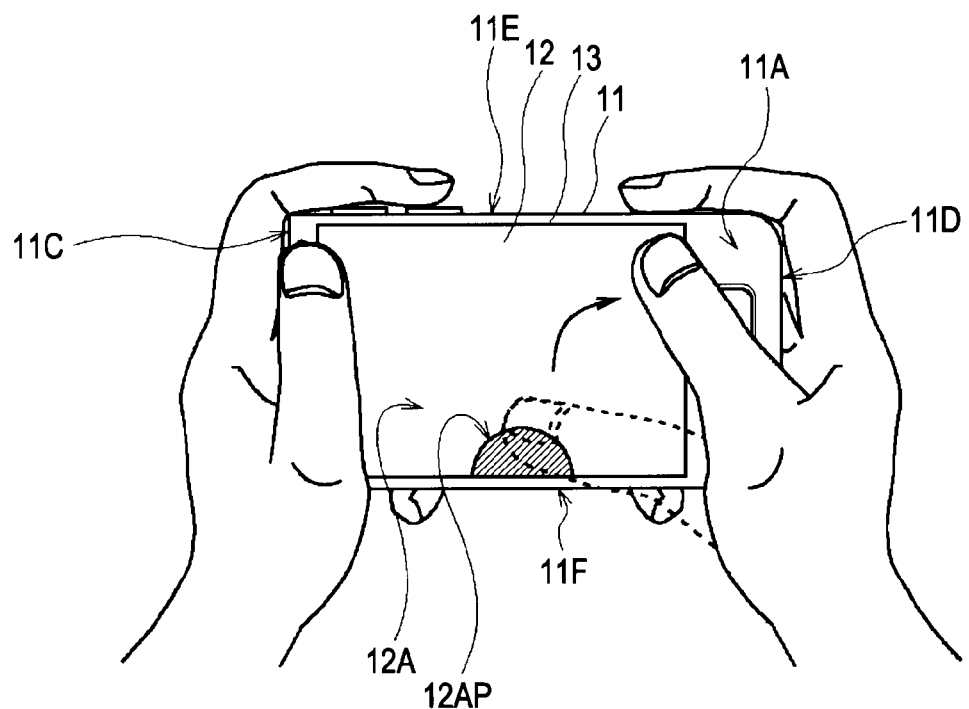
FIG. 13 is a frontal view outline drawing for description of a diagonal first-direction sliding operation in a case where the main unit is held in both hands in a right-handed horizontal holding orientation.

Further, as shown in FIG. 13, with the portable player device 10, a fan-shaped operation start touch region 12AP is provided on the information display screen 12A around the middle of the edge closest to the second side 11F when the main unit 11 is held in the right-handed horizontal holding orientation.

With the portable player device 10, a touch operation where the user slides the thumb of the right hand, already in contact with the operation start touch region 12AP of the information display screen 12A, in a first diagonal direction over the information display screen 12A from the operation start touch region 12P toward the corner between the second end 11D and the first side 11E side, i.e., toward the upper right of the display screen, is the diagonal first-direction sliding operation.

Figure 14:
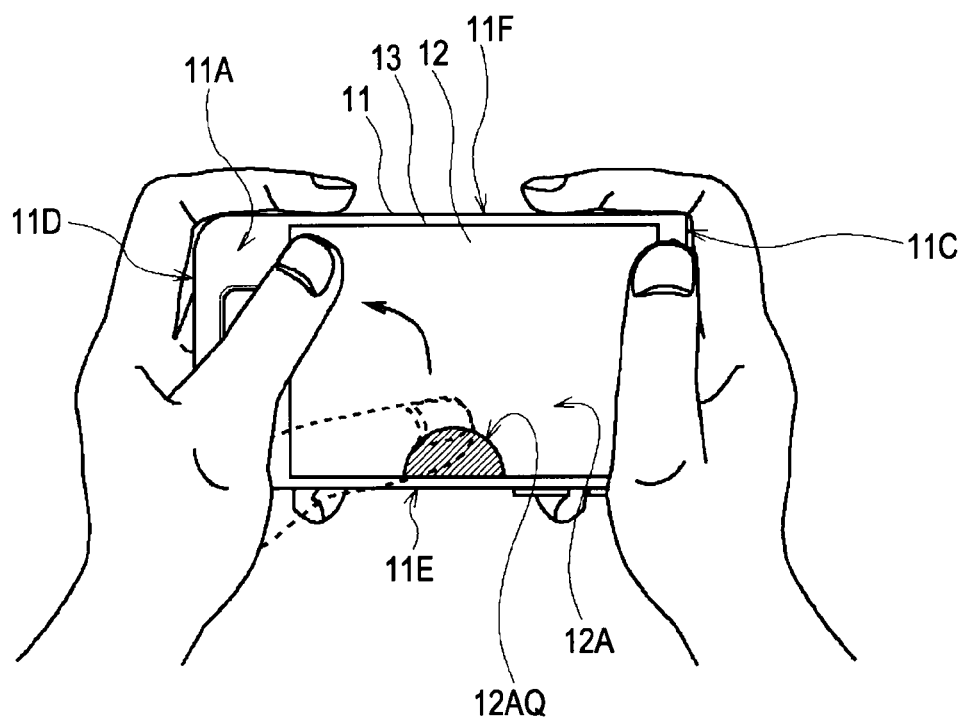
FIG. 14 is a frontal view outline drawing for description of a diagonal first-direction sliding operation in a case where the main unit is held in both hands in a left-handed horizontal holding orientation.

Moreover, as shown in FIG. 14, with the portable player device 10, a fan-shaped operation start touch region 12AQ is provided on the information display screen 12A at the edge closest to the first side 11E when the main unit 11 is held in the left-handed horizontal holding orientation.

With the portable player device 10, a touch operation where the user slides the thumb of the left hand, already in contact with the operation start touch region 12P of the information display screen 12A, in a first diagonal direction over the information display screen 12A from the operation start touch region 12P toward the corner between the second end 11D and the second side 11F side, i.e., toward the upper left of the display screen, is the diagonal first-direction sliding operation.

Thus, with the portable player device 10, even in the event that the holding orientation of the main unit 11 changes, the user can input the same commands with the diagonal first-direction sliding operation over the information display screen 12A by turning the thumb of the right hand or left hand with the base of the thumb as a pivot, so as to draw an arc.

Also, a diagonal second-direction sliding operation will be described an aforementioned touch operation. With the portable player device 10 (FIG. 11), in a case wherein the main unit 11 is held in the vertical holding orientation by the dominant right hand, a touch operation where the user slides the thumb of the right hand, already in contact with the edge around the middle of the first side 11E, toward the operation start touch region 12AM of the information display screen 12A, in a second diagonal direction over the information display screen 12A, is the diagonal second-direction sliding operation.

Also, with the portable player device 10 (FIG. 12), in a case wherein the main unit 11 is held in the vertical holding orientation by the dominant left hand, a touch operation where the user slides the thumb of the left hand, already in contact with the edge around the middle of the second side 11F, toward the operation start touch region 12AN of the information display screen 12A, in a second diagonal direction over the information display screen 12A, is the diagonal second-direction sliding operation.

Further, with the portable player device 10 (FIG. 13), in a case wherein the main unit 11 is held in the right-handed horizontal holding orientation in both hands, a touch operation where the user slides the thumb of the right hand, already in contact with around the corner of the second end 11D and first side 11E, toward the operation start touch region 12AP of the information display screen 12A, in a second diagonal direction over the information display screen 12A, is the diagonal second-direction sliding operation.

Moreover, with the portable player device 10 (FIG. 14), in a case wherein the main unit 11 is held in the left-handed horizontal holding orientation in both hands, a touch operation where the user slides the thumb of the left hand, already in contact with around the corner of the second end 11D and second side 11F, toward the operation start touch region 12AQ of the information display screen 12A, in a second diagonal direction over the information display screen 12A, is the diagonal second-direction sliding operation.

Thus, with the portable player device 10, even in the event that the holding orientation of the main unit 11 changes, the user can input the same commands with the diagonal first-direction sliding operation over the information display screen 12A by turning the thumb of the dominant hand (right hand or left hand) with the base of the thumb as a pivot, so as to draw an arc.

It should be noted that with the portable player device 10, in the event that the placement positions of icons, text, etc, indicating commands which can be input within the display screen, differ due to the display form of the display screen as to the information display screen 12A, the position of the corresponding regions on the information display screen 12A also change. Accordingly, with the portable player device 10, even in the event that the display form of the display screen to be displayed on the information display screen 12A is changed, the user can easily recognize the predetermined regions on the information display screen 12A to touch with the thumb, following the position of the icons, text, and so forth, displayed on the display screen, and perform tap operations, long hold operations, and so forth.

(2-2) Circuit Configuration of Portable Player Device

Figure 15:
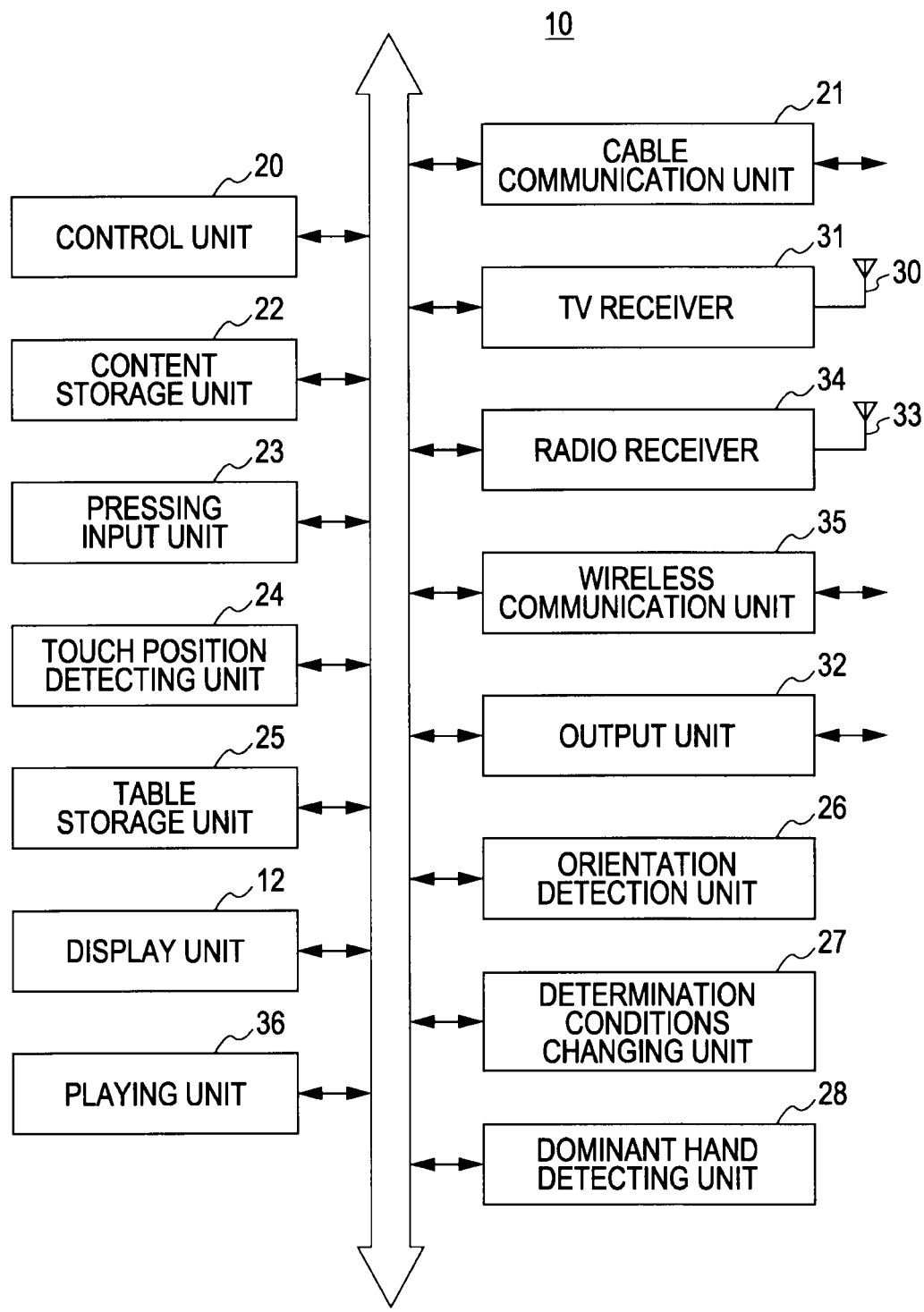
FIG. 15 is a block diagram illustrating the hardware circuit configuration of the portable player device, in the form of function circuit blocks.

Next, the hardware circuit configuration for functional circuit blocks of the portable player device 10 will be described with reference to FIG. 15. With the portable player device 10, in the event that the portable player device 10 is connected to an unshown external computer device by cable for example, a control unit 20 functions subordinately to the computer device which functions dominantly.

Accordingly, in the event that audio data (hereinafter also referred to as "music data") and music-related information related to the music data are transferred to the control unit 20 from the computer device, the control unit 20 inputs the transferred music data and music-related information via a cable communication unit 21. The control unit 20 then sends the music data and music-related information to a content storage unit 22, so as to store the music data and music-related information in the content storage unit 22 in a correlated manner.

The music-related information includes information such as identification information unique to corresponding music data, the tune title of a tine based on the music data, the artist name thereof, the genre to which the tune belongs, the album title of the album in which the tune is included, and so on.

In addition to this, the music-related information also includes information such as image data of jacket images of the album in which the tune based on the corresponding music data is included (herein after also referred to as "jacket image data"), play time of the music data, data format, and so forth.

Also, in the event that a playlist, which stipulates the play order of music data generated by registering identification information unique to music data in a desired order, is transferred from the computer device, the control unit 20 inputs the transferred playlist via the cable communication unit 21. The control unit 20 then sends the playlist to the content storage unit 22, thereby storing the playlist in the content storage unit 22.

Further, in the event that video data of a video or the like, and video-related information relating to the video data are transferred from the computer device, the control unit 20 inputs the transferred video data and video-related information via the cable communication unit 21. The control unit 20 then sends the video data and video-related information to the content storage unit 22, thereby storing the video data and video-related information in a correlated manner in the content storage unit 22. Note that video-related information includes information such as video title of the video based on the corresponding video data, play time of the video data, data format, and so forth.

Further, in the event that photograph image data, and photograph-related information relating to the photograph image data are transferred from the computer device, the control unit 20 inputs the transferred photograph image data and photograph-related information via the cable communication unit 21. The control unit 20 then sends the photograph image data and photograph-related information to the content storage unit 22, thereby storing the photograph image data and photograph-related information in a correlated manner in the content storage unit 22. Note that photograph-related information includes information such as photograph image title of the photograph image based on the corresponding photograph image data, data format of the photograph image, and so forth.

Now, in the event that the portable player device 10 is disconnected from the computer device, the control unit 20 controls the overall portable player device 10 in accordance with pressing operations of operating buttons, and touch operations performed on the information display screen 12A, and also executes various types of processing. In fact, the portable player device 10 is provided with a pressing input unit 23 including operating buttons, and upon an operating button being pressed, the pressing input unit 23 sends various types of commands corresponding to the pressing operations to the control unit 20. Accordingly, the control unit 20 can execute various types of processing following commands input in accordance with pressing operations of the operating buttons.

Also, the portable player device 10 has the above-described touch panel 13, and is provided with a touch position detecting unit 24 for detecting the touch position on the information display screen 12A (i.e., the position of the thumb touching in a touch operation) via the touch panel 13.

Further, the portable player device 10 is also provided with a table storage unit 25 which stores beforehand a data table used for detecting commands input by the touch operations (hereinafter may be referred to as "type determination table").

The type determination table is generated corresponding to various display forms, such as displaying individual screens on the information display screen 12A of the display unit 12 independently, displaying one or multiple menu icons and the like superimposed on a predetermined display screen, and so on. In practice, the type determination table generated by correlating the types of touch operations which can be used for input of commands in the display state corresponding to the information display screen 12A, conditions for determination the types of touch operations, and commands input by the touch operations.

Note that in the following description, conditions for determining touch operations will also be referred to as "determination conditions". Determination conditions are stipulated by combining various requisites. In the following description, various requisites stipulating the determination conditions will also be referred to as "condition-stipulating requisites". One condition-stipulating requisite is the allowed time for duration of time over which a touch operation is continued (i.e., the time period over which the thumb continues to be in contact with the information display screen 12A for one touch operation, also referred to as "touch operation duration time"), which may be referred to as "operation duration allowance time".

The operation duration allowance time for the touch operation duration time serving as a condition-stipulating requisite is indicated in terms of, for example, less than a comparative reference time which is a preset duration of a second or shorter, or the comparative reference time or longer.

Another condition-stipulating requisite is a direction detection angle range for detecting the direction in which the thumb has moved while remaining in touch with the information display screen 12A (hereinafter may be referred to as "thumb motion direction"). Note that the direction detection angle range serving as a condition-stipulating requisite has as the center angle thereof an angle as to an X-axis parallel to the main unit width direction, which orthogonally intersects a Y-axis orthogonal to the main unit width direction, on a reference line segment originating at the point of origin of the two axes and extending in the thumb motion direction. The direction detection angle range which is a condition-stipulating requisite is indicated in terms of minimum angle and maximum angle the angle as to the X-axis, in the same way as the reference line segment.

Yet another condition-stipulating requisite is the position of the operation start touch region where the thumb is touched at the touch operation start point on the information display screen 12A. The operation start touch region is indicated in terms of coordinates as to the aforementioned two axes, for example.

Yet another condition-stipulating requisite is the position of a predetermined region where the thumb should be last touching on the information display screen 12A when the thumb is removed from the information display screen 12A due to ending a touch operation (hereinafter also referred to as "operation end touch region"). The operation end touch region serving as a condition-stipulating requisite indicated in terms of coordinates as to the aforementioned two axes, in the same way as with the above operation start touch region for example, or is stipulated as a position facing a predetermined portion of the display screen that corresponds thereto.

The determination conditions for determining the above tap operations and long hold operation are stipulated by a combination of the operation duration allowance time as to the touch operation duration time, and the position of the operation end touch region. Also, the determination conditions for determining the above screen-left-direction sliding operation, screen-right-direction sliding operation, screen-down-direction sliding operation, and screen-up-direction sliding operation, are stipulated only by the direction detection angle range, for example. Note that in the following description, the screen-left-direction sliding operation, screen-right-direction sliding operation, screen-up-direction sliding operation, and screen-down-direction sliding operation, may be collectively referred to as "screen sliding operation" if these do not have to be individually distinguished.

Further, the determination conditions for determining the above-described diagonal first-direction sliding operation are stipulated by a combination of the position of operation start touch region and the direction detection angle range. Also, the determination conditions for determining the above-described diagonal second-direction sliding operation are stipulated by a combination of the display state on the information display screen 12A and the direction detection angle range.

Now, in the case of the first embodiment, the operation start touch region where the thumb is touched when the diagonal first-direction sliding operation is started is also used as an operation end touch region of a tap operation for inputting a particular command, as described later. Thus, it can be seen that individual determination conditions are stipulated by one of, or a combination of multiple, various types of condition-stipulating requisites.

Now, with the control unit 20, the holding orientation of the main unit 11 when the portable player device 10 is used is set to the vertical holding orientation, and the dominant hand with which the main unit 11 is held in the vertical holding orientation is the right hand. Moreover, with the control unit 20, the display form of the display screen on the information display screen 12A of the display unit 12 is set to the normal display form, in accordance with these settings of the holding orientation.

Accordingly, the individual determination conditions described in the type determination table are, in the initial state, stipulated to be capable of determining the types of touch operations in the event that the main unit 11 is held in the vertical holding orientation by the right hand as the dominant hand. However, in the event that the user performs an optional button operation or touch operation to input a screen display command for displaying a setting screen, the control unit 20 displays a setting screen (not shown) on the information display screen 12A of the display unit 12.

The control unit 20 allows the user to select and specify one of the vertical holding orientation, right-handed horizontal holding orientation, and left-handed horizontal holding orientation, as the holding orientation to use for actually holding the main unit 11, on the setting screen. In the event that the user has specified the vertical holding orientation as the holding orientation of the main unit 11, the control unit 20 allows the user to select and specify the dominant hand to actually hold the main unit 11 in the vertical holding orientation from the right hand and left hand.

Upon the holding orientation of the main unit 11, and the dominant hand for holding the main unit 11, are specified, the control unit 20 changes the settings regarding the holding orientation and the settings regarding the dominant hand that had been set so far, with the holding orientation and dominant hand specified by the user. Thus, the control unit 20 can change the settings regarding the holding orientation and the settings regarding the dominant hand, by allowing the user to set the holding orientation and dominant hand.

That is to say, in the event that the user specifies vertical holding orientation as the holding orientation, and specifies the right hand as the dominant hand, the control unit 20 changes the settings for the holding orientation to vertical holding orientation, and changes the settings for the dominant hand to the right hand. Also, in the event that the user specifies vertical holding orientation as the holding orientation, and specifies the left hand as the dominant hand, the control unit 20 changes the settings for the holding orientation to vertical holding orientation, and changes the settings for the dominant hand to the left hand.

Further, in the event that the user specifies the right-handed horizontal holding orientation as the holding orientation, and specifies the right hand as the dominant hand, the control unit 20 changes the settings for the holding orientation to the right-handed horizontal holding orientation, and changes the settings for the dominant hand to the right hand. Moreover, in the event that the user specifies the left-handed horizontal holding orientation as the holding orientation, and specifies the left hand as the dominant hand, the control unit 20 changes the settings for the holding orientation to the left-handed horizontal holding orientation, and changes the settings for the dominant hand to the left hand.

Upon changing the settings of the holding orientation, the control unit 20 changes the settings of the display form of the display screen on the information display screen 12A to the one of the vertical holding orientation, right-handed horizontal holding orientation, and left-handed horizontal holding orientation, corresponding to the settings of the holding orientation.

Additionally, an orientation detection unit 26 monitors whether or not there has been change in the settings of the holding orientation of the main unit 11 set by the control unit 20. In the event that the orientation detection unit 26 detects change in the settings of the holding orientation as a result of the monitoring, the orientation detection unit 26 notifies a determination conditions changing unit 27 of the holding orientation following the change.

Also, a dominant hand detecting unit 28 monitors whether or not there has been change in the settings of the dominant hand set by the control unit 20. In the event that the dominant hand detecting unit 28 detects change in the settings of the dominant hand as a result of the monitoring, the dominant hand detecting unit 28 notifies the determination conditions changing unit 27 of the dominant hand following the change.

The holding orientation and dominant hand may not be simultaneously changed in all cases, so the determination conditions changing unit 27 receives notification regarding the holding orientation and dominant hand from the orientation detection unit 26 and dominant hand detecting unit 28 at the same timing, or at different timings.

Upon the determination conditions changing unit 27 receiving notification regarding the holding orientation and dominant hand from the orientation detection unit 26 and dominant hand detecting unit 28 at the same timing, the determination conditions changing unit 27 changes the determination conditions described in the type determination table, based on the notified holding orientation and dominant hand following change. Also, the determination conditions changing unit 27 receiving notification regarding the holding orientation and dominant hand from the orientation detection unit 26 and dominant hand detecting unit 28 at different timings, the determination conditions changing unit 27 changes the determination conditions described in the type determination table, based on the notified holding orientation or dominant hand following change.

In actual use, the determination conditions changing unit 27 changes the determination conditions of the screen sliding operations so as to re-stipulate the direction detection angle range which is a condition-stipulating requisite for determining screen sliding operations, based on the holding orientation or dominant hand following change.

Also, the determination conditions changing unit 27 changes the determination conditions of the diagonal first-direction sliding operation so as to change the position of the operation start touch region and re-stipulate the direction detection angle range, which are condition-stipulating requisites for determining the diagonal first-direction sliding operation, based on the holding orientation or dominant hand following change. Further, the determination conditions changing unit 27 changes the determination conditions of the diagonal second-direction sliding operation so as to re-stipulate the direction detection angle range, which is a condition-stipulating requisites for determining the diagonal second-direction sliding operation, based on the holding orientation or dominant hand following change.

Thus, the determination conditions changing unit 27 appropriately changes the determination conditions for determining the types of touch operations in the type determination table, in accordance with the holding orientation of the main unit 11 and the dominant hand of the user. Accordingly, the determination conditions changing unit 27 is capable of enabling the control unit 20 to accurately determine the type of touch operation performed on the information display screen 12A with the main unit 11 being held.

In actual use, in the event that a touch operation is performed on the information display screen 12A of the display unit 12 by the thumb of the user via the touch panel 13, the touch position detecting unit 24 periodically detects the touch position on the information display screen 12A while the thumb is in contact with the information display screen 12A due to the touch operation. Also, each time a touch position is detected, the touch position detecting unit 24 generates touch position detection data represented in terms of coordinates (i.e., X-coordinate and Y-coordinate) based on the above-described two axes, for the detected touch position.

The touch position detecting unit 24 sends the generated touch position detection data to the control unit 20 each time the touch position detection data is generated as long as the thumb is in contact with the information display screen 12A of the display unit 12 due to the touch operation. This means that the touch position detecting unit 24 generates touch position detection data each time a touch operation is performed on the information display screen 12A of the display unit 12, and sends the generated touch position detection data to the control unit 20. Thus, each time the display state is changed for the information display screen 12A of the display unit 12, the control unit 20 comprehends the display state following change.

In this state, upon touch position detection data being provided from the touch position detecting unit 24, the control unit 20 determines the type of touch operation performed at that time based on the touch position detection data, and performs type determination processing to detect the input command.

At this time, the control unit 20 starts clocking the touch operation duration time, with the point-in-time at which the touch position detection data was provided from the touch position detecting unit 24 as the touch operation start point-in-time. Also, the control unit 20 times the touch operation duration time up to the touch operation end point-in-time where input of the touch position detection data from the touch position detecting unit 24 in accordance with one touch operation is completed (i.e., ends clocking of the touch operation duration time at the touch operation end point-in-time).

Also, from the touch operation start point-in-time to the touch operation end point-in-time, the control unit 20 detects the course of displacement in the touch position with the touch position at the touch operation start point-in-time as the originating point, based on the touch position detection data provided from the touch position detecting unit 24. Note that in the following detection, the course of displacement of touch position may be referred to as "touch course". Also, in the following description, the touch position at the touch operation start point-in-time, serving as a starting point for detection of the touch course, may also be referred to as "start point-in-time touch position".

Further, from the touch operation start point-in-time to the touch operation end point-in-time, the control unit 20 detects the touch course and also sequentially detects the distance between the start point-in-time touch position the touch course currently being detected, and other individual touch positions. Note that in the following description the distance between the start point-in-time touch positions sequentially detected following the touch course and other individual touch positions will be referred to as "touch displacement amount".

Also, while sequentially detecting the touch displacement amounts following the touch course, the control unit 20 detects one touch displacement amount of the detected multiple touch displacement amounts which is the longest (hereinafter, also referred to as maximum displacement amount"), and updates as appropriate. That is to say, while detecting the touch course, the control unit 20 detects the maximum displacement amount between the start point-in-time touch position on the touch course, and another touch position farthest from this, and updates as appropriate.

Additionally, upon the type determination processing being started, the control unit 20 reads a type determination table corresponding to the display state on the information display screen 12A at this time, from the table storage unit 25. Based on this type determination table, the control unit 20 determines whether or not the diagonal first-direction sliding operation can be executed for command input, based on whether or not determination conditions for determination of diagonal first-direction sliding operations are included in the type determination table, and if not included, determines that no diagonal first-direction sliding operations can be executed for command input.

The control unit 20 then compares the touch operation duration time, regarding which clocking had been started at the touch operation start point-in-time, with a comparison reference time. Upon the clocking of the touch operation start point-in-time ending before the comparison reference time arrives, there is a possibility that the touch operation may be a tap operation, so the control unit 20 detects whether or not the type determination table includes determination conditions for determination of tap operations. In the event that the type determination table includes determination conditions for determination of tap operations, the control unit 20 compares the touch position of the touch operation end point-in-time with the position of the operation end touch region included in determination conditions for determination of tap operations. Note that in the following description, the touch position of the touch operation end point-in-time where the clocking of the touch operation duration time has ended may also be referred to as "end point-in-time touch position".

In the event that the result of the comparison shows that the end point-in-time touch position is a position within the operation end touch region, the control unit 20 determines that the touch operation performed for command input at this time is a tap operation stipulated by determination conditions including the operation end touch region. Accordingly, the control unit 20 detects a command correlated with the determined tap operation as a command input by the user at this time, based on the type determination table.

Note that in the event that determination conditions for tap operation determination are not included in the type determination table at this time, the control unit 20 judges that no tap operation has been performed on the information display screen 12A. Also, even in the event that determination conditions for tap operation determination are included in the type determination table at this time, if the end point-in-time touch position is a position outside of the operation end touch region, the control unit 20 judges that no tap operation has been performed on the information display screen 12A.

On the other hand, in the event that the touch operation duration time exceeds the comparison reference time, the control unit 20 continues clocking of the touch operation duration time, and compares the maximum displacement amount being detected and appropriately updated at this time with a markedly short comparison reference displacement amount set beforehand.

In the event that the result of the comparison shows that the maximum displacement amount detected up to the touch operation end point-in-time is shorter than the comparison reference displacement amount, the touch operation at this time may be a long hold operation, so the control unit 20 detects whether or not the type determination table includes determination conditions for long hold operations. In the event that the type determination table includes determination conditions for long hold operations, the control unit 20 compares the end point-in-time touch position with the position of the operation end touch region included in the determination conditions for determination of long hold operations.

In the event that the end point-in-time touch position is within the operation end touch region, the control unit 20 determines that the touch operation performed for command input at this time is a long hold operation stipulated with determination conditions including the operation end touch region. Accordingly, the control unit 20 detects the command correlated with the long hold operation that has been determined as the command input by the user at that time, based on multiple type determination tables.

Note that in the event that determination conditions for long hold operation determination are not included in the type determination table at this time, the control unit 20 judges that the user has erroneously touched the information display screen 12A with the thumb or another finger, and that no long hold operation or other touch operation has been performed. Also, even in the event that determination conditions for long hold operation determination are included in the type determination table at this time, if the end point-in-time touch position is a position outside of the operation end touch region, the control unit 20 judges that no long hold operation or tap operation has been performed on the information display screen 12A.

Moreover, in the event that a maximum displacement amount of the comparative reference displacement amount or longer is detected up to the touch operation end point-in-time in a state wherein the touch operation duration time has exceeded the comparison reference time, the touch operation at this time may be a diagonal second-direction sliding operation, so the control unit 20 detects whether or not the type determination table includes determination conditions for determining diagonal second-direction sliding operations. In the event that the type determination table includes determination conditions for determining diagonal second-direction sliding operations, the control unit 20 obtains a line segment connecting the start point-in-time touch position used for maximum displacement amount detection and another one touch position. Note that in the following description, the line segment connecting the start point-in-time touch position used for maximum displacement amount detection and another one touch position may also be referred to as "inter-touch-position line segment".

The control unit 20 performs coordinate transformation of the inter-touch-position line segment so as to match the origin of the X-axis and Y-axis, and also detects the angle of the transformed inter-touch-position line segment as to the X-axis (hereinafter may be referred to as "inter-touch-position line segment angle"). The control unit 20 then compares the inter-touch-position line segment angle with the direction detection angle range included in the determination conditions for determination of diagonal second-direction sliding operations.

If the result of the comparison shows that the inter-touch-position line segment angle is within the direction detection angle range, the touch operation performed for command input is determined to be a diagonal second-direction sliding operation stipulated in the determination conditions including the direction detection angle range. Thus, the control unit 20 detects the command correlated with the diagonal second-direction sliding operation that has been determined as the command that has been input by the user at this time.

Now, in the event that no determination conditions for determination of the diagonal second-direction sliding operation are included in the type determination table at this time, this touch operation may be a screen sliding operation, so the control unit 20 detects whether or not determination conditions for determination of screen sliding operations are included in the type determination table. Also, even in the event that determination conditions for determination of the diagonal second-direction sliding operation are included in the type determination table at this time, if the inter-touch-position line segment angle is not within the direction detection angle range, the control unit 20 detects whether or not determination conditions for determination of screen sliding operations are included in the type determination table. That is to say, upon determining that the touch operation at this time is not a diagonal second-direction sliding operation, the control unit 20 detects whether or not determination conditions for determination of screen sliding operations are included in the type determination table.

In the event that the results of the comparison show that determination conditions for determination of screen sliding operations are included in the type determination table, the control unit 20 obtains the inter-touch-position line segment and performs coordinate transformation as described above, and detects the inter-touch-position line segment angle of the transformed inter-touch-position line segment as to the X-axis. The control unit 20 then compares the inter-touch-position line segment angle with the direction detection angle range included in the detection conditions for detection of the screen sliding operations.

In the event that the result of the comparison shows that the inter-touch-position line segment angle is within the direction detection angle range, the control unit 20 determines that the touch operation performed for command input at this time is a screen sliding operation stipulated by determination conditions including the direction detection angle range. Accordingly, based on the type determination table, the control unit 20 detects the command correlated with the determined screen sliding operation to be the command input by the user at this time.

Note that in the event that determination conditions for screen sliding operation determination are not included in the type determination table at this time, the control unit 20 judges that the user has erroneously touched the information display screen 12A with the thumb or another finger, and that no touch operation has been performed. Also, even in the event that determination conditions for screen sliding operation determination are included in the type determination table at this time, if the inter-touch-position line segment angle outside of the direction detection angle range, the control unit 20 judges that no touch operation has been performed.

Now, in the event that determination conditions for determination of a diagonal first-direction sliding operation is included in the type determination table read out from the table storage unit 25 at the time of starting type processing, determination is made by the control unit 20 that a diagonal first-direction sliding operation can be executed as a touch operation for command input. In this case, the control unit 20 compares the start point-in-time touch position with the operation start touch region included in the determination conditions for determination of the diagonal first-direction sliding operation. In the event that the start point-in-time touch position is a position within the operation start touch region, there is a possibility that the touch operation may be either a diagonal first-direction sliding operation or a tap operation regarding which the operation start touch region is the operation end touch region, so the control unit 20 continues to compare the touch operation duration time with the comparative reference time.

As a result, upon the clocking of the touch operation duration time ending before reaching the comparative reference time, the control unit 20 determines that the touch operation performed for command input is a tap operation where the operation start touch region of the diagonal first-direction sliding operation is the operation end touch region. That is to say, the control unit 20 determines that the touch operation performed for command input at this time is a tap operation stipulated by determination conditions including the operation start touch region for the diagonal first-direction sliding operation as the operation end touch region. Accordingly, based on the type determination table, the control unit 20 detects the command correlated with the determined tap operation to be the command input by the user at this time.

On the other hand, in the event that the touch operation duration time exceeds the comparison reference time, the control unit 20 compares the maximum displacement amount being detected and appropriately updated at this time with the comparative reference displacement amount. In the event that the result of the comparison shows that the maximum displacement amount detected up to the touch operation end point-in-time is shorter than the comparative reference displacement amount, the control unit 20 judges that the thumb or other finger has erroneously touched the information display screen 12A, and that no touch operation has been performed.

Also, in the event that the control unit 20 detects a maximum displacement amount that is equal to or greater than the comparative reference displacement amount up to the touch operation end point-in-time in the state that the touch operation duration time has exceeded the comparative reference time, the inter-touch-position line segment is obtained and subjected to coordinate transformation in the same way as described above, and also the inter-touch-position line segment angle as to the X-axis of the transformed inter-touch-position line segment angle is detected.

The control unit 20 then compares the inter-touch-position line segment angle with the direction detection angle range included in the determination conditions for determination of the diagonal first-direction sliding operation. As a result of the comparison, in the event that the inter-touch-position line segment angle is within the direction detection angle range, the control unit 20 determines that the touch operation performed for command input at this time is the diagonal first-direction sliding operation.

Thus, the control unit 20 detects the command correlated with the determined diagonal first-direction sliding operation to be the command input by the user at that time. Note that at this time, in the event that the inter-touch-position line segment angle is an angle outside of the direction detection angle range for determination of the diagonal first-direction sliding operation, the control unit 20 determines that the thumb or finger has erroneously touched the information display screen 12A, and that no touch operation has been performed.

In this way, the control unit 20 determines the type of touch operation performed as to the information display screen 12A, and also detects the command input by this touch operation in accordance with the determination results. Upon detecting a command input by a touch operation, the control unit 20 executes various types of processing following the detected commands (i.e., input by user touch operations).

In actual use, upon various commands being input by pressing operations of operation buttons, and touch operations on the information display screen 12A, television broadcast reception functions, image recording functions, radio broadcast reception functions, audio recording functions, and so on, are realized accordingly.

Also, the control unit 20 also realizes browser functions for obtaining various types of information from an information providing device (not shown) on the Internet and allowing browsing thereof, purchasing functions for searching and purchasing desired music data form the information providing device on the Internet, data playing functions for playing various types of data, and so forth.

In actual use, in the event that a function selection command is input by a touch operation on the information display screen 12A to select a television broadcast reception function, the television broadcast reception function is executed. In this case, the control unit 20 receives television broadcast airwaves including multiple programs being broadcast from multiple television stations, with a television antenna 30, and inputs to a television receiver 31.

The television receiver 31 extracts video data of a television program which the user has selected from the television broadcast airwaves, subjects to predetermined reception processing, and sends video data of the program and audio data of the program that are obtained as a result thereof, to the control unit 20. The control unit 20 sends, of the video data and audio data provided from the television receiver 31, the video data to the display unit 12, thereby displaying the program video based on the video data on the information display screen 12A. The control unit 20 also sends the audio data to a speaker or headphone (not shown) connected wirelessly or by cable to the portable player device 10 by way of the output unit 32, thereby outputting program audio based on the audio data form the speaker or headphone. Thus, the control unit 20 enables the user to view and listen to a desired television program being broadcast from a desired television station.

Now, upon a function selection command for selecting a function for recording a television broadcast, by a touch operation on the information display screen 12A while receiving the television broadcast, for example, the control unit 20 executes recording processing of the television broadcast while receiving the television broadcast. In this case, the user continues to view and listen to the television program as described above, while the control unit 20 generates recording program related information including program title, date-and-time of broadcast corresponding to the video data and audio data provided from the television receiver 31 at this time.

While the user continues to view and listen to the television program, the control unit 20 sends the video data and audio data provided from the television receiver 31 to the content storage unit 22, along with the corresponding recorded program related information. Thus, the control unit 20 can record the television program in the content storage unit 22 by recording the video data and audio data in a correlated manner with the recorded program related information.

Also, in the event that a function selection command is input by a touch operation on the information display screen 12A to select a radio broadcast reception function, the radio broadcast reception function is executed. In this case, the control unit 20 receives radio broadcast airwaves including multiple programs being broadcast from multiple radio stations, with a radio antenna 33, and inputs to a radio receiver 34.

The radio receiver 34 extracts radio broadcast signals of a broadcast frequency corresponding to the radio station selected by the user from the radio broadcast airwaves, subjects to predetermined reception processing and sends the audio data of the program audio of the radio program obtained thereby to the control unit 20. The control unit 20 sends the audio data provided from the radio receiver 34 to a speaker or headphone via the output unit 32 in the same way as described above, thereby outputting program audio based on the audio data from the speaker or headphone. Thus, the control unit 20 enables the user to listen to a desired radio program being broadcast from a desired radio station.

Now, upon a function selection command for selecting a function for recording a radio broadcast, by a touch operation on the information display screen 12A while receiving the radio broadcast, for example, the control unit 20 executes recording processing of the radio broadcast while receiving the radio broadcast. In this case, the user continues to listen to the radio program as described above, while the control unit 20 generates recording program related information including program title, date-and-time of broadcast corresponding to the audio data provided from the radio receiver 34 at this time.

While the user continues to listen to the radio program, the control unit 20 sends the audio data provided from the radio receiver 34 to the content storage unit 22, along with the corresponding recorded program related information. Thus, the control unit 20 can record the television program in the content storage unit 22 by recording the audio data in a correlated manner with the recorded program related information.

Also, in the event that a function selection command is input by a touch operation on the information display screen 12A to select an information browsing function, information browsing processing is executed accordingly. In this case, the control unit 20 generates search request data requesting a search for desired information, the search request data storing, as a search key, at least a part of information included in the above-described music-related information, video-related information, and photograph-related information, for example. The control unit 20 then transmits the search request data to the information providing device on the Internet, via the closest access point, by the wireless communication unit 35.

As a result, upon desired information being transmitted from the information providing device via the access point in response to the search key included in the search request data, the control unit 20 receives and inputs the desired information by the wireless communication unit 35. The control unit 20 then sends this desired information to the display unit 12, so as to be displayed on the information display screen 12A.

Thus, the control unit 20 can obtain from the information providing device, for example, albums of music of a predetermined artist, various types information such as information on magazines, photograph collections, or the like of the artist, and so forth, searched using the search key, and present these to the user.

Also, in a state wherein information showing an album, that has been obtained from the information presenting device, is displayed on the information display screen 12A for example, upon the user selecting a desired album for purchasing by a touch operation on the information display screen 12A, music data purchasing processing can be performed accordingly. In this case, the control unit 20 generates purchase request data requesting purchasing of the music data selected by the user for the album, and then transmits the generated purchase request data to the information providing device on the Internet, via the closest access point, by the wireless communication unit 35.

As a result, upon the billing processing regarding purchasing of the music data from the information processing device being completed, and the music data and music-related information corresponding thereto being transmitted via the access point, the control unit 20 receives and inputs the music data and music-related information by the wireless communication unit 35. The control unit 20 then sends the music data and music-related information to the content storage unit 22, thereby storing the music data and music-related information in a correlated manner in the content storage unit 22. Thus, the control unit 20 can purchase music data from the information providing device, and store and hold in the content storage unit 22.

Also, in the event that a function selection command is input by a touch operation on the information display screen 12A to select a data playing function for playing data, the data playing function is executed accordingly. In this case, the control unit 20 generates selection screen data for a selection screen from which the user can select data to be played, in accordance with the type of data selected by the user, based on the related information such as the above-described music-related information or video-related information corresponding to the type of data.

The control unit 20 displays the selection screen based on the selection screen data on the information display screen 12A by sending the selection screen data to the display unit 12, so as to present to the user the various types of data which can be selected for playing, in the form of title information such as the aforementioned music title, video title, and so forth.

In the event that desired data is selected by touch operation on the information display screen 12A in this state, such that a play command is input, the control unit 20 reads out the selected data form the content storage unit 22 and sends to the playing unit 36. The playing unit 36 subjects the data provided from the control unit 20 at this time to predetermined playing processing, such as decoding processing, error correction processing, and so forth.

In the event that the data obtained by playing processing is image or video data, the playing unit 36 then displays images of video based on the image or video data (video, program video, photograph images, etc.) on the information display screen 12A by sending the image or video data to the display unit 12. Also, in the event that the data obtained by playing processing is audio data, the playing unit 36 then sends the audio data to the speaker or headphone via the output unit 32 in the same way as described above, so as to output audio based on the audio data (music, program audio, etc.) from the speaker or headphone. Thus, the control unit 20 can play various types of data such as audio data, video data and audio data of television programs, and so forth, stored in the content storage unit 22, which the user and view and listen to.

Next, multiple display screens displayed on the information display screen 12A of the display unit 12, and touch operations which can be executed for command input to the information display screen 12A displaying these display screens, will be described in detail, with reference to an example of data playing processing wherein music data is played. Note that in the following description, we will assume an arrangement wherein the main unit 11 is held by the right hand as the dominant hand in the vertical holding orientation, as an example.

The control unit 20 has configured within the content storage unit 22 a database for registering and managing music data (hereafter, this may be referred to as a "management database"). In actual use, upon storing the music data in the content storage unit 22 along with the music-related information as described above, the control unit 20 classifies the music data by genre based on the music-related information, classifies each genre by artist, and classifies each artist by album.

Also, the control unit 20 generates music management information wherein artist names are correlated with genres, album titles are correlated with artist names, and further music titles are correlated with album titles, so as to show a hierarchal classification of the music data. Further, the control unit 20 stores the music management information in the content storage unit 22 by sending the music management information to the content storage unit 22 so as to be registered in the management database.

Thus, the control unit 20 updates the contents of the music management information based on the stored music-related information, each time music data transferred from the computer device or music data that has been purchased is stored along with the music-related information. Thus, the control unit 20 can manage all music data stored in the content storage unit 22 based on the music management information registered in the management database.

In this state, upon a function selection command for selecting the data playing function for playing music data being input, the control unit 20 reads out the music management information from the content storage unit 22, and also reads out jacket image data included in the music-related information.

Also, the control unit 20 generates a genre list showing multiple genres in alphabetical order, based on the music management information. Further, the control unit 20 generates an artist list showing multiple artist names, correlated with the genres, in alphabetical order. Moreover, the control unit 20 generates an album list showing multiple album titles, correlated with the artist names, in alphabetical order, based on the music management information.

Also, the control unit 20 generates a music title list wherein multiple music titles correlated with the album titles are shown in the playing order of the corresponding music data (the playing order determined beforehand for the album), for each album title, based on the music management information. Further, the control unit 20 generates display screen data for a display screen whereby the user can select a desired genre in a list mode which serves as a display mode based on a genre list and jacket image data. Note that in the following description, a display screen whereby the user can select a desired genre may be referred to as "genre selection screen", and display image data on the genre selection screen may be referred to as "genre selection screen data".

Figure 16:
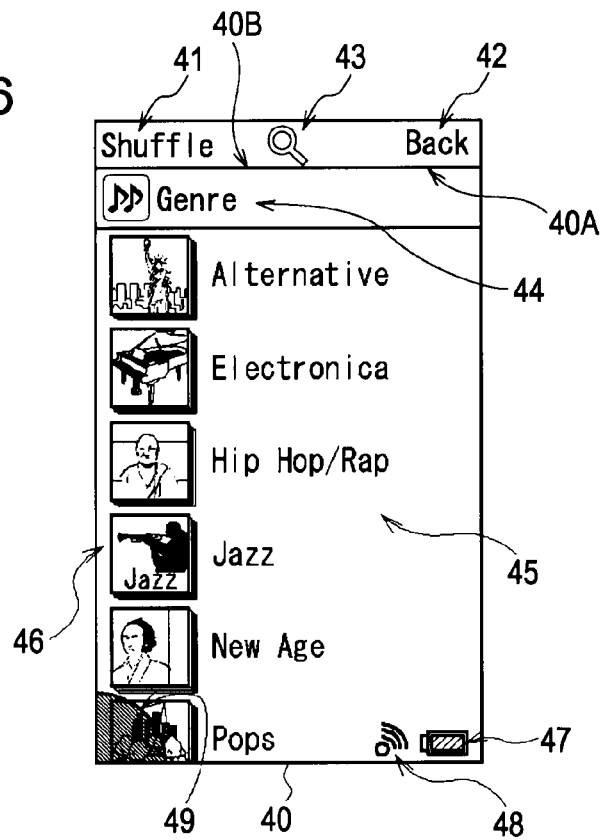
FIG. 16 is an outline drawing illustrating the configuration of a genre selection screen in a list mode.

The control unit 20 then sends the genre selection screen data to the display unit 12, thereby displaying a genre selection screen 40 such as shown in FIG. 16 on the information display screen 12A, based on the genre selection screen data.

The genre selection screen 40 is provided with a band-shaped command notification portion 40A at the upper side of the screen, parallel with the horizontal direction of the screen, and also is provided with a list display portion 40B below the command notification portion 40A on the screen. The command notification portion 40A of the genre selection screen 40 has two types of text strings 41 and 42 indicating commands which can be input by tap operations while the genre selection screen 40 is being displayed, and one icon 43.

In actual use, the command notification portion 40A has displayed therein a text string 41 indicating a shuffle playing command, for playing all music data stored in the content storage unit 22 for example, in a playing order where the predetermined order has been randomly reordered. The command notification portion 40A also has displayed therein a text string 42 indicating a back command for returning the display state of the information display screen 12A to a display state to that one previous to the current display state. Further, the command notification portion 40A has displayed therein an icon 43 indicating an initial search for searching a desired genre from multiple genres by the initial of the genre (hereinafter may be referred to as "initial search icon").

On the other hand, a list title 44 indicating the type of list to be presented to the user on the genre selection screen 40 is displayed at the list display portion 40B of the genre selection screen 40, toward the upper side of the screen. Also, the list display portion 40B of the genre selection screen 40 has multiple genres 45 displayed in list format arrayed in alphabetical order for example, toward the bottom of the screen.

Moreover, the list display portion 40B of the genre selection screen 40 has one or multiple jacket photograph images 46 displayed next to each genre 45, corresponding respectively. Note that in the event that there are multiple jacket photograph images 46 corresponding to a genre 45, the jacket photograph images 46 are displayed overlapping and slightly shifted, so as to give an impression of being stacked. Thus, the user can intuitively recognize whether there are many or few albums corresponding to each genre 45 (i.e., how many albums there are of music belonging to each genre), on the genre selection screen 40.

Further, the list display portion 40B of the genre selection screen 40 has an icon 47 indicating the remaining battery of the portable player device 10, and an icon 48 indicating the intensity of airwaves received by the wireless communication unit 35, both icons being displayed at the lower side of the screen. Note that in the following description, the icon 47 indicating the remaining battery may be referred to as "remaining battery notification icon 47", and the icon 48 indicating the intensity of airwaves may be referred to as "intensity notification icon 48".

Further, with the portable player device 10, in the event that the genre selection screen 40 is displayed on the information display screen 12A, a diagonal first-direction sliding operation can be performed on the information display screen 12A. Accordingly, a touch region notification portion 49 is provided in a fan shape, coming into contact with the left edge of the screen and the bottom edge of the screen, to serve for notification of an operation start touch region. This touch region notification portion 49 is indicated by a color different from other portions. Thus, with the genre selection screen 40, the touch region notification portion 49 enables the user to be notified on the information display screen 12A that a predetermined region corresponding to the touch region notification portion 49 is an operation start touch region for diagonal first-direction sliding operations.

Further, with the portable player device 10, in the event that the genre selection screen 40 is displayed independently on the information display screen 12A, the user can place the thumb on a portion of the information display screen 12A excluding the operation start touch region, so as to perform screen up-direction sliding operations and screen down-direction sliding operations. In the event that a screen up-direction sliding operation is performed on the information display screen 12A while the genre selection screen 40 is displayed so as to input an upward scroll command, the list of genres 45 is scrolled upwards, along with the jacket photograph images 46. Also, in the event that a screen down-direction sliding operation is performed on the information display screen 12A while the genre selection screen 40 is displayed so as to input a downward scroll command, the list of genres 45 is scrolled downwards, along with the jacket photograph images 46. Accordingly, the control unit 20 can move genres 45 and jacket photograph images 46 already displayed on the genre selection screen 40 off of the screen, and instead display genres 45 and jacket photograph images 46 which had not been displayed so far.

Further, with the portable player device 10, each predetermined region corresponding to the display portions of the sets of genre 45 and jacket photograph image 46 on the information display screen 12A (excluding the operation start touch region) is set as an operation end touch region for command input tap operations. With the portable player device 10, in the event that the genre selection screen 40 is displayed independently, and an operation end touch region corresponding to the display portion of a set of genre 45 and jacket photograph image 46 on the information display screen 12A is tapped, a selection command for selecting that genre 45 can be input.

In the event that a tap operation is performed in the state that the genre selection screen 40 is displayed on the information display screen 12A and a selection command for a desired genre 45 is input, the control unit 20 generates display image data in a list mode serving as a display mode, based on an artist list and jacket image data corresponding to the genre 45 selected by the user. That is to say, at this time the control unit 20 generates display screen data of a display screen for allowing the user to select a desired artist. This display screen may be referred to as "artist selection screen", and this display screen data may be referred to as "artist selection screen data".

Figure 17:
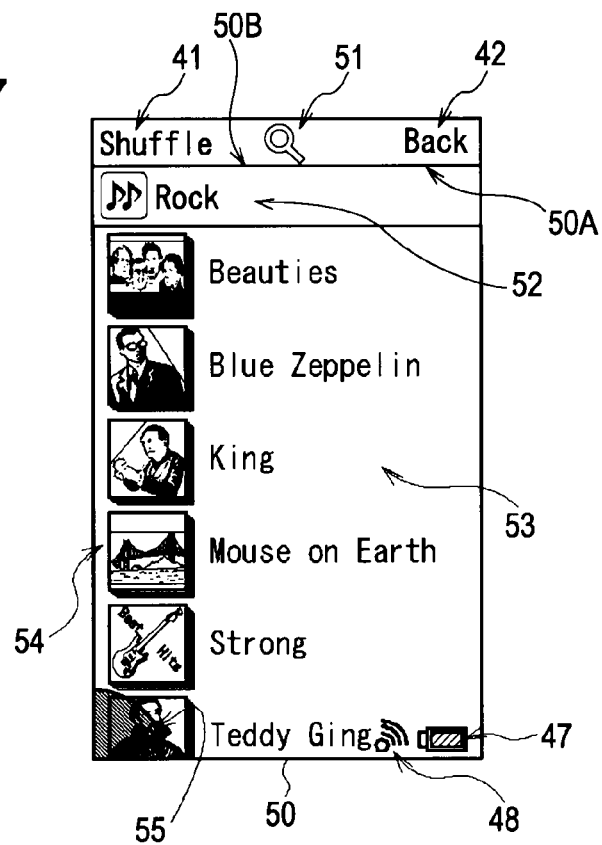
FIG. 17 is an outline drawing illustrating the configuration of an artist selection screen in the list mode.

The control unit 20 then sends the artist selection screen data to the display unit 12, so as to display an artist selection screen 50 on the information display screen 12A such as shown in FIG. 17 based on the artist selection screen data, instead of the genre selection screen 40. The artist selection screen 50 is provided with a band-shaped command notification portion 50A at the upper side of the screen, parallel with the horizontal direction of the screen, and also is provided with a list display portion 50B below the command notification portion 50A on the screen.

The command notification portion 50A on the artist selection screen 50 is provided with text strings 41 and 42, in the same way as with the above-described genre selection screen 40. Also, the command notification portion 50A displays an initial search icon 51 indicating an initial search command for searching a desired artist name from multiple artist names corresponding to the genre 45 selected by the user on the genre selection screen 40 which is one screen back, based on the initials thereof.

On the other hand, the list display portion 50B of the artist selection screen 50 displays a list title 52 (e.g., genre 45 selected by the user) representing the type of list presented to the user on the artist selection screen 50, at the upper side of the screen. Also, the list display portion 50B of the artist selection screen 50 has multiple artist names 53 displayed in list format arrayed in alphabetical order for example, toward the bottom of the screen.

Moreover, the list display portion 50B of the artist selection screen 50 has one or multiple jacket photograph images 54 displayed next to each artist name 53, corresponding respectively. Note that in the event that there are multiple jacket photograph images 54 corresponding to an artist name 53, the jacket photograph images 54 are displayed overlapping and slightly shifted, so as to give an impression of being stacked. Thus, the user can intuitively recognize whether there are many or few albums corresponding to each artist name 53 (i.e., how many albums there are for each artist), on the artist selection screen 50.

Moreover, the remaining battery notification icon 47 and intensity notification icon 48 are displayed on the list display portion 50B of the artist selection screen 50 in the same way as with the above-described genre selection screen 40.

Also, with the portable player device 10, in the event that the artist selection screen 50 is displayed on the information display screen 12A, the user can perform diagonal first-direction sliding operations on the information display screen 12A. Accordingly, a touch region notification portion 55 is provided to the lower left corner of the artist selection screen 50, in the same way as with the above-described genre selection screen 40, and the touch region notification portion 55 is displayed in a color other than that of other portions.

Further, with the portable player device 10, in the event that the artist selection screen 50 is displayed independently on the information display screen 12A, the user can place the thumb on a portion of the information display screen 12A excluding the operation start touch region, so as to perform screen up-direction sliding operations and screen down-direction sliding operations. In the event that a screen up-direction sliding operation is performed on the information display screen 12A while the artist selection screen 50 is displayed so as to input an upward scroll command, the list of artist names 53 is scrolled upwards, along with the jacket photograph images 54. Also, in the event that a screen down-direction sliding operation is performed on the information display screen 12A while the artist selection screen 50 is displayed so as to input a downward scroll command, the list of artist names 53 is scrolled downwards, along with the jacket photograph images 54.

Further, with the portable player device 10, each predetermined region corresponding to the display portions of the sets of artist name 53 and jacket photograph image 54 on the information display screen 12A (excluding the operation start touch region) is set as an operation end touch region for command input tap operations. With the portable player device 10, in the event that the artist selection screen 50 is displayed independently, and an operation end touch region corresponding to the display portion of a set of artist name 53 and jacket photograph image 54 on the information display screen 12A is tapped, a selection command for selecting that artist name 53 can be input.

In the event that a tap operation is performed in the state that the artist selection screen 50 is displayed on the information display screen 12A and a selection command for a desired artist name 53 is input, the control unit 20 generates display image data in a list mode serving as a display mode, based on an album list and jacket image data corresponding to the artist name 53 selected by the user. That is to say, at this time the control unit 20 generates display screen data of a display screen for allowing the user to select a desired artist. This display screen may be referred to as "album selection screen", and this display screen data may be referred to as "album selection screen data".

Figure 18:
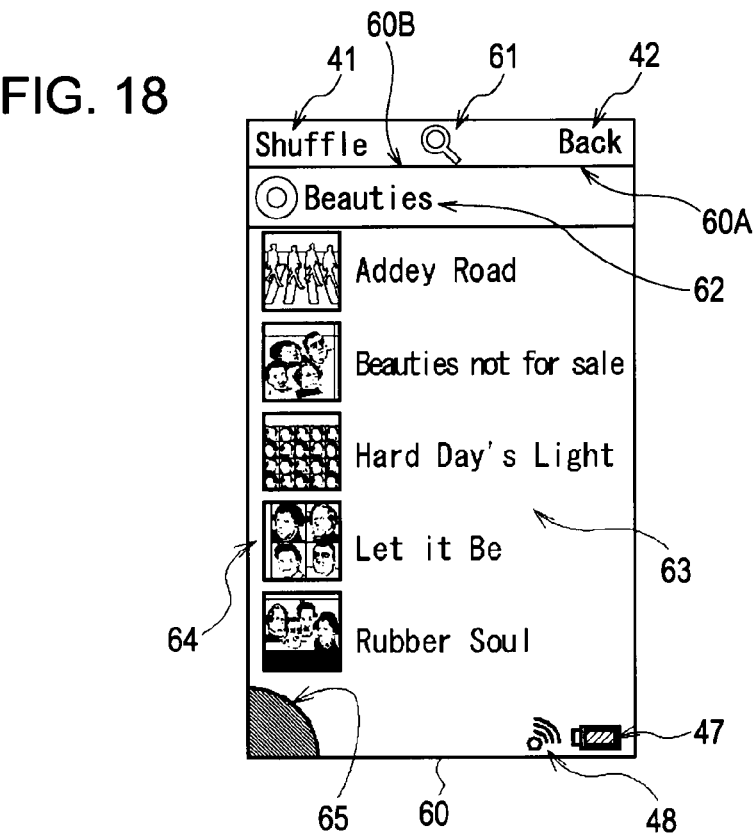
FIG. 18 is an outline drawing illustrating the configuration of an album selection screen in the list mode.

The control unit 20 then sends the album selection screen data to the display unit 12, so as to display an album selection screen 60 on the information display screen 12A such as shown in FIG. 18 based on the album selection screen data, instead of the artist selection screen 50. The album selection screen 60 is provided with a band-shaped command notification portion 60A at the upper side of the screen, parallel with the horizontal direction of the screen, and also is provided with a list display portion 60B below the command notification portion 60A on the screen.

The command notification portion 60A on the album selection screen 60 is provided with text strings 41 and 42, in the same way as with the above-described artist selection screen

50. Also, the command notification portion 60A displays an initial search icon 61 indicating an initial search command for searching a desired artist name from multiple artist names corresponding to the artist name 53 selected by the user on the artist selection screen 50 which is one screen back, based on the initials thereof.

On the other hand, the list display portion 60B of the album selection screen 60 displays a list title 62 (e.g., artist name 53 selected by the user) representing the type of list presented to the user on the album selection screen 60, at the upper side of the screen. Also, the list display portion 60B of the album selection screen 60 has multiple album titles 63, corresponding to the artist name 53 selected by the user, displayed in list format arrayed in alphabetical order for example, toward the bottom of the screen. Moreover, the list display portion 60B of the album selection screen 60 has a jacket photograph image 64 displayed next to each album title 63, corresponding respectively.

Also, the remaining battery notification icon 47 and intensity notification icon 48 are displayed on the list display portion 60B of the album selection screen 60 in the same way as with the above-described genre selection screen 40.

Also, with the portable player device 10, in the event that the album selection screen 60 is displayed on the information display screen 12A, the user can perform diagonal first-direction sliding operations on the information display screen 12A. Accordingly, a touch region notification portion 65 is provided to the lower left corner of the album selection screen 60, in the same way as with the above-described genre selection screen 40, and the touch region notification portion 65 is displayed in a color other than that of other portions.

Further, with the portable player device 10, in the event that the album selection screen 60 is displayed independently on the information display screen 12A, the user can place the thumb on a portion of the information display screen 12A excluding the operation start touch region, so as to perform screen up-direction sliding operations and screen down-direction sliding operations. In the event that a screen up-direction sliding operation is performed on the information display screen 12A while the album selection screen 60 is displayed so as to input an upward scroll command, the list of album titles 63 is scrolled upwards, along with the jacket photograph images 64, by the control unit 20. Also, in the event that a screen down-direction sliding operation is performed on the information display screen 12A while the album selection screen 60 is displayed so as to input a downward scroll command, the list of album titles 63 is scrolled downwards, along with the jacket photograph images 64, by the control unit 20.

Further, with the portable player device 10, each predetermined region corresponding to the display portions of the sets of album title 63 and jacket photograph image 64 on the information display screen 12A (excluding the operation start touch region) is set as an operation end touch region for command input tap operations. With the portable player device 10, in the event that the album selection screen 60 is displayed independently, and an operation end touch region corresponding to the display portion of a set of album titles 63 and jacket photograph image 64 on the information display screen 12A is tapped, a selection command for selecting that album title 63 can be input.

In the event that a tap operation is performed in the state that the album selection screen 60 is displayed on the information display screen 12A and a selection command for a desired album title 63 is input, the control unit 20 generates display image data in a list mode serving as a display mode, based on a music title list corresponding to the album title 63 selected by the user. That is to say, at this time the control unit 20 generates display screen data of a display screen for allowing the user to select music data to be played. This display screen may be referred to as "music selection screen", and this display screen data may be referred to as "music selection screen data".

Figure 19:
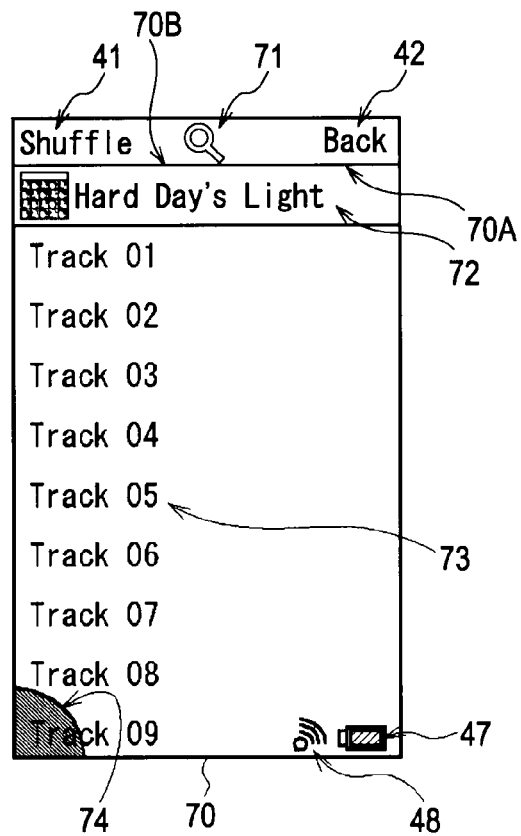
FIG. 19 is an outline drawing illustrating the configuration of a music selection screen in the list mode.

The control unit 20 then sends the music selection screen data to the display unit 12, so as to display a music selection screen 70 on the information display screen 12A such as shown in FIG. 19 based on the music selection screen data, instead of the album selection screen 60. The music selection screen 70 is provided with a band-shaped command notification portion 70A at the upper side of the screen, parallel with the horizontal direction of the screen, and also is provided with a list display portion 70B below the command notification portion 70A on the screen.

The command notification portion 70A on the music selection screen 70 is provided with text strings 41 and 42, in the same way as with the above-described genre selection screen 40. Also, the command notification portion 70A displays an initial search icon 71 indicating an initial search command for searching a desired music title from multiple music titles corresponding to the album title 63 selected by the user on the album selection screen 60 which is one screen back, based on the initials thereof.

On the other hand, the list display portion 70B of the album selection screen 70 displays a list title 72 (e.g., album title 63 selected by the user) representing the type of list presented to the user on the music selection screen 70, at the upper side of the screen. Also, the list display portion 70B of the music selection screen 70 has multiple music titles 73 displayed in list format arrayed in alphabetical order for example, toward the bottom of the screen.

Also, the remaining battery notification icon 47 and intensity notification icon 48 are displayed on the list display portion 70B of the music selection screen 70 in the same way as with the above-described genre selection screen 40.

Also, with the portable player device 10, in the event that the music selection screen 70 is displayed on the information display screen 12A, the user can perform diagonal first-direction sliding operations on the information display screen 12A. Accordingly, a touch region notification portion 74 is provided to the lower left corner of the music selection screen 70, in the same way as with the above-described genre selection screen 40, and the touch region notification portion 74 is displayed in a color other than that of other portions.

Further, with the portable player device 10, in the event that the music selection screen 70 is displayed independently on the information display screen 12A, the user can place the thumb on a portion of the information display screen 12A excluding the operation start touch region, so as to perform screen up-direction sliding operations and screen down-direction sliding operations. In the event that a screen up-direction sliding operation is performed on the information display screen 12A while the music selection screen 70 is displayed so as to input an upward scroll command, the list of music titles 73 is scrolled upwards. Also, in the event that a screen down-direction sliding operation is performed on the information display screen 12A while the music selection screen 70 is displayed so as to input a downward scroll command, the list of music titles 73 is scrolled downwards, by the control unit 20.

Further, with the portable player device 10, each predetermined region corresponding to the display portions of the music titles 73 on the information display screen 12A (excluding the operation start touch region) is set as an operation end touch region for command input tap operations. With the portable player device 10, in the event that the music selection screen 70 is displayed independently, and an operation end touch region corresponding to the display portion of a music title 73 on the information display screen 12A is tapped, a selection command for selecting that music title 73 can be input.

In the event that a tap operation is performed in the state that the music selection screen 70 is displayed on the information display screen 12A and a selection command for a music title 73 is input, the control unit 20 starts playing the selected music data which is the music title 73. Also, the control unit 20 modifies the music selection screen data in the list mode serving as a display mode, to generate display screen data of a display screen for notifying the user that the music is being played. This display screen may be referred to as "music playing screen", and this display screen data may be referred to as "music playing screen data".

Figure 20:
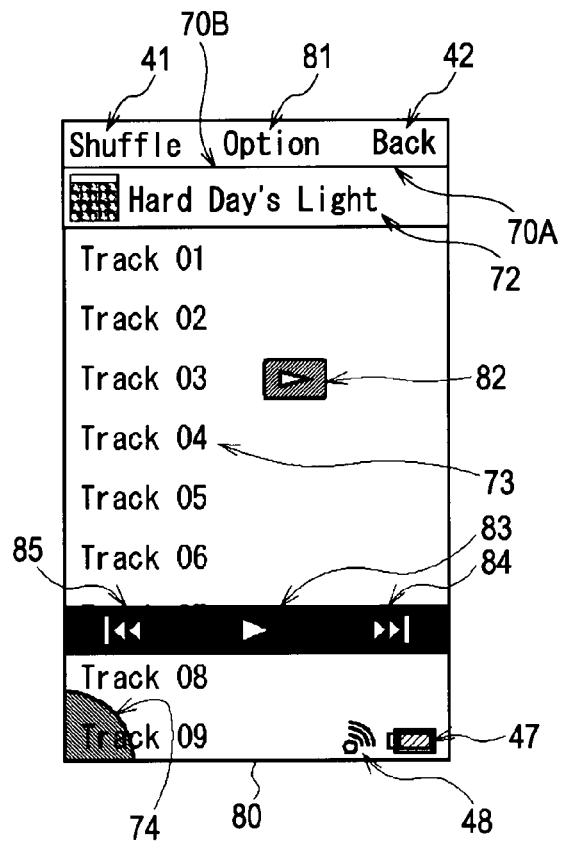
FIG. 20 is an outline drawing illustrating the configuration of music playing screen in the list mode.

The control unit 20 then sends the music selection screen data to the display unit 12, so as to display a music playing screen 80 on the information display screen 12A such as shown in FIG. 20 based on the music playing screen data, instead of the music selection screen 70, of which the portions corresponding with FIG. 19 are denoted with the same reference numerals. In FIG. 20, the portions which are the same as in FIG. 19 are denoted with the same reference numerals.

The command notification portion 70A of the music playing screen 80 displays an icon 81 indicating an option command for superimposed display of an option screen (not shown), wherein for example, settings items for playing, switching to a display of a jacket photograph image, and so on, can be selected, in a manner superimposed on the music playing screen 80.

On the other hand, the list display portion 70B of the music playing screen 80 displays an icon 82 besides the music title 73 of the music data being played, indicating that the music data is being played (hereinafter may be referred to as "play notification icon"). Also, the list display portion 70B of the music playing screen 80 displays, toward the bottom of the screen, an icon 83 indicating play start and play stop commands, an icon 84 indicating tune skip forwards, and an icon 85 indicating tune skip backwards.

Note that in the following description, the icon 83 indicating play start and play stop commands may be referred to as "play start icon 83", the icon 84 indicating tune skip forwards may be referred to as "tune forward icon 84", and the icon 84 indicating tune skip backwards may be referred to as "tune back icon 85". In this case, the play start icon 83, tune forward icon 84, and tune back icon 85 are displayed superimposed on the list of music titles 73, but in a manner giving the impression of translucency so as to enable the music titles 73 below also to be visible.

Also, with the portable player device 10, the portions of the information display screen 12A corresponding to the display portions of the play start icon 83, tune forward icon 84, and tune back icon 85 (excluding the operation start touch region) is set as an operation end touch region for command input tap operations. With the portable player device 10, each time the operation end touch region corresponding to the display portion of the play start icon 83 on the information display screen 12A is tapped, a play start command and a play end command can be alternately input.

Also, with the portable player device 10, each time the operation end touch region corresponding to the display portion of the tune forward icon 84 on the information display screen 12A is tapped, a tune forward command for playing the next music data instead of the music data currently being played can be input, in accordance with the play order. Further, with the portable player device 10, each time the operation end touch region corresponding to the display portion of the tune back icon 85 on the information display screen 12A is tapped, a tune back command for playing the previous music data instead of the music data currently being played can be input, in accordance with the play order.

Also, with the portable player device 10, in the event that operation end touch region corresponding to the display portion of the tune forward icon 84 on the information display screen 12A is subjected to a long hold operation, a fast-forward command wherein the music data currently being played is fast-forwarded can be input. Also, with the portable player device 10, in the event that operation end touch region corresponding to the display portion of the tune back icon 85 on the information display screen 12A is subjected to a long hold operation, a fast-reverse command wherein the music data currently being played is fast-reversed can be input.

Thus, the control unit 20 changes the display screen to be displayed on the information display screen 12A in the list mode from the higher order genre selection screen 40 in the hierarchical management structure of the music data, to the artist selection screen 50 one hierarchical level below, and on to the album selection screen 60, and music selection screen 70. Accordingly, the control unit 20 causes the user to select music data by following the hierarchical management structure of the music data from the higher to lower hierarchical levels, so that the selected music data can be played and listened to.

With the portable player device 10, in the event that the genre selection screen 40 is displayed independently on the information display screen 12A, the user can touch a portion of the information display screen 12A excluding the operation start touch region with the thumb, and perform a screen-right-direction sliding operation or screen-left-direction sliding operation. In the event that the user has performed a screen-right-direction sliding operation or screen-left-direction sliding operation on the information display screen 12A while the genre selection screen 40 is displayed, thereby inputting a mode switchover command, the control unit 20 switches over the display mode of the display screen on the information display screen 12A to a visual mode.

Figure 21:
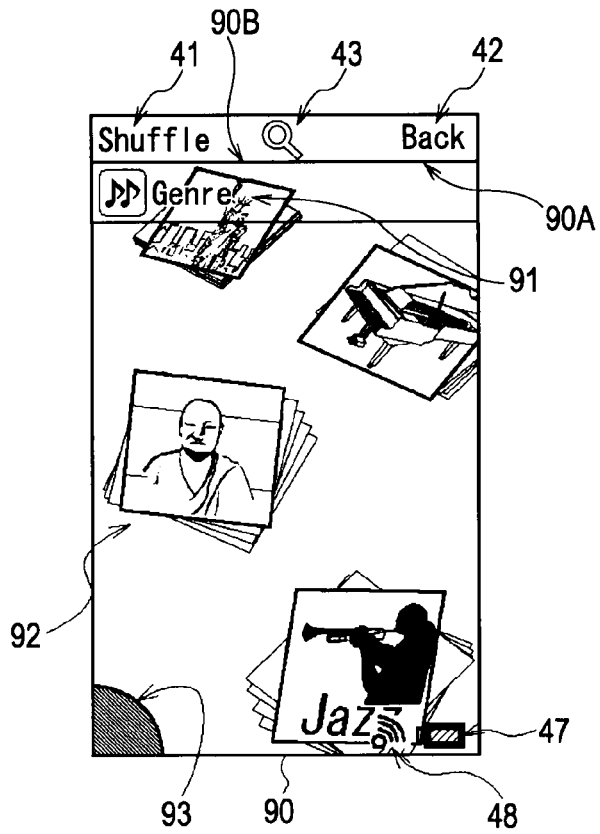
FIG. 21 is an outline drawing illustrating the configuration of a genre selection screen in a viewer mode.

The control unit 20 then generates genre selection screen data of a genre selection screen, in the visual mode serving as a display mode, based on the genre list and jacket image data. The control unit 20 then sends the genre selection screen data to the display unit 12, so as to display a genre selection screen 90 on the information display screen 12A such as shown in FIG. 21. The genre selection screen 90 is provided with a band-shaped command notification portion 90A at the upper side of the screen, parallel with the horizontal direction of the screen, and also is provided with a list display portion 90B below the command notification portion 90A on the screen.

The command notification portion 90A on the genre selection screen 90 is provided with text strings 41 and 42, and the initial search icon 43, in the same way as with the above-described genre selection screen 40.

On the other hand, the list display portion 90B of the genre selection screen 90 displays a list title 91 representing the type of list which the user is being presented with in the genre selection screen 90 toward the top of the screen. Also, the list display portion 90B of the genre selection screen 90 displays, instead of multiple genres, jacket photograph images 92 grouped by genre in a three-dimensional manner. The jacket photograph images 92 grouped by genre are displayed in alphabetical order of genre, from the near side of the screen to the far side. Also, the horizontal positions of the jacket photograph images 92 grouped by genre are randomly selected, and in the event that there are multiple jacket photograph images 92 for a genre, these are displayed as if they were stacked and slightly offset. Thus, the genre selection screen 90 is capable of allowing the user to recognize whether the number of albums in each genre (i.e., the number of albums of music belonging to each genre) is many or few, even easier than with the case of the above-described genre selection screen 40 in the list mode.

Also, the remaining battery notification icon 47 and intensity notification icon 48 are displayed on the list display portion 90B of the genre selection screen 90 in the same way as with the above-described genre selection screen 40.

Also, with the portable player device 10, in the event that the genre selection screen 90 is displayed on the information display screen 12A, the user can perform diagonal first-direction sliding operations on the information display screen 12A. Accordingly, a touch region notification portion 93 is provided to the lower left corner of the genre selection screen 90, in the same way as with the above-described genre selection screen 40, and the touch region notification portion 93 is displayed in a color other than that of other portions.

Further, with the portable player device 10, in the event that the genre selection screen 90 is displayed independently on the information display screen 12A, the user can place the thumb on a portion of the information display screen 12A excluding the operation start touch region, so as to perform screen up-direction sliding operations and screen down-direction sliding operations. In the event that a screen up-direction sliding operation is performed on the information display screen 12A while the genre selection screen 90 is displayed so as to input an upward scroll command, the jacket photograph images 92 grouped by genre are scrolled as if they were being shifted from the near side at the lower side of the screen to the far side at the upper side of the screen, by the control unit 20. Also, in the event that a screen down-direction sliding operation is performed on the information display screen 12A while the genre selection screen 90 is displayed so as to input a downward scroll command, the jacket photograph images 92 grouped by genre are scrolled as if they were being shifted from the far side at the upper side of the screen to the near side at the lower side of the screen, by the control unit 20. Accordingly, the control unit 20 can move the jacket photograph images 92 grouped by genre, already displayed on the genre selection screen 90 off of the screen, and instead display jacket photograph images 92 grouped by genre, which had not been displayed so far.

Further, with the portable player device 10, each predetermined region corresponding to the display portions of the jacket photograph images 92 grouped by genre on the information display screen 12A (excluding the operation start touch region) is set as an operation end touch region for command input tap operations. With the portable player device 10, in the event that the genre selection screen 90 is displayed independently, and an operation end touch region corresponding to the display portion of jacket photograph images 92 grouped by genre on the information display screen 12A is subjected to a long hold operation, a popup display command for popup display of the genre can be input.

That is to say, in the event that a long hold operation is performed in the state that the genre selection screen 90 is displayed on the information display screen 12A, such that a popup display command is input, the control unit 20 makes a popup display on the genre selection screen 90 of the genre (not shown) under which the jacket photograph images 92 are grouped at the operation end touch region which has been long-hold operated.

With the portable player device 10, in the event that a tap operation is performed in the state that the genre selection screen 90 is displayed independently on the information display screen 12A, in the operation end touch region corresponding to the display portion of the jacket photograph images 92 grouped by genre on the information display screen 12A, a selection command can be input for selecting the group under which the jacket photograph images 92 are grouped. In the event that a tap operation is performed in the state that the genre selection screen 90 is displayed on the information display screen 12A, so as to input a selection command for a desired genre, the control unit 20 generates artist selection screen data of an artist selection display screen for in the visual mode serving as a display mode, based on the artist list corresponding to the genre selected by the user, and the jacket image data.

Figure 22:
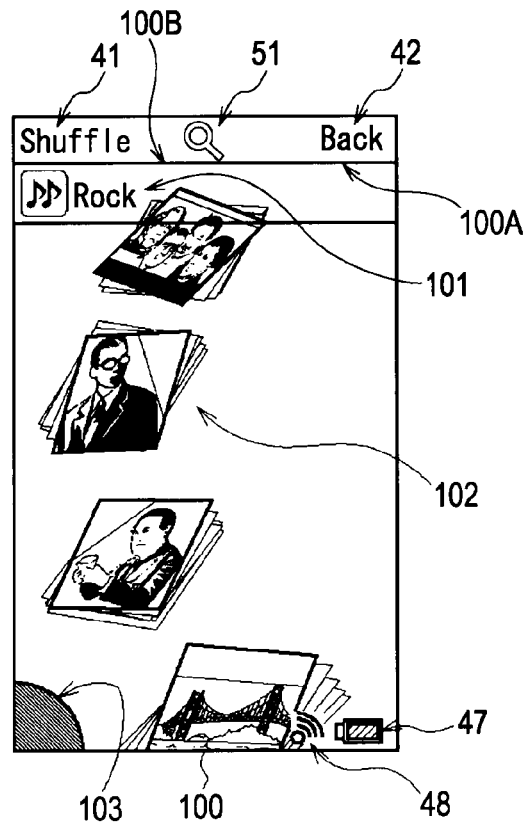
FIG. 22 is an outline drawing illustrating the configuration of an artist selection screen in the viewer mode.

The control unit 20 then sends the artist selection screen data to the display unit 12, so as to display an artist selection screen 100 on the information display screen 12A such as shown in FIG. 22 based on the artist selection screen data, instead of the genre selection screen 90. The artist selection screen 100 is provided with a band-shaped command notification portion 100A at the upper side of the screen, parallel with the horizontal direction of the screen, and also is provided with a list display portion 100B below the command notification portion 100A on the screen.

The command notification portion 100A on the artist selection screen 100 is provided with text strings 41 and 42, in the same way as with the above-described artist selection screen 50 in the list mode. Also, the command notification portion 100A displays an initial search icon 51 indicating an initial search command for searching a desired artist from multiple artists corresponding to the genre selected by the user on the genre selection screen 90 which is one screen back, based on the initials thereof, in the same way as with the artist selection screen 50.

On the other hand, the list display portion 100B of the artist selection screen 100 displays a list title 101 (e.g., genre selected by the user) representing the type of list presented to the user on the artist selection screen 100, at the upper side of the screen. Also, the list display portion 100B of the artist selection screen 100 has jacket photograph images 102 grouped by artist in a three-dimensional manner, instead of the multiple artist names corresponding to the genre selected by the user.

The jacket photograph images 102 grouped by artist name are displayed in alphabetical order of artist name, from the near side of the screen to the far side. Also, the horizontal positions of the jacket photograph images 102 grouped by artist name are randomly selected, and in the event that there are multiple jacket photograph images 102 for an artist, these are displayed as if they were stacked and slightly offset. Thus, the artist selection screen 100 is capable of allowing the user to recognize whether the number of albums for each artist (i.e., the number of albums of each artist) is many or few, even easier than with the case of the above-described artist selection screen 50 in the list mode.

Also, the remaining battery notification icon 47 and intensity notification icon 48 are displayed on the artist display portion 100B of the genre selection screen 100 in the same way as with the above-described genre selection screen 40 in the above-described list mode.

Also, with the portable player device 10, in the event that the artist selection screen 100 is displayed on the information display screen 12A, the user can perform diagonal first-direction sliding operations on the information display screen 12A. Accordingly, a touch region notification portion 103 is provided to the lower left corner of the artist selection screen 100, in the same way as with the above-described genre selection screen 40, and the touch region notification portion 103 is displayed in a color other than that of other portions.

Further, with the portable player device 10, in the event that the artist selection screen 100 is displayed independently on the information display screen 12A, the user can place the thumb on a portion of the information display screen 12A excluding the operation start touch region, so as to perform screen up-direction sliding operations and screen down-direction sliding operations. In the event that a screen up-direction sliding operation is performed on the information display screen 12A while the artist selection screen 100 is displayed so as to input an upward scroll command, the jacket photograph images 102 grouped by artist are scrolled as if they were being shifted from the near side at the lower side of the screen to the far side at the upper side of the screen. Also, in the event that a screen down-direction sliding operation is performed on the information display screen 12A while the genre selection screen 100 is displayed so as to input a downward scroll command, the jacket photograph images 102 grouped by artist are scrolled as if they were being shifted from the far side at the upper side of the screen to the near side at the lower side of the screen. Accordingly, the control unit 20 can move the jacket photograph images 102 grouped by artist, already displayed on the artist selection screen 100 off of the screen, and instead display jacket photograph images 102 grouped by artist, which had not been displayed so far.

Further, with the portable player device 10, each predetermined region corresponding to the display portions of the jacket photograph images 102 grouped by genre on the information display screen 12A (excluding the operation start touch region) is set as an operation end touch region for command input tap operations. With the portable player device 10, in the event that the artist selection screen 100 is displayed independently on the information display screen 12A, and an operation end touch region corresponding to the display portion of jacket photograph images 102 grouped by artist on the information display screen 12A is subjected to a long hold operation, a popup display command for popup display of the artist can be input.

That is to say, in the event that a long hold operation is performed in the state that the artist selection screen 100 is displayed on the information display screen 12A, such that a popup display command is input, a popup display is made on the artist selection screen 100 of the artist name (not shown) under which the jacket photograph images 102 are grouped at the operation end touch region which has been long-hold operated.

With the portable player device 10, in the event that a tap operation is performed in the state that the artist selection screen 100 is displayed independently on the information display screen 12A, in the operation end touch region corresponding to the display portion of the jacket photograph images 102 grouped by artist on the information display screen 12A, a selection command can be input for selecting the group under which the jacket photograph images 102 are grouped. In the event that a tap operation is performed in the state that the artist selection screen 100 is displayed on the information display screen 12A, so as to input a selection command for a desired artist, the control unit 20 generates display screen data based on the album list corresponding to the artist name selected by the user, and the jacket image data. That is to say, the control unit 20 generates album selection image data for an album selection screen, as the display screen data based on the album list corresponding to the artist name selected by the user.

Figure 23:
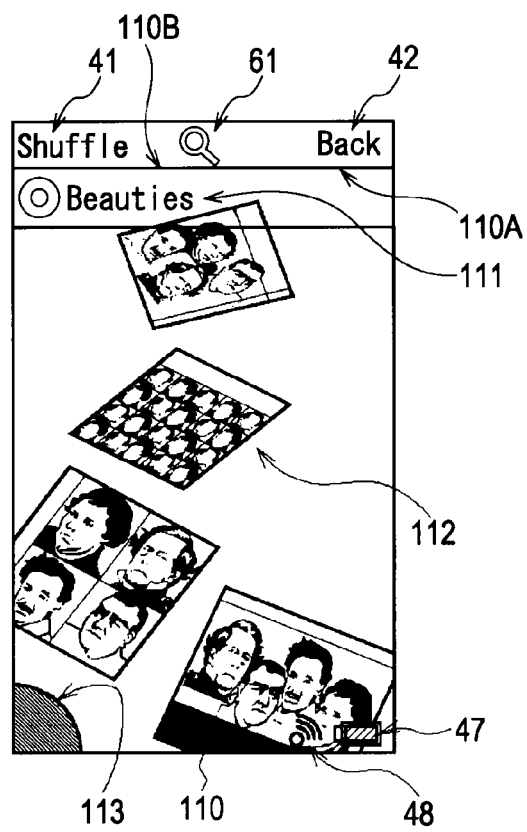
FIG. 23 is an outline drawing illustrating the configuration of an album selection screen in the viewer mode.

The control unit 20 then sends the album selection screen data to the display unit 12, so as to display an artist selection screen 100 on the information display screen 12A such as shown in FIG. 23 based on the album selection screen data, instead of the artist selection screen 100. The album selection screen 110 is provided with a band-shaped command notification portion 110A at the upper side of the screen, parallel with the horizontal direction of the screen, and also is provided with a list display portion 110B below the command notification portion 110A on the screen.

The command notification portion 110A on the album selection screen 100 is provided with text strings 41 and 42, in the same way as with the above-described album selection screen 60 in the list mode. Also, the command notification portion 110A displays an initial search icon 61 indicating an initial search command for searching a desired album title from multiple album titles corresponding to the artist name selected by the user on the artist selection screen 100 which is one screen back, based on the initials thereof, in the same way as with the album selection screen 60.

On the other hand, the list display portion 110B of the album selection screen 110 displays a list title 111 (e.g., artist name selected by the user) representing the type of list presented to the user on the album selection screen 110, at the upper side of the screen. Also, the list display portion 110B of the album selection screen 110 has jacket photograph images 112 in a three-dimensional manner, instead of the multiple album titles corresponding to the genre selected by the user.

The multiple jacket photograph images 112 corresponding to the multiple album titles are displayed in alphabetical order of artist name, from the near side of the screen to the far side. Also, the horizontal positions of the jacket photograph images 112 are randomly selected.

Also, the remaining battery notification icon 47 and intensity notification icon 48 are displayed on the artist display portion 110B of the album selection screen 100 in the same way as with the above-described genre selection screen 40 in the above-described list mode.

Also, with the portable player device 10, in the event that the album selection screen 110 is displayed on the information display screen 12A, the user can perform diagonal first-direction sliding operations on the information display screen 12A. Accordingly, a touch region notification portion 113 is provided to the lower left corner of the album selection screen 110, in the same way as with the above-described genre selection screen 40, and the touch region notification portion 113 is displayed in a color other than that of other portions.

Further, with the portable player device 10, in the event that the album selection screen 110 is displayed independently on the information display screen 12A, the user can place the thumb on a portion of the information display screen 12A excluding the operation start touch region, so as to perform screen up-direction sliding operations and screen down-direction sliding operations. In the event that a screen up-direction sliding operation is performed on the information display screen 12A while the album selection screen 110 is displayed so as to input an upward scroll command, the control unit 20 scrolls the jacket photograph images 112 as if they were being shifted from the near side at the lower side of the screen to the far side at the upper side of the screen. Also, in the event that a screen down-direction sliding operation is performed on the information display screen 12A while the album selection screen 110 is displayed so as to input a downward scroll command, the control unit 20 scrolls the jacket photograph images 112 as if they were being shifted from the far side at the upper side of the screen to the near side at the lower side of the screen. Accordingly, the control unit 20 can move the jacket photograph images 112, already displayed on the album selection screen 110 off of the screen, and instead display jacket photograph images 112, which had not been displayed so far.

Further, with the portable player device 10, each predetermined region corresponding to the display portions of the jacket photograph images 112 on the information display screen 12A (excluding the operation start touch region) is set as an operation end touch region for command input tap operations. With the portable player device 10, in the event that the album selection screen 110 is displayed independently on the information display screen 12A, and an operation end touch region corresponding to the display portion of jacket photograph images 112 on the information display screen 12A is subjected to a long hold operation, a popup display command for popup display of the artist can be input.

That is to say, in the event that a long hold operation is performed in the state that the album selection screen 110 is displayed on the information display screen 12A, such that a popup display command is input, a popup display is made on the album selection screen 110 of the album title (not shown) of the jacket photograph images 112 corresponding to the operation end touch region which has been long-hold operated, by the control unit 20.

With the portable player device 10, in the event that a tap operation is performed in the state that the album selection screen 110 is displayed independently on the information display screen 12A, in the operation end touch region corresponding to the display portion of the jacket photograph images 112 on the information display screen 12A, a selection command can be input for selecting the album title of the jacket photograph image 112. In the event that a tap operation is performed in the state that the album selection screen 110 is displayed on the information display screen 12A, so as to input a selection command for a desired album, the control unit 20 generates display screen data in the visual mode serving as a display mode, based on the music title list corresponding to the album selected by the user, and the jacket image data. That is to say, the control unit 20 generates music selection image data for a music selection screen, as the display screen data in the visual mode, based on the music list corresponding to the album selected by the user.

The control unit 20 then sends the album selection screen data to the display unit 12, so as to display a music selection screen 120 on the information display screen 12A such as shown in FIG. 23 based on the album selection screen data, instead of the album selection screen 110. The music selection screen 120 is provided with a band-shaped command notification portion 120A at the upper side of the screen, parallel with the horizontal direction of the screen, and also is provided with a list display portion 120B below the command notification portion 120A on the screen.

The command notification portion 120A on the music selection screen 120 is provided with text strings 41 and 42, in the same way as with the above-described music selection screen 70 in the list mode. Also, the command notification portion 120A displays an initial search icon 61 indicating an initial search command for searching a desired music title from multiple music titles corresponding to the album title selected by the user on the album selection screen 110 which is one screen back, based on the music title list and jacket image data, in the same way as with the music selection screen 70 in the list mode.

On the other hand, the list display portion 120B of the music selection screen 120 displays a list title 121 (e.g., album title selected by the user) representing the type of list presented to the user on the music selection screen 120, at the upper side of the screen. Also, the list display portion 120B of the music selection screen 120 has a jacket photograph image 122 of the album selected by the user, at the middle thereof.

Moreover, on the list display portion 120B, multiple music titles 123 in the album selected by the user are displayed in alphabetical order of music title, from the near side of the screen to the far side, with the horizontal positions randomly selected.

Also, the remaining battery notification icon 47 and intensity notification icon 48 are displayed on the list display portion 120B of the music selection screen 120 in the same way as with the above-described genre selection screen 40 in the above-described list mode.

Also, with the portable player device 10, in the event that the music selection screen 120 is displayed on the information display screen 12A, the user can perform diagonal first-direction sliding operations on the information display screen 12A. Accordingly, a touch region notification portion 124 is provided to the lower left corner of the music selection screen 120, in the same way as with the above-described genre selection screen 40, and the touch region notification portion 124 is displayed in a color other than that of other portions.

Further, with the portable player device 10, in the event that the music selection screen 120 is displayed independently on the information display screen 12A, the user can place the thumb on a portion of the information display screen 12A excluding the operation start touch region, so as to perform screen up-direction sliding operations and screen down-direction sliding operations. In the event that a screen up-direction sliding operation is performed on the information display screen 12A while the music selection screen 120 is displayed so as to input an upward scroll command, the music titles 123 are scrolled as if they were being shifted from the near side at the lower side of the screen to the far side at the upper side of the screen, over the jacket photograph image 122. Also, in the event that a screen down-direction sliding operation is performed on the information display screen 12A while the music selection screen 120 is displayed so as to input a downward scroll command, the music titles 123 are scrolled as if they were being shifted from the far side at the upper side of the screen to the near side at the lower side of the screen, over the jacket photograph image 122.

Further, with the portable player device 10, each predetermined region corresponding to the display portions of the music titles 123 on the information display screen 12A (excluding the operation start touch region) is set as an operation end touch region for command input tap operations. With the portable player device 10, in the event that the music selection screen 120 is displayed independently on the information display screen 12A, and an operation end touch region corresponding to the display portion of a music title 123 on the information display screen 12A is subjected to a long hold operation, the music title 123 can be optionally selected and a play command input.

In the event that a tap operation is performed in the state that the music selection screen 120 is displayed on the information display screen 12A and a selection command for a music title 123 is input, the control unit 20 starts playing the selected music data which is the music title 123. Also, the control unit 20 modifies the music selection screen data in the list mode serving as a display mode, to generate display screen data of a display screen for notifying the user that the music is being played.

Figure 24:
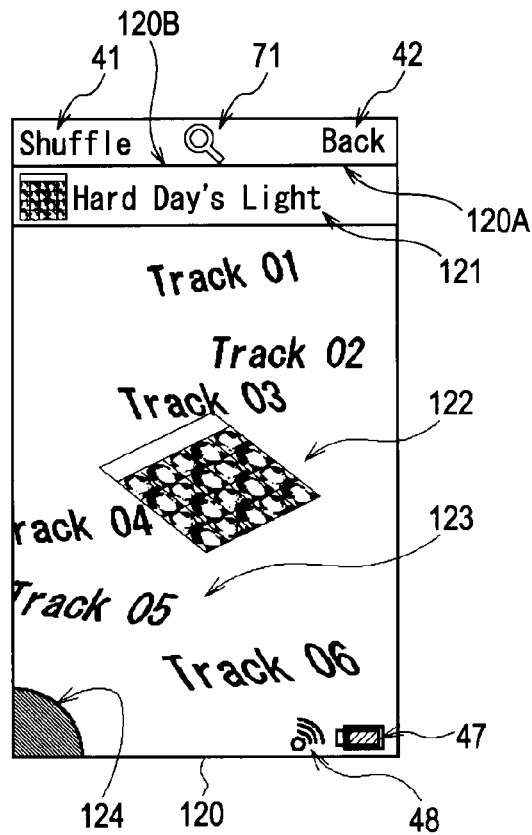
FIG. 24 is an outline drawing illustrating the configuration of a music selection screen in the viewer mode.
Figure 25:
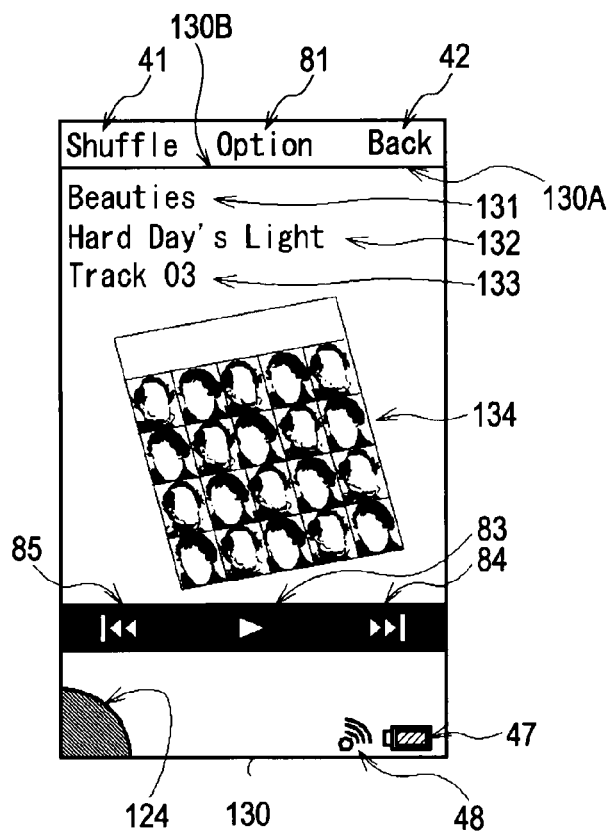
FIG. 25 is an outline drawing illustrating the configuration of music playing screen in the viewer mode.

The control unit 20 then sends the music selection screen data to the display unit 12, so as to display a music playing screen 130 on the information display screen 12A such as shown in FIG. 25 based on the music playing screen data, instead of the music selection screen 120. In FIG. 25, the portions which are the same as in FIG. 24 are denoted with the same reference numerals. The music selection screen 130 is provided with a band-shaped command notification portion 130A at the upper side of the screen, parallel with the horizontal direction of the screen, and also is provided with a list display portion 130B below the command notification portion 130A on the screen.

The command notification portion 130A of the music playing screen 130 displays an icon 81 the same as with that on the music playing screen 80 described above.

On the other hand, the playing music display portion 130B of the music playing screen 130 displays the artist name 131, album title 132, music title 133, and jacket photograph image 134, corresponding to the music data being played. Also, the playing music display portion 130B of the music playing screen 130 displays the play start icon 83, tune forward icon 84, and tune back icon 85, the same as with the music playing screen 80 in the list mode described above.

With the portable player device 10, when the music playing screen 130 is displayed on the information display screen 12A, the play start command, play stop command tune forward command, tune back command, fast-forward command, and fast-reverse command can be input in the same way as with the music playing screen 80 in the list mode described above.

Thus, the control unit 20 changes the display screen to be displayed on the information display screen 12A in the visual mode from the higher order genre selection screen 90 in the hierarchical management structure of the music data, to the artist selection screen 100 one hierarchical level below, and on to the album selection screen 110, and music selection screen 120. Accordingly, the control unit 20 causes the user to select music data by following the hierarchical management structure of the music data from the higher to lower hierarchical levels, so that the selected music data can be played and listened to.

With the portable player device 10, in the event that the artist selection screen 50 or album selection screen 60 in the above-described list mode is displayed independently on the information display screen 12A, the user can perform a screen-right-direction sliding operation or screen-left-direction sliding operation on the information display screen 12A as described above. Further, with the portable player device 10, in the event that the music selection screen 70 or music playing screen 80 in the above-described list mode is displayed independently on the information display screen 12A, the user can perform a screen-right-direction sliding operation or screen-left-direction sliding operation on the information display screen 12A as described above.

Similarly, with the portable player device 10, in the event that the genre selection screen 90 or artist selection screen 100 in the above-described visual mode is displayed independently on the information display screen 12A, the user can perform a screen-right-direction sliding operation or screen-left-direction sliding operation on the information display screen 12A as described above. Further, with the portable player device 10, in the event that the or album selection screen 110, music selection screen 120, music playing screen 130 in the above-described visual mode is displayed independently on the information display screen 12A, the user can perform a screen-right-direction sliding operation or screen-left-direction sliding operation on the information display screen 12A as described above.

Figure 26:
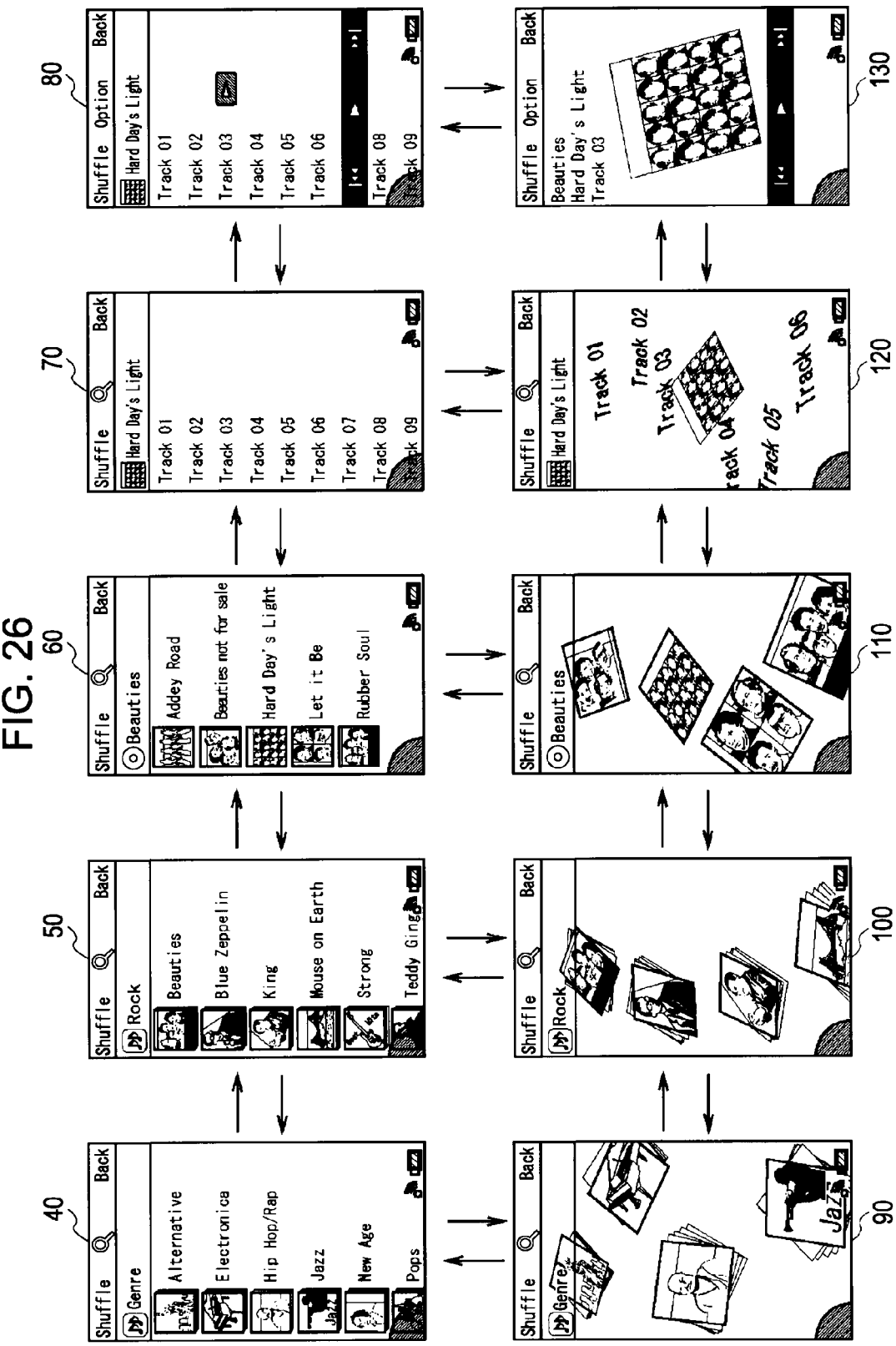
FIG. 26 is an outline drawing for description of transition among display screens.

As shown in FIG. 26, in the event that, in a state with the genre selection screen 90 in the visual mode is displayed independently on the information display screen 12A, and the user performs a screen-right-direction sliding operation or screen-left-direction sliding operation, the information display screen 12A displays the genre selection screen 40 in the list mode instead of the genre selection screen 90 in the visual mode.

Also, in the event that, in a state with one of the artist selection screen 50 in the list mode or the artist selection screen 100 in the visual mode being displayed independently on the information display screen 12A, and the user performs a screen-right-direction sliding operation or screen-left-direction sliding operation, the control unit 20 displays the other of these instead on the information display screen 12A.

Also, in the event that, in a state with one of the album selection screen 60 in the list mode or the album selection screen 110 in the visual mode being displayed independently on the information display screen 12A, and the user performs a screen-right-direction sliding operation or screen-left-direction sliding operation, the control unit 20 displays the other of these instead on the information display screen 12A.

Also, in the event that, in a state with one of the music selection screen 70 in the list mode or the music selection screen 120 in the visual mode being displayed independently on the information display screen 12A, and the user performs a screen-right-direction sliding operation or screen-left-direction sliding operation, the control unit 20 displays the other of these instead on the information display screen 12A.

Also, in the event that, in a state with one of the music playing screen 80 in the list mode or the music playing screen 130 in the visual mode being displayed independently on the information display screen 12A, and the user performs a screen-right-direction sliding operation or screen-left-direction sliding operation, the control unit 20 displays the other of these instead on the information display screen 12A. Thus, the control unit 20 can easily switch between displaying a display screen in list mode and a display screen in visual mode on the information display screen 12A of the display unit 12.

Now, with the portable player device 10, in the event that the operation start touch region on the information display screen 12A is tapped as an operation end touch region, in a state with the genre selection screen 40 in the list mode displayed on the information display screen 12A, a hierarchical level return command where the display screen displayed on the information display screen 12A is returned to one higher hierarchical level can be input.

Also, with the portable player device 10, in the event that the operation start touch region on the information display screen 12A is tapped as an operation end touch region, in a state with the artist selection screen 50, album selection screen 60, music selection screen 70, or music playing screen 80, in the list mode, displayed on the information display screen 12A, the hierarchical level return command can be input in the same way.

Further, with the portable player device 10, in the event that the operation start touch region on the information display screen 12A is tapped as an operation end touch region, in a state with the genre selection screen 90 or artist selection screen 100 in the visual mode displayed on the information display screen 12A, a hierarchical level return command where the display screen displayed on the information display screen 12A is returned to one higher hierarchical level can be input.

Moreover, with the portable player device 10, in the event that the operation start touch region on the information display screen 12A is tapped as an operation end touch region, in a state with the album selection screen 110, music selection screen 120, or music playing screen 130, in the visual mode, displayed on the information display screen 12A, the hierarchical level return command can be input in the same way.

That is to say, upon a hierarchical level return command being input by a tap operation in a state wherein the music selection screen 70 or music playing screen 80 in the list mode is independently displayed on the information display screen 12A, the display mode on the information display screen 12A is not changed, and the control unit 20 displays the album selection screen 60 or music selection screen 70 one hierarchical level higher.

Also, upon a hierarchical level return command being input by a tap operation in a state wherein the artist selection screen 50 or album selection screen 60 in the list mode is independently displayed on the information display screen 12A, the display mode on the information display screen 12A is not changed, and the control unit 20 displays the genre selection screen 40 or artist selection screen 50 one hierarchical level higher.

Further, upon a hierarchical level return command being input by a tap operation in a state wherein the music selection screen 120 or music playing screen 130 in the visual mode is independently displayed on the information display screen 12A, the display mode on the information display screen 12A is not changed, and the control unit 20 displays the album selection screen 110 or music selection screen 120 one hierarchical level higher.

Further, upon a hierarchical level return command being input by a tap operation in a state wherein the artist selection screen 100 or album selection screen 110 in the visual mode is independently displayed on the information display screen 12A, the display mode on the information display screen 12A is not changed, and the control unit 20 displays the genre selection screen 90 or artist selection screen 100 one hierarchical level higher.

Thus, upon a hierarchical level return command being input in a state wherein a display screen is displayed in one of the modes, the control unit 20 can easily display a display screen one hierarchical level above the current hierarchical level in the same mode, regardless of whether the mode in which the previous screen displayed on the information display screen 12A was the same or different.

Note however, that in the event that a hierarchical level return command is input by a tap operation in a state wherein the genre selection screen 40 is independently displayed on the information display screen 12A in the list mode, a later-described home menu screen, from which display of the genre selection screen 40 can be selected, is displayed as the display screen one hierarchical level above the current hierarchical level on the information display screen 12A.

In the same way, in the event that a hierarchical level return command is input by a tap operation in a state wherein the genre selection screen 90 is independently displayed on the information display screen 12A in the visual mode, a later-described home menu screen, from which display of the genre selection screen 90 can be selected, is displayed as the display screen one hierarchical level above the current hierarchical level on the information display screen 12A.

Now, with the portable player device 10, upon a tap operation being made at the operation end touch region corresponding to the display portion of the initial search icon 51 on the display unit 12 as described above, in a state wherein the artist selection screen 100 in the visual mode is independently displayed on the information display screen 12A, an initial search command can be input. Upon the initial search command being input, the control unit 20 modifies the artist selection screen data to generate display screen data for an initial search display screen. In the following description, the display screen for an initial search may be referred to as "initial search screen", and display screen data for the initial search screen may be referred to as "initial search screen data".

Figure 27:
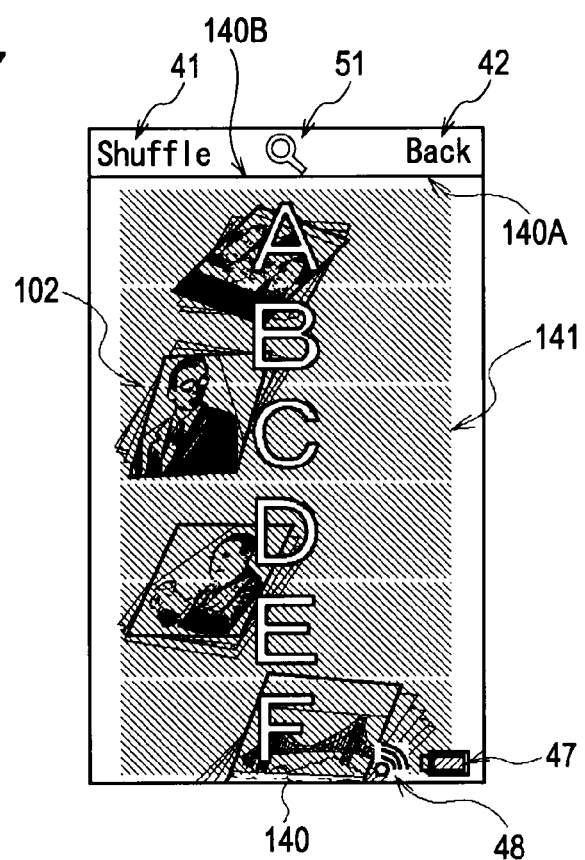
FIG. 27 is an outline drawing illustrating the configuration of an initial search screen.

The control unit 20 sends the initial search screen data to the display unit 12 so as to display an initial search screen 140 such as shown in FIG. 27 on the information display screen 12A, based on the initial search screen data. The initial search screen 140 is provided with a band-shaped command notification portion 140A at the upper side of the screen, parallel with the horizontal direction of the screen, and also is provided with a list display portion 140B below the command notification portion 140A on the screen.

The command notification portion 140A on the initial search screen 140 is provided with text strings 41 and 42, in the same way as with the above-described artist selection screen 100 in the visual mode. On the other hand, the list display portion 140B of the initial search screen 140 displays jacket photograph images 102 in a three-dimensional manner, grouped by artist name, in the same way as with the artist selection screen 100 in the visual mode described above.

Further, the list display portion 140B displays, over the jacket photograph images 102, multiple icons 141 where one alphabet letter is displayed at a time for selection of initials, in one row toward the bottom of the screen in order. Note that these icons where one alphabet letter is displayed at a time for selection of initials will be referred to as "initial selection icons 141".

Also, the remaining battery notification icon 47 and intensity notification icon 48 are displayed on the list display portion 140B of the initial search screen 140 in the same way as with the above-described artist selection screen 100 in the visual mode.

Now, with the list display portion 140B, in the event that the initial search screen 140 is displayed on the information display screen 12A instead of the artist selection screen 100, the display state of the jacket photograph images 102 displayed on the list display portion 100B of the artist selection screen 100 immediately before the display was switched is maintained, and the initial selection icons 141 are displayed in a manner giving the impression of translucency so as to enable the jacket photograph images 102 below also to be visible.

Accordingly, in the initial search screen 140, the user can readily recognize from the display contents of the list display portion 140B from which display screen (in this case, the artist selection screen 100) the display screen has been switched. Thus, with the initial search screen 140, the user can intuitively recognize the artist names which can be searched, for selecting an artist name from the multiple artist names corresponding to the genre already selected, in the same way as with the artist selection screen 100 from which the display has been switched.

With the portable player device 10, in a state wherein the initial search screen 140 is displayed on the information display screen 12A, the user can also perform a screen-up-direction sliding operation and screen-down-direction sliding operation on the information display screen 12A. Upon a screen-up-direction sliding operation being performed on the information display screen 12A while the initial search screen 140 is displayed so as to input an upward scroll command, the initial selection icons 141 are scrolled upwards. On the other hand, upon a screen-down-direction sliding operation being performed on the information display screen 12A while the initial search screen 140 is displayed so as to input a downward scroll command, the initial selection icons 141 are scrolled downwards. Accordingly, the control unit 20 can move the initial selection icons 141, already displayed on the initial search screen 140 off of the information display screen 12A, and instead display initial selection icons 141, which had not been displayed so far.

Then, with the portable player device 10, upon within an operation end touch region corresponding to the display portion of an initial selection icon 141 being tapped on the information display screen 12A displaying the initial search screen 140, a selection command can be input for selection of the initial (alphabet letter) displayed as the initial selection icon 141. Upon a tap operation being performed with the information display screen 12A displaying the initial search screen 140, to input a selection command for a desired initial, the jacket photograph images 102 within the list display portion 140B are scrolled downwards on the screen or upwards on the screen, depending on the initial which the user has selected.

Thus, from the multiple artist names corresponding to the genre already selected by the user, the control unit 20 displays a list of the jacket photograph images 102 corresponding to the artist names of the initial selected by the user, at the middle of the list display portion 140B (i.e., at the vertical middle).

In this state, with the portable player device 10, in the event that the operation end touch region corresponding to the display portion of the initial search icon 51 is tapped on the display unit 12, an initial search cancel command can be input. Accordingly, upon the operation end touch region corresponding to the display portion of the initial search icon 51 is tapped on the display unit 12, the control unit 20 generates artist selection screen data again, which is set to the display unit 12.

Accordingly, while the control unit 20 displays the artist selection screen 100 in the visual mode on the information display screen 12A instead of the initial search screen 140, the jacket photograph images 102 corresponding to the artist names of the initial selected by the user remain displayed at the middle of the list display portion 140B. Even if the user was not able to find a jacket photograph image 102 corresponding to the desired artist name while scrolling through the jacket photograph images 102 within the artist selection screen 100 by performing touch operations, switching to the initial search screen 140 allows the user to easily find a jacket photograph image 102 corresponding to the desired artist name.

Also, in the event that an initial search command is input in a state wherein one of the display screens described above according to FIGS. 16 through 19 and 21 through 24 is displayed on the information display screen 12A, an initial search screen of a similar configuration as that of the initial search screen 140 described above is generated based on the display screen at the time of the initial search command being input, and is displayed. In the initial search screen, the user selects an initial in the same way as described above, and the control unit 20 displays a list of genres, jacket photograph images corresponding to the album titles, artists names, album titles, or a list of music titles, the initial selected by the user, at the middle of the list display portion (i.e., at the vertical middle).

Now, in a state that the artist selection screen 100 is displayed in visual mode on the information display screen 12A for example, and the home button 15 is pressed to input a home menu display command, the control unit 20 modifies the artist selection screen data an generates display screen data for a display screen for a home menu. Note that in the following description, the display screen for a home menu may be referred to as "home menu screen", and the display screen data for the home menu screen may be referred to as "home menu screen data".

Figure 28:
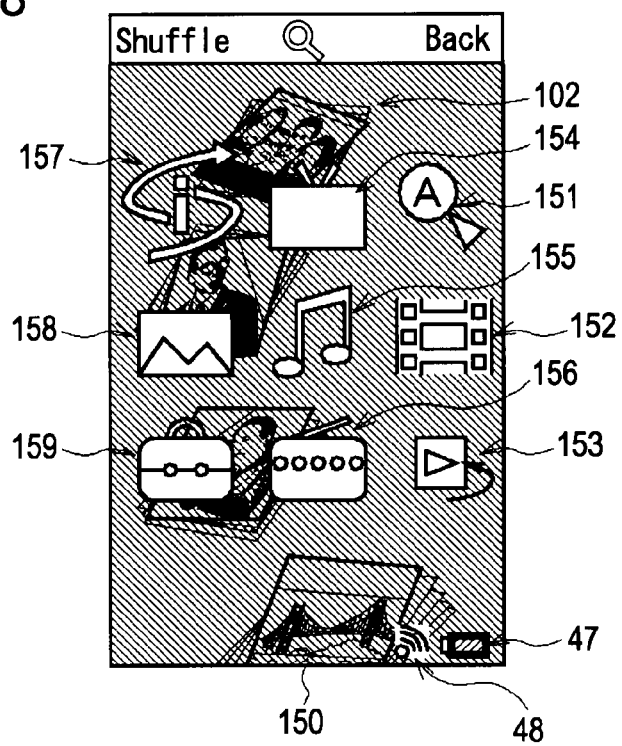
FIG. 28 is an outline drawing illustrating the configuration of a home menu screen.

The control unit 20 then sends the home menu screen data to the display unit 12 to display a home menu screen 150 such as shown in FIG. 28, based on the home menu screen data, on the information display screen 12A. In this home menu screen 150, the jacket photograph images 102 grouped by artist name are displayed in a three-dimensional manner in the same way as with the above-described artist selection screen 100 in the visual mode, from the upper end of the screen to the lower end of the screen. Also, icons 151 through 159, representing nine functions which the control unit 20 can execute, for example, are disposed in matrix fashion at the middle portion of the home menu screen 150.

The icons 151 through 159 are as follows. An icon 151 is an icon representing the initial search function (hereinafter may be referred to as "search function icon"). An icon 152 is an icon representing a data playing function for video data (hereinafter may be referred to as "video playing function icon"). An icon 153 is an icon representing a playing screen display function for displaying the music playing screen 80 on the information display screen 12A (hereinafter may be referred to as "playing screen display function icon"). An icon 154 is an icon representing a reception function of television broadcasts (hereinafter may be referred to as "television reception function icon"). An icon 155 is an icon representing a data playing function for music data (hereinafter may be referred to as "music playing function icon"). An icon 156 is an icon representing a reception function of radio broadcasts (hereinafter may be referred to as "radio reception function icon"). An icon 157 is an icon representing a shuffle playing function for music data (hereinafter may be referred to as "shuffle playing function icon"). An icon 158 is an icon representing a data reproduction function for photograph image data (hereinafter may be referred to as "photograph image reproduction function icon"). An icon 159 is an icon representing a setting function (hereinafter may be referred to as "setting function icon").

With the portable player device 10, predetermined regions corresponding to the display portions of the icons 151 through 159 on the information display screen 12A displaying the home menu screen 150 are set as operation end touch regions for tap operations. Upon an operation end touch region corresponding to a display portion of the icons 151 through 159 on the information display screen 12A displaying the home menu screen 150 being tapped, a function selection command for selecting a function represented by the icons 151 through 159 can be input. Accordingly, upon various function selection commands being input by tap operations being performed in a state with the home menu screen 150 displayed on the information display screen 12A, various functions such as described above are realized accordingly.

Note that even in the event that one of the display screens described above according to FIGS. 16 through 25 is displayed on the information display screen 12A, upon a home menu display command being input, the control unit 20 can generate and display a home menu screen of the same configuration as the above-described home menu screen 150, based on the display screen displayed at the time that the home menu display command is input. The user can then input a function selection command for selecting one of the various functions on the home menu screen.

In addition to this configuration, in the state that the artist selection screen 100 is independently displayed in the visual mode on the information display screen 12A, upon an icon display command being input by a diagonal first-direction sliding operation being performed on the information display screen 12A, the display state of the artist selection screen 100 is changed.

Figure 29:
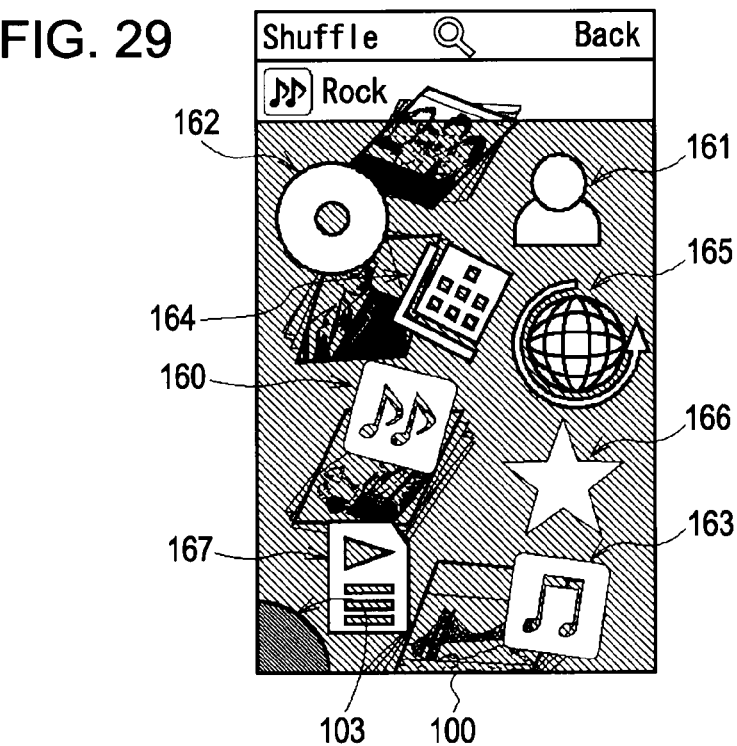
FIG. 29 is an outline drawing for description of superimposed display of sorting icons on an artist selection display screen, by a diagonal first-direction sliding operation.

As shown in FIG. 29, which is denoted in part by the same reference numerals as FIG. 22, in response to the diagonal first-direction sliding operation performed by the user at this time, the control unit 20 superimposes and displays multiple menu icons 160 through 167 on the artist selection screen 100 displayed in independently on the information display screen 12A. For example, the multiple menu icons 160 through 167 each have different shapes. The menu icons 160 through 167 represent types of processing for rearranging the play order of multiple pieces of music data stored in the content storage unit 22 in accordance with the shapes thereof, i.e., represent items in an executable processing menu for sorting the play order. Note that the menu icons 160 through 167 represent the types of executable sort processing, and accordingly the menu icons 160 through 167 hereinafter may be referred to as "sort icons 160 through 167".

Examples of actual sort icons 160 through 167 including sorting processing for rearranging the play order of the multiple pieces of music data based on, for example, genre, artist name, album title, and music title, in alphabetical order. Other examples include sort processing for rearranging the multiple pieces of music data based on, for example, year of release, date acquired from information processing device and computer device, evaluation value (e.g., number of times played), and playlist.

With the portable player device 10, upon the sort icons 160 through 167 being superimposed on the artist selection screen 100 in accordance with the diagonal first-direction sliding operation, predetermined regions corresponding to the display portions of the sort icons 160 through 167 on the information display screen 12A are set as operation end touch regions for tap operations. Also, with the portable player device 10, commands which can be input upon tapping within the operation end touch regions corresponding to the display portions of the sort icons 160 through 167 on the information display screen 12A are set to execution commands for the sort processing represented by the sort icons 160 through 167.

Accordingly, in the event that a tap operation is performed on the information display screen 12A in a state that the sort icons 160 through 167 are displayed on the artist selection screen 100 in a superimposed manner, so as to input a sort processing execution command, the control unit 20 executes the sort processing and rearranges the play order of the multiple pieces of music data. The control unit 20 further generates a sort list (not shown) indicating the rearranged play order, and sends the generated sort list to the display unit 12 to be displayed on the information display screen 12A. The sort list in this case may be a list wherein the genre or artist name or the like is alphabetically arranged, a list wherein identification information unique to the music data registered in a playlist is shown as music titles in that order and displayed and so on.

Accordingly, the control unit 20 presents a play order of music data with a sort list display on the information display screen 12A, and in the event that the play/stop button 14 is pressed by the user in this state for example, to input a play start command, the music data is played in the order following the sort list.

Figure 30:
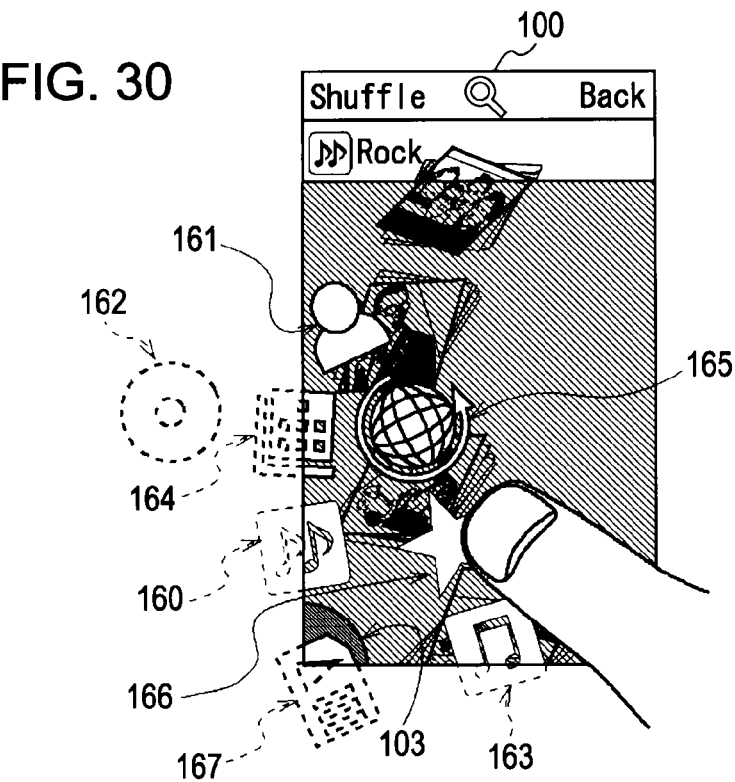
FIG. 30 is an outline drawing for description of superimposed display of sorting icons on an artist selection display screen.

Now, as shown in FIG. 30, upon a diagonal first-direction sliding operation being performed on the information display screen 12A, the control unit 20 moves and displays the sort icons 160 through 167 as if they were being drawn in from outside of the operation start touch region into the artist selection screen 100. Note however, in the case of the control unit 20 determining the type of the touch operation, upon a maximum displacement amount of the comparative reference displacement amount or greater being detected within up to a touch operation end point-in-time in a state that the touch operation duration time has exceeded the comparative reference time as described above, the control unit 20 detects the inter-touch-position line segment angle at that point-in-time. The comparative reference displacement amount which the control unit 20 uses for such touch operation type determination is set so as to be sufficiently short as compared to the distance which the thumb of the user moves in the case of performing the diagonal first-direction sliding operation on the information display screen 12A.

Accordingly, in the event that the user performs a diagonal first-direction sliding operation on the information display screen 12A, the control unit 20 can determine that the diagonal first-direction sliding operation has been performed at a relatively early point after the diagonal first-direction sliding operation has been started, and detect the input command. In other words, the diagonal first-direction sliding operation performed by the user is recognized by the control unit 20 as the diagonal first-direction sliding operation having been performed, and continues to be performed for a while following detection of the input command.

Thus, upon detecting input of an icon display command due to the user performing the diagonal first-direction sliding operation on the information display screen 12A, the control unit 20 detects the speed of displacement of the thumb at the touch position (i.e., speed of movement of the thumb) due to the diagonal first-direction sliding operation. Note that in the following description, the speed of displacement of the thumb on the information display screen 12A may also be referred to as "touch position displacement speed".

At this time, the control unit 20 detects the touch position displacement speed based on the touch operation duration time, in which clocking had been started from the touch operation start point-in-time of the diagonal first-direction sliding operation, and the touch course length in which the start point-in-time touch position of the touch operation start point-in-time had been detected as the starting point.

Note however, that while the diagonal first-direction sliding operation is being performed, the control unit 20 re-detects and updates the length of the touch course (hereinafter may be referred to as "touch course length"), each time a new touch position is detected by the touch position detecting unit 24. Accordingly, while the diagonal first-direction sliding operation is being performed, the touch operation duration time at that point-in-time, and the touch position displacement speed based on the updated touch course length, are also sequentially detected, each time a detection result of the touch course length is updated.

While the diagonal first-direction sliding operation is being performed, the touch position displacement speed is compared with a predetermined comparative reference speed that has been set beforehand, and also the touch course length is compared with a comparative reference length that has been set beforehand, each time the touch position displacement speed is detected.

In the event that the result thereof shows that the touch course length is shorter than the comparative reference length, and also the touch position displacement speed is slower than the comparative reference speed, the control unit 20 moves the sort icons 160 through 167 to be drawn into the artist selection screen 100 as if they were being moved from the outside of the operation start touch region, at approximately the same speed as the touch position displacement speed. Thus, while the touch position displacement speed is slower than the comparative reference speed, the control unit 20 moves the sort icons 160 through 167 so as to follow the touch position which is being displaced on the information display screen 12A, i.e., the moving thumb, as shown in FIG. 30, thereby gradually dragging into the artist selection screen 100 from outside of the operation start touch region.

However, even if the touch position displacement speed is slower than the comparative reference speed, once the control unit 20 detects that the touch course length has reached the comparative reference length (i.e., once the thumb crosses over the middle portion of the artist selection screen 100 and moves to the right side of the screen), at that point the sort icons 160 through 167 are rapidly moved to the final display position within the artist selection screen 100. Note that the display position where the icons are to be finally displayed on the display screen due to the diagonal first-direction sliding operation, i.e., a display position to which the icons are moved over the display screen so as to be finally fixed and displayed on the display screen, may be referred to in the following description as "final display position". Thus, the control unit 20 can display the sort icons 160 through 167 at the predetermined position on the artist selection screen 100 as shown in FIG. 29 (i.e., the final display position) in a superimposed manner.

Also, even if the touch course length is shorter than the comparative reference length, upon the control unit 20 detecting that the touch position displacement speed is at the comparative reference speed or faster, at that point the sort icons 160 through 167 are rapidly moved to the final display position within the artist selection screen 100. Thus, in the event that the user has performed a diagonal first-direction sliding operation, the control unit 20 moves the sort icons 160 through 167 to be drawn into the artist selection screen 100 as if they were being moved from the outside of the operation start touch region, and displays at the final display position.

Now, it is conceivable that the movement speed and movement distance of the thumb for a diagonal first-direction sliding operation will differ from one user to another, and also not consistently be the same for the same user either depending on the usage state of the portable player device 10. Accordingly, in the event that a touch operation is performed, the control unit 20 determines the type of touch operation at an early stage in the starting thereof, and detects the input command.

However, upon the user performing a diagonal first-direction sliding operation on the information display screen 12A, the control unit 20 moves the sort icons 160 through 167 to be drawn into the artist selection screen 100 as if they were being moved from the outside of the operation start touch region, at a way of moving that corresponds to the touch position displacement speed and movement distance of the thumb, and displays. This avoids a situation wherein the user has intended to move the thumb in a relatively long manner (i.e., over a long time or a ling distance) for the diagonal first-direction sliding operation, but the control unit 20 completes display of the sort icons 160 through 167 at the final position on the artist selection screen 100 at an early stage of the diagonal first-direction sliding operation, which would leave the user with an unnatural sensation.

The control unit 20 also avoids a situation wherein the user has moved the thumb quickly for a short distance for a diagonal first-direction sliding operation, and has completed the operation, but display of the sort icons 160 through 167 at the final position on the artist selection screen 100 is not completed, which would also leave the user with an unnatural sensation. That is to say, the control unit 20 enables the user to perform diagonal first-direction sliding operations naturally without any unnatural sensations.

Additionally, in the event of detecting ending of the diagonal first-direction sliding operation before display of the sort icons 160 through 167 on the artist selection screen 100 is completed (i.e., before displaying at the final display position), the control unit 20 puts out the sort icons 160 through 167 which were being drawn into the artist selection screen 100, from the operation start touch region. Thus, in the event that the user has released the thumb from the information display screen 12A to interrupt the diagonal first-direction sliding operation, or has released the thumb from the information display screen 12A due to noticing an erroneous operation, the control unit 20 can avoid a situation wherein the sort icons 160 through 167 are unintentionally displayed at the final display position on the artist selection screen 100. That is to say, a situation can be avoided wherein the user unintentionally displays the sort icons 160 through 167 on the artist selection screen 100, and then has to remove the sort icons 160 through 167.

Now, in a state wherein the sort icons 160 through 167 are displayed on the artist selection screen 100 in a superimposed manner, and an icon removal command is input by a diagonal second-direction sliding operation being performed on the information display screen 12A, the sort icons 160 through 167 displayed on the artist selection screen 100 are put out from the operation start touch region, and removed.

In the event that a diagonal second-direction sliding operation is performed in this way, the control unit 20 determines that the diagonal second-direction sliding operation has been performed at a relatively early stage after the diagonal second-direction sliding operation has been started, and detects the input command, in the same way as with the diagonal first-direction sliding operation described above. That is to say, in the same way as with the diagonal first-direction sliding operation, the diagonal second-direction sliding operation continues for a while even after the diagonal second-direction sliding operation performed by the user is determined and the input command is detected.

Accordingly, upon the control unit 20 detecting input of the icon removal command due to the diagonal second-direction sliding operation having been performed on the information display screen 12A, the touch position displacement speed due to the diagonal second-direction sliding operation is detected in the same way as above.

At this time, the control unit 20 sequentially detects the touch position displacement speed while sequentially updating the touch course length while the diagonal second-direction sliding operation is being performed, in the same way as with the diagonal first-direction sliding operation described above. Further, while the diagonal second-direction sliding operation is being performed, the control unit 20 compares the touch position displacement speed with the comparative reference speed, and also compares the touch course length with the comparative reference length, each time the touch position displacement speed is detected.

In the event that the touch course length is shorter than the comparative reference length, and also the touch position displacement speed is slower than the comparative reference speed, the control unit 20 moves the sort icons 160 through 167 on the artist selection screen 100 at about the same speed as the touch position displacement speed, so as to be put out from the operation start touch region. Thus, while the touch position displacement speed is slower than the comparative reference speed, the control unit 20 moves the sort icons 160 through 167 so as to follow the touch position which is being displaced on the information display screen 12A, i.e., the moving thumb, thereby gradually putting out from the artist selection screen 100 to the outside of the operation start touch region.

However, even if the touch position displacement speed is slower than the comparative reference speed, once the control unit 20 detects that the touch course length has reached the comparative reference length (i.e., once the thumb crosses over the middle portion of the artist selection screen 100 from the right side of the screen), at that point the sort icons 160 through 167 are rapidly moved from the artist selection screen 100 to the outside of the operation start touch region. Thus, the control unit 20 completely remove the sort icons 160 through 167 from the artist selection screen 100.

Also, even if the touch course length is shorter than the comparative reference length, upon the control unit 20 detecting that the touch position displacement speed is at the comparative reference speed or faster, at that point the sort icons 160 through 167 are rapidly moved from the artist selection screen 100 to the outside of the operation start touch region. Thus, in the event that the user has performed a diagonal second-direction sliding operation, the control unit 20 moves the sort icons 160 through 167 as if they were being moved from the artist selection screen 100 to the outside of the operation start touch region, and finally completely removed.

Now, it is conceivable that, as with the case of the diagonal first-direction sliding operation, the movement speed and movement distance of the thumb for a diagonal second-direction sliding operation will differ from one user to another, and also not consistently be the same for the same user either depending on the usage state of the portable player device 10. However, upon the user performing a diagonal second-direction sliding operation on the information display screen 12A, the control unit 20 moves the sort icons 160 through 167 as if they were being moved from the artist selection screen 100 to the outside of the operation start touch region, at a way of moving that corresponds to the touch position displacement speed and movement distance of the thumb, so as to be removed. This avoids a situation wherein the user has intended to move the thumb in a relatively long manner (i.e., over a long time or a ling distance) for the diagonal first-direction sliding operation, but the control unit 20 completes removal of the sort icons 160 through 167 from the artist selection screen 100 at an early stage of the diagonal second-direction sliding operation, which would leave the user with an unnatural sensation.

The control unit 20 also avoids a situation wherein the user has moved the thumb quickly for a short distance for a diagonal second-direction sliding operation, and has completed the operation, but removal of the sort icons 160 through 167 from the artist selection screen 100 is not completed, which would also leave the user with an unnatural sensation. That is to say, the control unit 20 enables the user to perform diagonal second-direction sliding operations naturally without any unnatural sensations.

Additionally, in the event of detecting ending of the diagonal second-direction sliding operation before removal of the sort icons 160 through 167 on the artist selection screen 100 is completed, the control unit 20 draws in the sort icons 160 through 167 which were being put out from the artist selection screen 100, to the original display position on the artist selection screen 100 again (i.e., the final display position). Thus, in the event that the user has released the thumb from the information display screen 12A to interrupt the diagonal second-direction sliding operation, or has released the thumb from the information display screen 12A due to noticing an erroneous operation, the control unit 20 can avoid a situation wherein the sort icons 160 through 167 are unintentionally completely removed from the artist selection screen 100. That is to say, a situation can be avoided wherein the user unintentionally removes the sort icons 160 through 167 from the artist selection screen 100, and then has to display the sort icons 160 through 167 again.

Now, in a state wherein the genre selection screen 40, artist selection screen 50, album selection screen 60, or music selection screen 70 is displayed in the list mode on the information display screen 12A, and a diagonal first-direction sliding operation is performed to input an icon display command, the control unit 20 displays the sort icons 160 through 167 in the same way as described above. Also, in the event that the genre selection screen 90, album selection screen 110, or music selection screen 120, is displayed in the visual mode on the information display screen 12A, and a diagonal first-direction sliding operation is performed to input an icon display command, the control unit 20 displays the sort icons 160 through 167 in the same way as described above.

On the other hand, in a state wherein the genre selection screen 40, artist selection screen 50, album selection screen 60, or music selection screen 70 is displayed in the list mode on the information display screen 12A with the sort icons 160 through 167 superimposed thereupon, and a diagonal second-direction sliding operation is performed to input an icon removal command, the control unit 20 removes the sort icons 160 through 167 in the same way as described above. Also, in the event that the genre selection screen 90, album selection screen 110, or music selection screen 120, is displayed in the visual mode on the information display screen 12A with the sort icons 160 through 167 superimposed thereupon, and a diagonal second-direction sliding operation is performed to input an icon removal command, the control unit 20 removes the sort icons 160 through 167 in the same way as described above.

Figure 31:
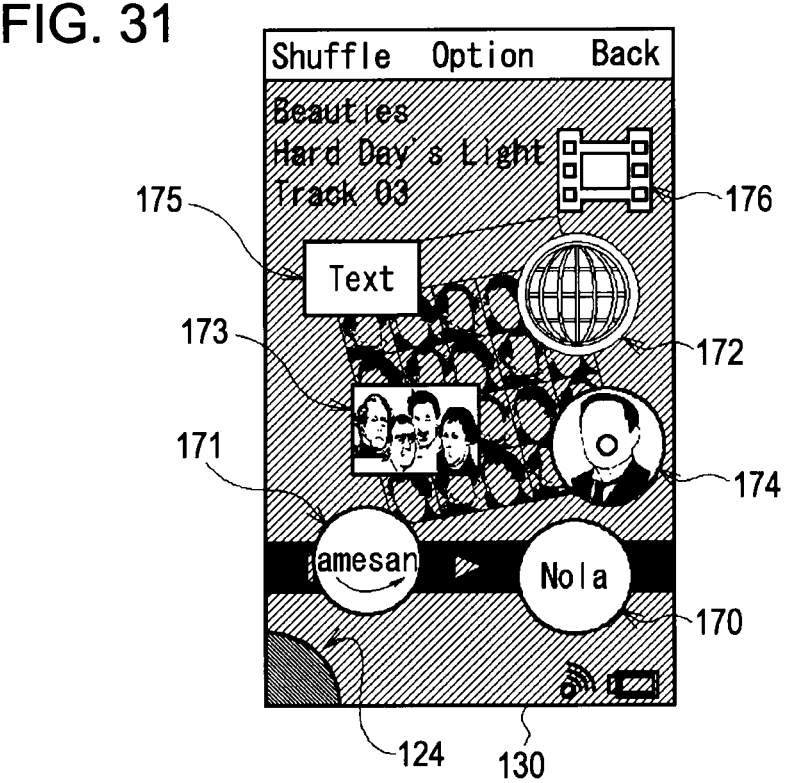
FIG. 31 is an outline drawing for description of superimposed display of search icons on a music playing screen, by a diagonal first-direction sliding operation.

Now, in the event that the music playing screen 130 is independently displayed in the visual mode on the information display screen 12A for example, and the diagonal first-direction sliding operation is performed on the information display screen 12A to input an icon display command, the display state is changed with multiple menu icons different from the above-described sort icons displayed on the music playing screen 130. That is to say, as shown in FIG. 31 denoted with the same reference numerals as with FIG. 25 for the corresponding portions, the control unit 20 displays multiple menu icons 170 through 176 on the music playing screen 130 which had been displayed independently on the information display screen 12A in accordance with the diagonal first-direction sliding operation performed by the user at this time.

The menu icons 170 through 176 are formed with different shapes and pictures. The shapes and pictures of the menu icons 170 through 176 represent the types of processing for requesting information searches to various types of information processing devices on the Internet (i.e., executable processing menu items). Note that since the menu icons 170 through 176 indicate types of executable search request processing, in the following description, the menu icons 170 through 176 may also be referred to as "search icons 170 through 176".

Actual examples of the search icons 170 through 176 include those indicating search request processing for giving an information processing device a search request to purchase music data of a desired artist, those indicating search request processing for giving an information processing device a search request for literature on a desired artist, those indicating search request processing for giving an information processing device a search request regarding the history of a desired artist, those indicating search request processing for giving an information processing device events in which a desired artist will be participating, and those indicating search request processing for giving an information processing device a search request for music related to a desired artist (i.e., music where the artist has performed with other artists, music which the artist has provided for other artists, etc.).

Further examples of the search icons 170 through 176 include those indicating search request processing for giving an information processing device a search request for text information relating to a desired artist (e.g., lyrics of a song, based on music data currently being played), and those indicating search request processing for giving an information processing device a search request for video images relating to a desired artist (e.g., a music clip of the desired artist).

With the portable player device 10, in the event that the search icons 170 through 176 are displayed superimposed upon the music playing screen 130 in accordance with the diagonal first-direction sliding operation, predetermined regions corresponding to the display portions of the search icons 170 through 176 on the information display screen 12A are set as operation end touch regions for tap operations. Also, with the portable player device 10, commands which can be input when within the predetermined regions corresponding to the display portions of the search icons 170 through 176 are tapped, are set as the execution commands for the search request processing indicated by the search icons 170 through 176. Accordingly, in a state wherein the search icons 170 through 176 are displayed superimposed on the music playing screen 130, and a tap operation is performed on the information display screen 12A, thereby inputting an execution command for search request processing, the search request processing is executed.

At this time, the control unit 20 stores the artist name corresponding to the music data being played at the current point-in-time as a search key, stores this search key along with the search conditions corresponding to the search request processing currently being executed, and generates search request data for searching for the desired information in accordance with the search conditions.

Further, the control unit 20 selects an information providing device, from the various types of information providing devices registered by network address or the like beforehand, regarding which the desired information can be searched for under the search conditions. The control unit 20 the transmits the search request data to the selected information providing device on the Internet, via the closest access point by way of the wireless communication unit 35.

Figure 32:
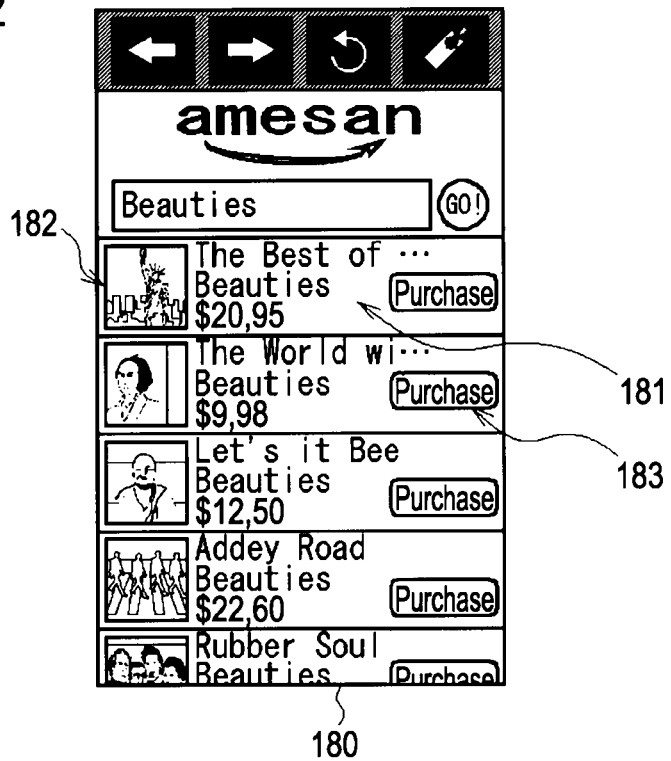
FIG. 32 is an outline drawing illustrating the configuration of a search information screen.

As a result, upon a search being performed using the search key included in the search request data and display screen data capable of displaying the desired information is transmitted from the information providing device via the access point, the control unit 20 receives the display screen data with the wireless communication unit 35 and inputs it. The control unit 20 then sends the display screen data to the display unit 12 so as to be displayed as a display screen 180 such as shown in FIG. 32, based on the display screen data (hereinafter, may be referred to as "search information screen").

In this case, the search information screen 180 displays a list of album titles 181 of albums released by the artist of which the artist name was used as the search key, and jacket photograph images 182, for example. The search information screen 180 also displays an icon 183 indicating an album purchase command, which is a command which can be input by a tap operation, for example.

The display screen data of the search information screen 180 is also provided with information indicating a processing technique for enabling input of the purchasing command by a tap operation on the information display screen 12A on which the search information screen 180 is displayed, for example. Accordingly, with the portable player device 10, in the event that the search information screen 180 is displayed on the information display screen 12A, a predetermined region on the information display screen 12A corresponding to the portion where the icon 183 is displayed is set to be the operation end touch region of a tap operation.

Thus, with the portable player device 10, upon within the operation end touch region of the information display screen 12A displaying the search information screen 180 being tapped, a purchase command can be input. Upon the information display screen 12A displaying the search information screen 180 being tapped so that a purchase command is input, the control unit 20 generates purchase request data for performing a purchase request of music data, which is the album selected along with the input of the purchase command performed by the tap operation of the user, in accordance with the information indicating the processing technique.

Accordingly, the control unit 20 transmits the purchase request data to an information providing device on the Internet via the closest access point by way of the wireless communication unit 35, and thus can purchase the music data transmitted from the information providing device so as to be recorded in the content storage unit 22, in the same way as with the case described above.

Now, in the event that the music playing screen 130 in the visual mode is displayed on the information display screen 12A and the diagonal first-direction sliding operation is performed to input an icon display command, the search icons 170 through 176 are displayed in the same way as the case of displaying the sort icons 160 through 167 as described above. Also, in the event that the search icons 170 through 176 are displayed superimposed on the music playing screen 130 in the visual mode and the diagonal second-direction sliding operation is performed to input an icon remove command, the search icons 170 through 176 are removed in the same way as the case of removing the sort icons 160 through 167 as described above.

Also, in the event that the music playing screen 80 in the list mode is displayed on the information display screen 12A and the diagonal first-direction sliding operation is performed to input an icon display command, the search icons 170 through 176 are displayed in the same way as the case of displaying the sort icons 160 through 167 as described above. Further, in the event that the search icons 170 through 176 are displayed superimposed on the music playing screen 80 in the list mode and the diagonal second-direction sliding operation is performed to input an icon remove command, the search icons 170 through 176 are removed in the same way as the case of removing the sort icons 160 through 167 as described above.

(2-3) Information Processing Procedures

Next, information processing procedures for the control unit 20 to display and remove the sort icons 160 through 167 and search icons 170 through 176 in accordance with the diagonal first-direction sliding operation and diagonal second-direction sliding operation will be described with reference to FIGS. 33 and 34. Note that hereinafter, the sort icons 160 through 167 and search icons 170 through 176 may collectively be referred to as "menu icons", for the sake of description. Also, in the following description of information processing procedures, the above-described genre selection screens 40 and 90, artist selection screens 50 and 100, and so on described with reference to FIGS. 16 through 25, may be collectively referred to as "display screens".

Figure 33:
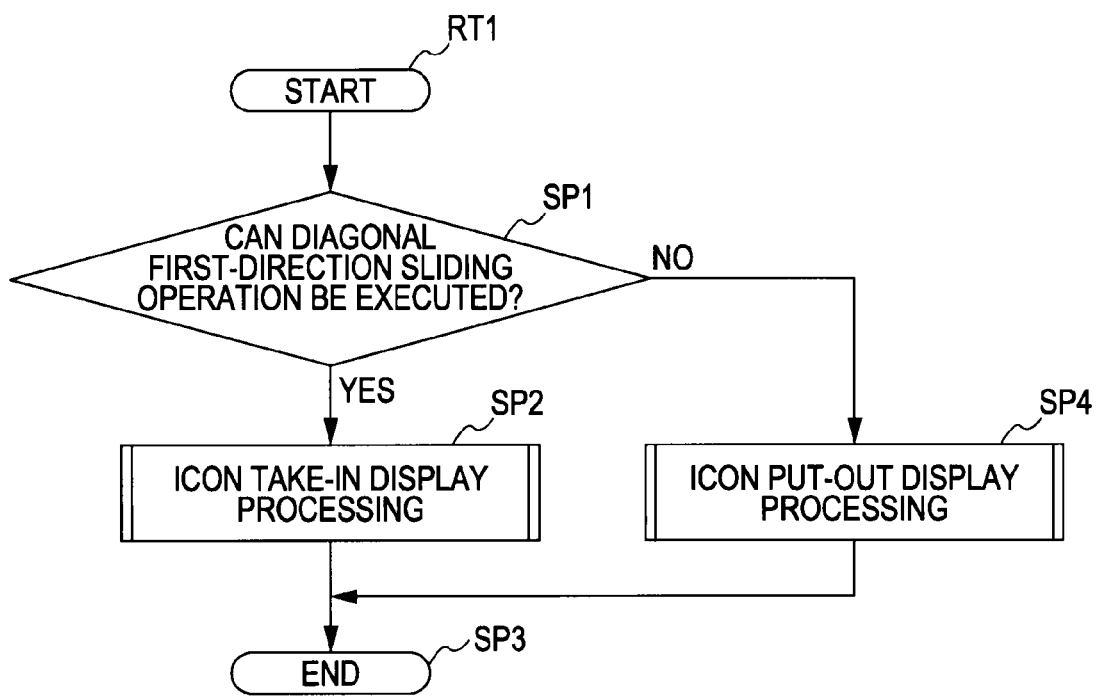
FIG. 33 is a flowchart illustrating information processing procedures.

On the state that a display screen described above with reference to FIGS. 16 through 25 is displayed on the information display screen 12A of the display unit 12, the information display screen 12A is touch operated, and detection of the touch position by the touch position detecting unit 24 begins, the control unit 20 starts the information processing procedure RT1 shown in FIG. 33.

Upon starting of the information processing procedure RT1, in step S1, the control unit 20 determines whether or not a diagonal first-direction sliding operation can be executed for command input on the information display screen 12A. In the event that a positive result is obtained in step S1, this means that menu icons have not yet been displayed on the display screen displayed on the information display screen 12A for example, meaning that there is a possibility that a diagonal first-direction sliding operation might be performed to display the menu icons.

In the event of obtaining such a positive result in step S1, the control unit 20 advances to the next step S2. In step S2, the control unit 20 executes icon drawing in processing wherein menu icons are drawn into the display screen from outside, in accordance with the diagonal first-direction sliding operation.

The flow then advances to the next step S3, and the information processing procedure RT1 ends.

Also, in the event that a negative result is obtained in step S1, this means that menu icons are already displayed on the display screen displayed on the information display screen 12A for example, meaning that a diagonal second-direction sliding operation might be performed to remove the menu icons.

In the event of obtaining such a negative result, the flow proceeds to step S4, where the control unit 20 executes icon put-out removal processing for putting out the menu icons from the display screen so as to be removed, in accordance to the diagonal second-direction sliding operation.

The flow then advances to the next step S3, and the information processing procedure RT1 ends.

In actual use, upon the flow proceeding to step S2, the control unit 20 starts an icon drawing-in display processing subroutine SRT1 shown in FIG. 34.

Upon starting the icon drawing-in display processing subroutine SRT1, in step S11 the control unit 20 determines whether or not the start point-in-time touch position is within the operation start touch region. In the event that a positive result is obtained in step S11, this means that there is a possibility that a diagonal first-direction sliding operation which is a touch operation, or a tap operation of which the operation start touch region is the operation end touch region, is being performed as to the information display screen 12A at this time.

Accordingly, in the event of obtaining such a positive result in step S11, the control unit 20 advances the flow to the next step S12. In step S12, the control unit 20 determines whether or not the touch operation duration time has elapsed the comparative reference time.

If a positive result is obtained in step S12, this means that the thumb is being brought into contact with the information display screen 12A at this time for the comparative reference time or longer, so there is a great possibility that a diagonal first-direction sliding operation which is a touch operation is being performed.

Accordingly, upon obtaining such a positive result in step S12, the control unit 20 advances the flow to the next step S13. In step S13, the control unit 20 determines whether or not the maximum displacement amount is the comparative reference displacement amount or not. In the event that a positive result is obtained in step s13, this means that the thumb in contact with the information display screen 12A at this time is being moved in a sliding manner, meaning that there is a great possibility that a diagonal first-direction sliding operation which is a touch operation is being performed.

Accordingly, upon obtaining such a positive result in step S13, the control unit 20 advances the flow to the next step S14. In step S14, the control unit 20 determines whether or not the inter-touch-position line segment angle is an angle within a direction detection angle range included in the determination conditions for determination of the diagonal first-direction sliding operation. In the event that a positive result is obtained in step S14, this means that the touch operation performed on the information display screen 12A at this time is a diagonal first-direction sliding operation.

Accordingly, upon obtaining such a positive result in step S14, the control unit 20 advances to the next step S15. In step S15, the control unit 20 starts moving the menu icons, so as to be drawn into the display screen from outside of the operation start touch region, while determining whether or not the touch position displacement speed of the touch position being displayed on the information display screen 12A due to the diagonal first-direction sliding operation is at or above the comparative reference speed. In the event that a positive result is obtained in step S15, this means that the thumb is being moved relatively rapidly over the information display screen 12A due to the diagonal first-direction sliding operation.

Accordingly, in the event of obtaining such a positive result in step S15, the control unit 20 advances the flow to the next step S16. In step S16, the control unit 20 rapidly moves the menu icons, which had been moved so as to be drawn into the display screen from outside of the operation start touch region, to the final display position. Accordingly, the control unit 20 fixedly displays the menu icons at the final display position in a superimposed manner on the display screen.

The control unit 20 then advances the flow to the next step S17, where the icon drawing-in display processing subroutine SRT1 ends. Upon the icon drawing-in display processing subroutine SRT1 ending, the control unit 20 transitions the flow to step S3 in the information processing procedure RT1.

On the other hand, in the event that a negative result is obtained in step S15, this means that the thumb is being moved relatively slowly over the information display screen 12A due to the diagonal first-direction sliding operation.

Accordingly, in the event of obtaining such a negative result in step S15, the control unit 20 advances the flow to step S18. In step S18, the control unit 20 gradually moves the menu icons being moved over the information display screen 12A, so as to be drawn into the display screen from outside of the operation start touch region following the thumb.

The control unit 20 then advances the flow to the next step S19. In step S19, the control unit 20 determines whether or not the touch course length is the comparative reference course length or longer. In the event that a positive result is obtained in step S19, this means that the thumb on the information display screen 12A has moved from within the operation start touch region to nearby the position corresponding to the final display position.

Accordingly, in the event of obtaining such a positive result in step S19, the control unit 20 advances the flow to step S16.

On the other hand, in the event of obtaining a negative result in step S19, this means that while the thumb on the information display screen 12A is moving away from the operation start touch region, it has not traveled very far from the operation start touch region.

Accordingly, in the event of obtaining such a negative result in step S19, the control unit 20 advances the flow to step S20. In step S20, the control unit 20 determines whether or not the diagonal first-direction sliding operation being performed on the information display screen 12A by the user has ended. In the event that a negative result is obtained in step S20, this means that the user is moving the thumb over the information display screen 12A, and that the diagonal first-direction sliding operation is still continuing.

Accordingly, in the event of obtaining such a negative result in step S20, the control unit 20 returns to step S18.

On the other hand, in the event that a positive result is obtained in step S20, this means that while displaying of the menu icons at the final display position on the display screen has not been completed, the user has released the thumb from the information display screen 12A, and the diagonal first-direction sliding operation has been interrupted.

Accordingly, in the event of obtaining such a positive result in step S20, the control unit 20 advances the flow to the next step S21. In step S21, the control unit 20 removes the menu icons, which had been started to be drawn in into the display screen from outside of the operation start touch region, so as to be put outside of the operation start touch region from the display screen.

The control unit 20 then returns the flow to step S17. In step S17, the control unit 20 ends the icon drawing-in display processing subroutine SRT1.

On the other hand, upon a negative result being obtained in step S12, this means that a tap operation wherein the operation start touch region is the operation end touch region has been performed on the information display screen 12A at this time, so as to input a hierarchical level return command.

Accordingly, in the event of obtaining such a negative result in step S12, the control unit 20 advances the flow to step S22. In step S22, the control unit 20 returns the display screen displayed on the information display screen 12A to a display screen one hierarchical level higher.

The control unit 20 then transitions the flow to step S17, and ends the icon drawing-in display processing subroutine SRT1.

Also, upon a negative result being obtained in step S11, this means that a touch operation other than the diagonal first-direction sliding operation and also a tap operation wherein the operation start touch region is the operation end touch region, may be being performed on the information display screen 12A. Accordingly, upon obtaining such a negative result in step S11, the control unit 20 determines whether or not a touch operation other than the diagonal first-direction sliding operation and the tap operation wherein the operation start touch region is the operation end touch region is being performed.

In the event that no command is input, the control unit 20 advances the flow to step S17, while in the event that a command is input by a touch operation, the control unit 20 executes the processing in accordance with the command, and then advances the flow to step S17 and then ends the icon drawing-in display processing subroutine SRT1.

Further, in the event that a negative result is obtained in step S13, this means that the thumb in touch with the information display screen 12A at this time has hardly moved at all, and accordingly a diagonal first-direction sliding operation has not been performed.

Accordingly, in the event that such a negative result is obtained in step S13, the control unit 20 advances the flow to step S17 and then ends the icon drawing-in display processing subroutine SRT1.

Further, in the event that a negative result is obtained in step S14, this means that the thumb in touch with the information display screen 12A at this time is moving in a direction other than that for the diagonal first-direction sliding operation, so accordingly a diagonal first-direction sliding operation has not been performed.

Accordingly, in the event that such a negative result is obtained in step S14, the control unit 20 advances the flow to step S17 and then ends the icon drawing-in display processing subroutine SRT1.

On the other hand, upon making transition to step S4, the control unit 20 starts an icon put-out removal processing subroutine SRT2 shown in FIG. 35.

Upon starting the icon put-out removal processing subroutine SRT2, in step S31 the control unit 20 determines whether or not the start point-in-time touch position is within the operation end touch region. In the event that a negative result is obtained in step S31, this means that a touch operation other than that of the diagonal second-direction sliding operation may be being performed as a touch operation.

Accordingly, in the event of obtaining such a positive result in step S31, the control unit 20 advances the flow to the next step S32. In step S32, the control unit 20 determines whether or not the touch operation has ended before the touch operation duration time has reached the comparative reference time. In the event that a positive result is obtained in this step S32, this means that a tap operation is being performed as the touch operation as to the information display screen 12A.

Accordingly, upon obtaining such a positive result in step S32, the control unit 20 advances the flow to the next step S33. In step S33, the control unit 20 executes the processing corresponding to the command input by the tap operation.

The control unit 20 then advances the flow to step S34, and ends the icon put-out removal processing subroutine SRT2.

Upon ending the icon put-out removal processing subroutine SRT2 in this way, the control unit 20 advances the flow to step S3 in the information processing procedure RT1.

Note that in the event that the control unit 20 obtains a negative result in step S33, the control unit 20 determines whether or not a touch operation other than the diagonal second-direction sliding operation or tap operation is being performed. In the event that no command is input, the control unit 20 advances the flow to step S34, and in the event that a command input by a touch command, the control unit 20 executes the processing corresponding to the command, and then advances the flow to step S34 and ends the icon put-out removal processing subroutine SRT2.

Also, in the event that a negative result is obtained in step S31, this means that there is a possibility that a diagonal second-direction sliding operation may be being performed as a touch operation on the information display screen 12A.

Accordingly, in the event of obtaining such a positive result in step S31, the control unit 20 advances the flow to the next step S35. In step S35, the control unit 20 determines whether or not the maximum displacement amount is the comparative reference displacement amount or greater.

In the event that a positive result is obtained in step S35, this means that the thumb in contact with the information display screen 12A is being moved in a sliding manner, meaning that the possibility that a diagonal second-direction sliding operation is being performed as a touch operation is even higher.

Accordingly, in the event of obtaining a positive result in step S35, the control unit 20 advances the flow to the next step S36. In step S36, the control unit 20 determines whether or not the inter-touch-position line segment angle is an angle within a direction detection angle range included in the determination conditions for determination of the diagonal second-direction sliding operation. In the event that a positive result is obtained in step S36, this means that the touch operation performed on the information display screen 12A at this time is a diagonal second-direction sliding operation.

Accordingly, upon obtaining such a positive result in step S36 the control unit 20 advances to the next step S37. In step S37, the control unit 20 starts moving the menu icons, so as to be put out from the display screen to outside of the operation start touch region, while determining whether or not the touch position displacement speed of the touch position being displayed on the information display screen 12A due to the diagonal second-direction sliding operation is at or above the comparative reference speed. In the event that a positive result is obtained in step S37, this means that the thumb is being moved relatively rapidly over the information display screen 12A due to the diagonal second-direction sliding operation.

Accordingly, in the event of obtaining such a positive result in step S37, the control unit 20 advances the flow to the next step S38. In step S38, the control unit 20 rapidly moves the menu icons, which had been moved so as to be put out from the display screen to outside of the operation start touch region.

The control unit 20 thus moves the menu icons, so as to be completely removed by being put out from the display screen to outside of the operation start touch region, and then advances the flow to step S34, and ends the icon put-out removal processing subroutine SRT2.

On the other hand, in the event that a negative result is obtained in step S37, this means that the thumb is being moved relatively slowly over the information display screen 12A due to the diagonal second-direction sliding operation.

Accordingly, in the event of obtaining such a negative result in step S37, the control unit 20 advances the flow to step S39. In step S39, the control unit 20 gradually moves the menu icons being moved over the information display screen 12A, so as to be put out from the display screen to outside of the operation start touch region following the thumb.

The control unit 20 then advances the flow to the next step S40. In step S40, the control unit 20 determines whether or not the touch course length is the comparative reference course length or longer. In the event that a positive result is obtained in step S40, this means that the thumb on the information display screen 12A has moved from within the operation start touch region to nearby the position corresponding to the operation start touch region.

Accordingly, in the event of obtaining such a positive result in step S40, the control unit 20 advances the flow to step S38.

On the other hand, in the event of obtaining a negative result in step S40, this means that while the thumb on the information display screen 12A is moving toward the operation start touch region, it has not traveled very far from the operation start touch region.

Accordingly, in the event of obtaining such a negative result in step S40, the control unit 20 advances the flow to step S41. In step S41, the control unit 20 determines whether or not the diagonal second-direction sliding operation being performed on the information display screen 12A by the user has ended. In the event that a negative result is obtained in step S41, this means that the user is moving the thumb over the information display screen 12A, and that the diagonal second-direction sliding operation is still continuing.

Accordingly, in the event of obtaining such a negative result in step S41, the control unit 20 returns to step S39.

On the other hand, in the event that a positive result is obtained in step S41, this means that while removal of the menu icons from the display screen has not been completed, the user has released the thumb from the information display screen 12A, and the diagonal second-direction sliding operation has been interrupted.

Accordingly, in the event of obtaining such a positive result in step S41, the control unit 20 advances the flow to the next step S42. In step S42, the control unit 20 displays the menu icons, which had been started to be put out from the display screen to outside of the operation start touch region, so as to be drawn back into the display screen and displayed at the final display position.

The control unit 20 then returns the flow to step S34. In step S34, the control unit 20 ends the icon put-out removal processing subroutine SRT2.

Further, in the event that a negative result is obtained in step S35, this means that the thumb in touch with the information display screen 12A at this time has hardly moved at all, and accordingly a diagonal second-direction sliding operation has not been performed.

Accordingly, in the event that such a negative result is obtained in step S35, the control unit 20 transitions the flow to step S34 and then ends the icon put-out removal processing subroutine SRT2.

Further, in the event that a negative result is obtained in step S36, this means that the thumb in touch with the information display screen 12A at this time is moving in a direction other than that for the diagonal second-direction sliding operation, so accordingly a diagonal second-direction sliding operation has not been performed.

Accordingly, in the event that such a negative result is obtained in step S36, the control unit 20 transitions the flow to step S34 and then ends the icon put-out removal processing subroutine SRT2.

(2-4) Operations and Advantages of First Embodiment

According to the above-described configuration, the portable player device 10 has a main unit 11, and various display screens are displayed on the information display screen 12A, which can be touch-operated, disposed on the front face 11A of the main unit 11. With the portable player device 10, in the event that a touch operation is performed on the information display screen 12A by the thumb coming into contact therewith, the touch position thereof is detected, and touch position detection data indicating the detected touch position is generated. Also, the portable player device 10 determines the type of touch operation performed on the information display screen 12A based on the touch position detection data.

As a result, in the event that the portable player device 10 determines that the touch operation performed on the information display screen 12A is a diagonal first-direction sliding operation wherein the thumb of the dominant hand is moved so as to slide from within the operation start touch region near the little finger of the dominant hand holding the main unit 11 toward the screen edge portion at the thumb side in a first diagonal direction, the portable player device 10 displays menu icons on the display screen in a superimposed manner.

Thus, the portable player device 10 takes advantage of the fact that, with the thumb of the hand holding the main unit 11 facing the information display screen 12A, the thumb can be easily moved in the first diagonal direction with the base of the thumb as a pivot, and accordingly a diagonal first-direction sliding operation is performed as a touch operation on the information display screen 12A at the time of performing input of an icon display command for display menu icons. Accordingly, with the portable player device 10 the user can display menu icons on the information display screen 12A simply by performing the diagonal first-direction sliding operation on the information display screen 12A with the thumb of the hand holding the main unit 11.

According to the above configuration, with the portable player device 10, upon detecting the touch position of a touch operation being performed on the information display screen 12A disposed on the front face 11A of the main unit 11, touch position detection data is generated, and upon determination being made that the touch operation performed on the information display screen 12A of the display unit 12 is a diagonal first-direction sliding operation wherein the touch position is continuously displaced from within the operation start touch region on the information display screen 12A in a diagonal first direction, based on the touch position detection data, menu icons are displayed on the information display screen 12A.

Accordingly, with the portable player device 10, menu icons can be displayed on the information display screen 12A simply by performing a diagonal first-direction sliding operation on the information display screen 12A with the thumb of the hand holding the main unit 11. Thus, with the portable player device 10, operability of touch operations can be markedly improved.

Also, with the portable player device 10, in the event of performing a diagonal first-direction sliding operation, the thumb is brought into contact with the operation start touch region of the information display screen 12A, and the diagonal first-direction sliding operation is determined upon having detected the thumb coming into contact within the operation start touch region. Thus, with the portable player device 10, even in cases wherein both the diagonal first-direction sliding operation and a screen sliding operation are enabled due to the display state of the information display screen 12A, a situation can be prevented wherein the diagonal first-direction sliding operation is erroneously determined to be a screen sliding operation.

Also, with the portable player device 10, in the event that a diagonal first-direction sliding operation is performed as to the information display screen 12A, the menu icons are moved so as to be drawn into the display screen from outside of the operation start touch region and displayed at the final display position. Accordingly, with the portable player device 10, the processing executed by performing the diagonal first-direction sliding operation can be made to be more readily intuitively understood.

Further, with the portable player device 10, the dominant hand of the user holding the main unit 11 is detected along with detecting the holding orientation of the main unit 11, the position of the operation start touch region is changed in accordance with the detection result thereof, and further the first diagonal direction is re-stipulated, so as to change determination conditions for determining a touch operation to be a diagonal first-direction sliding operation.

Accordingly, with the portable player device 10, the diagonal first-direction sliding operation can be performed with no change in particular regarding the way in which the thumb of the dominant hand is moved (i.e., an arc is traced with the ball of the thumb with the base of the thumb as a pivot), regardless of whether the user holds the main unit 11 in one hand or both hands, and regardless of whether the user is right-handed or left-handed.

Further, with the portable player device 10, in the event that multiple display screens, wherein the content presented changes in a hierarchical manner, are to be displayed on the information display screen 12A, commands which can be input by the diagonal first-direction sliding operation being performed are changed in accordance with the hierarchical level displayed on the information display screen 12A, so as to display menu icons of different types (i.e., menu icons of different types, such as the sort icons 160 through 167 and the search icons 170 through 176). Thus, multiple types of commands can be input with the one diagonal first-direction sliding operation.

Further, with the portable player device 10, in the event that a touch operation is performed on the information display screen 12A and determination is made that the touch operation is a diagonal second-direction sliding operation wherein the thumb is moved in the second diagonal direction so as to slide from near the edge of the screen at the side of the thumb toward the operation start touch region on the information display screen 12A, menu icons which had been displayed on the display screen in a superimposed manner are removed. In this case as well, the menu icons can be removed from the information display screen 12A simply by performing the diagonal second-direction sliding operation as a touch operation on the information display screen 12A with the thumb of the hand holding the main unit 11.

Upon a diagonal second-direction sliding operation being performed on the information display screen 12A, the portable player device 10 moves the menu icons so as to be put out from the display screen to the outside of the operation start touch region, and thus be removed form the display screen. Accordingly, with the portable player device 10, the processing executed by performing the diagonal first-direction sliding operation can be made to be more readily intuitively understood.

Further, with the portable player device 10, the second diagonal direction is re-stipulated in accordance with detection results of the holding orientation of the main unit 11 and the dominant hand of the user, so as to change determination conditions for determining a touch operation to be a diagonal second-direction sliding operation.

Accordingly, with the portable player device 10, the diagonal second-direction sliding operation can be performed with no change in particular regarding the way in which the thumb of the dominant hand is moved (i.e., an arc is traced with the ball of the thumb with the base of the thumb as a pivot), regardless of whether the user holds the main unit 11 in one hand or both hands, and regardless of whether the user is right-handed or left-handed, thereby markedly improving operability.

(3) Second Embodiment

A portable player device according to a second embodiment of the present invention, to which the information processing device according to an embodiment of the present invention has been applied, will be described. This portable player device has an external form almost the same as that of the portable player device 10 according to the first embodiment described above.

The portable player device according to the second embodiment also has a form which can be held in the right hand or the left hand, whichever is the dominant hand of the user (i.e., with one hand), or can be held in both hands, as with the portable player device 10 according to the first embodiment.

Now, the hardware configuration of a portable player device 200 will be described by hardware configuration blocks with reference to FIG. 36. With the portable player device 200, upon the user pressing a operation input unit 201 configured of various types of keys provided on the face of the housing, the operation input unit 201 recognizes this, and sends operation input signals corresponding to the pressing operation thereof to an input processing unit 202.

The input processing unit 202 subjects operation input signals supplied from the operation input unit 201 to predetermined processing, so as to convert the operation input signals into operation commands, which are sent to a CPU 204 via a bus 203.

Also, upon touch operations being made on a touch panel 207 provided on the information display screen of a display 206, a touch panel driver 205 detects the touch position of the thumb on the information display screen. The touch panel driver 205 generates touch position detection data indicating the detected touch position, and sends the generated touch position detection data to the CPU 204.

The CPU 204 reads out various types of programs, such as basic programs and application programs and the like stored beforehand in ROM 208, or a storage unit 209 configured of semiconductor memory or a hard disk drive or the like, via the bus 203, and loads the programs to RAM 210. The CPU 204 then controls the entire device in accordance with the programs loaded to the RAM 210, and also executes predetermined computation processing, and various types of processing in accordance with operations provided from the input processing unit 202.

Also, the CPU 204 detects commands input by touch operations on the information display screen, based on the touch position detection data provided from the touch panel driver 205 and the display state at the display 206 at that time. The CPU 204 then executes the various types of processing corresponding to the commands input by touch operations that have been detected.

Accordingly, in the event that a reception command for receiving a television broadcast is input by touch operations on the information display screen, for example, the CPU 204 receives the television broadcast airwaves with a television antenna 211 and input to a television tuner unit 212. The television tuner unit 212 extracts video data of a television program being broadcast by the television station selected by the user, from the television broadcast airwaves, subjects to predetermined reception processing, and sends the video data and audio data of the program obtained thereby to the CPU 204.

Of the video data and audio data provided from the television tuner unit 212, the CPU 204 sends the video data to the display 206 via a display processing unit 213, thereby displaying program video based on the video data in on the information display screen. Also, the CPU sends the audio data to a headphone 215 via a data processing circuit 214, thereby outputting the program audio based on the audio data. Accordingly, CPU 204 enables the user to view and listen to a desired television program being broadcast from a television station.

Now, in the event that a recording command for recording a television program is input by touch operations to the information display screen while performing reception processing of the television broadcast for example, the CPU 204 generates recorded program related information corresponding to the video data and audio data provided form the television tuner unit 212. The CPU 204 then sends the video data and audio data provided from the television tuner unit 212 along with the recorded program related information to the storage unit 209, such that the video data and audio data and the recorded program related information are stored in the storage unit 209 in a correlated manner. Thus, the CPU 204 can record television programs.

Also, in the event that a reception command for receiving a radio broadcast is input by touch operations on the information display screen, for example, radio broadcast airwaves are received with a radio antenna 216 and input to a radio tuner unit 217. The radio tuner unit 217 subjects the radio broadcast signals of the broadcast frequency corresponding to the radio station selected by the user from the radio broadcast airwaves, and outputs audio data of the program audio obtained as a result thereof to the CPU 204. The CPU 204 sends the audio data provided from the radio tuner unit 217 to the headphone 215 via the data processing circuit 214, thereby outputting program audio based on audio data from the headphone 215. Thus, the CPU can enable the user to listen to origami audio of a radio program being broadcast from a desired radio station.

Now, in the event that a recording command for recording a radio program is input by touch operations to the information display screen while performing reception processing of the radio broadcast for example, the CPU 204 generates recorded program related information corresponding to the audio data provided from the radio tuner unit 217. The CPU 204 then sends the audio data provided from the radio tuner unit 217 along with the recorded program related information to the storage unit 209, such that the audio data and the recorded program related information are stored in the storage unit 209 in a correlated manner. Thus, the CPU 204 can record radio programs.

Further, in the event that a browsing command is input by a touch operation on the information display screen to browse information, an information providing device (not shown) on the Internet is accessed by the closest access point via an transmission/reception circuit unit 218 and antenna 219 in that order for example, so as to request browsing of information. Upon display screen data for presenting the desired information being transmitted from the information providing device via the Internet and closest access point in that order the display screen data is received and input with the antenna 219 and transmission/reception circuit unit 218. The CPU 204 then displays the display screen based on the display screen data to the information display screen by sending the display screen data to the display 206 via the display processing unit 213, so that the user can browse the desire information.

Further, upon a purchase command for purchasing desire music data being input by a touch operation on the information display screen, the CPU 204 accesses an information providing device (not shown) on the Internet via the closest access point via the transmission/reception circuit unit 218 and antenna 219 in that order for example, so as to purchasing of music data. Upon billing processing regarding purchasing of the music data from the information providing device being completed, and the music data being transmitted from the information providing device via the Internet and closest access point in that order along with music-related information, the music data and music-related information are received and input with the antenna 219 and transmission/reception circuit unit 218. The CPU 204 then sends the music data and music related data to the storage unit 209, and stores the music data and music related data in the storage unit 209 in a correlated manner. Thus, the CPU 204 enables the user to purchase music data.

In the event that the portable player device is connected to an unshown external computer device by cable or wirelessly, a the CPU 204 functions subordinately to the computer device which functions dominantly. Accordingly, in the event that music data and music-related information are transferred from the computer device, the CPU 204 inputs the transferred music data and music-related information via an external device interface 220. The CPU 204 then sends the music data and music-related information to the storage unit 209, so as to store the music data and music-related information in the storage unit 209 in a correlated manner.

Also, in the event that a playlist of music data is transferred from the computer device, the CPU 204 inputs the transferred playlist via the external device interface 220, sends this to the storage unit 209, and stores the playlist in the storage unit 209.

Also, in the event that video data and video-related information are transferred from the computer device, the CPU 204 inputs the transferred video data and video-related information via the external device interface 220. The CPU 204 then sends the video data and video-related information to the storage unit 209, so as to store the video data and video-related information in the storage unit 209 in a correlated manner.

Also, in the event that photograph image data and photograph-related information are transferred from the computer device, the CPU 204 inputs the transferred photograph image data and photograph-related information via the external device interface 220. The CPU 204 then sends the photograph image data and photograph-related information to the storage unit 209, so as to store the photograph image data and photograph-related information in the storage unit 209 in a correlated manner.

Also, in the event that a play command for playing data is input by a touch operation on the information display screen, the CPU 204 reads out data such as music data and video data form the storage unit 209 and sends the data to the data processing circuit 214. The data processing circuit 214 then subjects the data provided from the CPU 204 at this time to predetermined playing processing such as decoding processing error correction processing, and the like.

In the event that the data obtained by the playing processing is video or image data, the CPU 214 sends the video or image data to the display 206 via the display processing unit 213, so as to display video or images based on the video or image data on the display 206 (e.g., program vide of a television program, photograph images, etc.). Also, in the event that the data obtained by the playing processing is audio data, the data processing circuit 214 sends the audio data to the headphone 215, such that audio based on the audio data (e.g., music, television or radio program audio, etc.) is output from the headphone 215. Thus, the CPU 204 enables various type of data such as music data, video data and audio data of television programs, and so on, stored in the storage unit 209, to be played, such that the user can listen to music, watch television programs, and so on.

Now, it should be noted that with the portable player device 200, various programs stored in the ROM 208 and storage unit 209 are to be selected as appropriate in accordance with the functions of the portable player device 10 having the hardware circuit configuration with the functional circuit blocks described above with reference to FIG. 15. That is to say, with the portable player device 200, various programs stored in the ROM 208 and storage unit 209 are to be selected so as to execute the information processing procedure RT1 described above. Thus, the portable player device 200 can function in the same way as with the portable player device 10 described above with reference to FIG. 15.

In actual use, with the portable player device 200, the CPU 204 can be made to function in the same way as with the above-described control unit 20, orientation detection unit 26, determination conditions changing unit 27, and dominant hand detecting unit 28.

Also, with the portable player device 200, the operation input unit 201 and input processing unit 202 can be made to function in the same way as with the above-described pressing input unit 23.

Further, with the portable player device 200, the touch panel driver 205 and touch panel 207 can be made to function in the same way as with the above-described touch position detecting unit 24.

Further, with the portable player device 200, the display processing unit 213 and display 206 can be made to function in the same way as with the above-described display unit 12.

Further, with the portable player device 200, the storage unit 209 can be made to function in the same way as with the above-described content storage unit 22.

Further, with the portable player device 200, the RAM 210 and storage unit 209 can be made to function in the same way as with the above-described table storage unit 25.

Further, with the portable player device 200, the television antenna 211 and television tuner unit 212 can be made to function in the same way as with the above-described television antenna 30 and television receiver 31.

Further, with the portable player device 200, the radio antenna 216 and radio tuner unit 217 can be made to function in the same way as with the above-described radio antenna 33 and radio receiver 34.

Further, with the portable player device 200, the transmission/reception circuit unit 218 and antenna 19 can be made to function in the same way as with the above-described wireless communication unit 35.

Further, with the portable player device 200, the external device interface 220 can be made to function in the same way as with the above-described cable communication unit 21.

Further, with the portable player device 200, the data processing circuit 214 and headphone 215 can be made to function in the same way as with the above-described playing unit 36 and output unit 32.

Accordingly, the portable player device 200 can execute the information processing procedure RT1 in the same way as with the portable player device 10 described with reference to FIG. 15. Consequently, the portable player device 200 can yield the same advantages as with the portable player device 10 according to the above-described first embodiment.

Note that with the portable player device 200, an information processing program may be stored in the ROM 208 or storage unit 209 beforehand. Also, with the portable player device 200, the information processing program may be stored in a computer-readable recording medium and installed therefrom. Further, with the portable player device 200, the information processing program may be externally installed using a cable or wireless network, such as a local area network, the Internet, a digital satellite broadcast, etc.

Moreover, a computer-readable recording medium from which the information processing program can be installed to the portable player device 200 so as to be executable may be realized by packaged media such as flexible disks, for example. Alternatively, the computer-readable recording medium from which the information processing program can be installed to the portable player device 200 so as to be executable may be realized by packaged media such as CD-ROM (Compact Disc-Read Only Memory), DVD (Digital Versatile Disc), etc.

Further, the computer-readable recording medium is not restricted to packaged media, and may be realized by semiconductor memory, magnetic disks, etc., whereby various types of programs are recorded temporally or permanently. Also, the information processing program may be recorded to such computer-readable recording media installed using a cable or wireless network, such as a local area network, the Internet, a digital satellite broadcast, etc. Moreover, the information processing program may be recorded to such computer-readable recording media installed using various types of communication interfaces, such as routers, modems, etc.

(4) Modifications (4-1) First Modification

While description has been made by way of the above first and second embodiments regarding a case wherein, in the event that a diagonal first-direction sliding operation is performed on the information display screen 12A, menu icons are moved so as to be drawn into the display screen from outside of the operation start touch region, and finally displayed at a final display position on the display screen in a superimposed manner, the present invention is not restricted to such an arrangement, and an arrangement may be made wherein the menu icons suddenly appear on the display screen when the diagonal first-direction sliding operation is performed on the information display screen 12A. In the same way, the present invention is not restricted to the arrangement wherein, in the event that a diagonal second-direction sliding operation is performed ion the information display screen 12A, the menu icons are gradually moved out of the operation start touch region is as to be removed from the display screen; rather, the menu icons may be suddenly removed form the display screen.

(4-2) Second Modification

While description has been made by way of the above first and second embodiments regarding a case wherein, in the event that a diagonal first-direction sliding operation is performed on the information display screen 12A, menu icons are displayed on the display screen, the present invention is not restricted to such an arrangement, and an arrangement may be made wherein, in the event that the diagonal first-direction sliding operation is performed on the information display screen 12A, various other types of information are displayed instead of the display screen displayed so far, such as other display screens, text information, moving pictures, photograph images, and so on.

In the case of such a configuration, an arrangement may be made wherein, in the event that the diagonal first-direction sliding operation is performed, the various other types of information such as other display screens, moving pictures, etc. are moved in the same way as described above so as to be drawn into the display screen from outside the operation start touch region and finally displayed one the display screen instead. Also, in the case of the diagonal second-direction sliding operation being performed on the information display screen 12A as well, the various other types of information such as other display screens, moving pictures, etc. may be moved so as to be put out from the operation start touch region, and the original display screen gradually brought back at that time, so as to be switched from the display of the other information to the original display screen.

(4-3) Third Modification

Figure 37A:
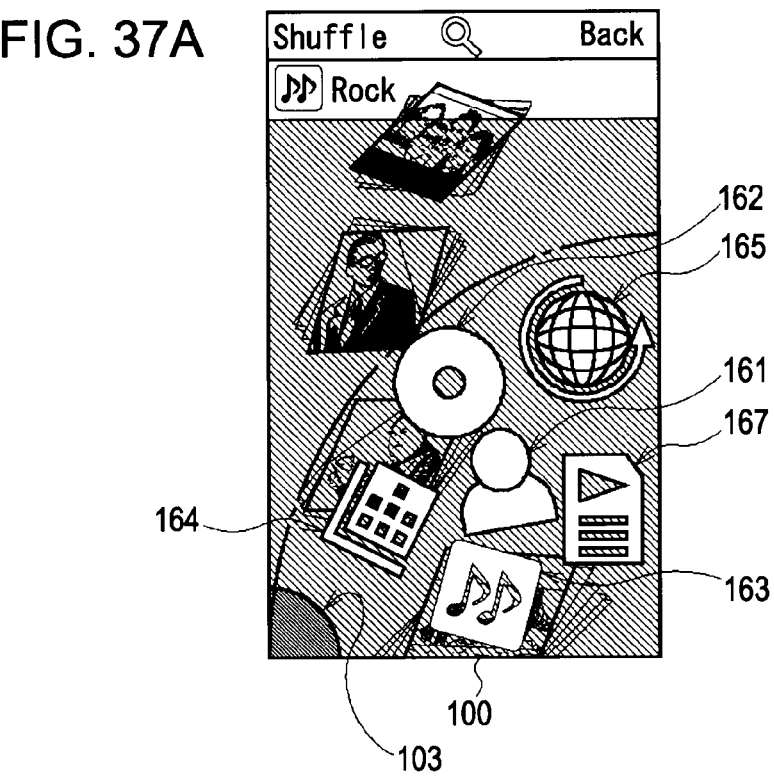
FIG. 37 is a frontal view outline drawing for description of a first superimposed display of menu icons on a display screen according to another embodiment.
Figure 37B:
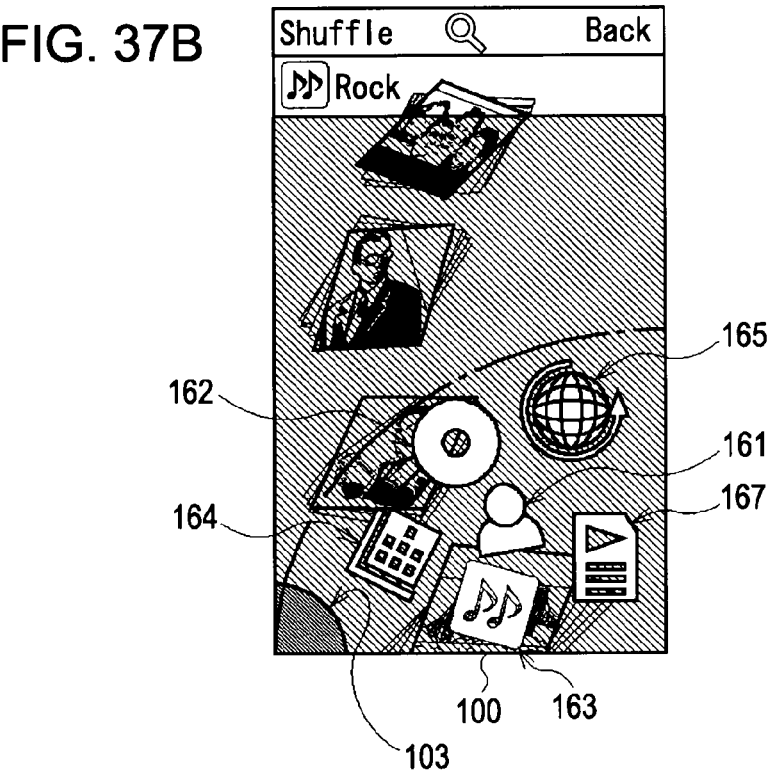

While description has been made by way of the above first and second embodiments regarding a case wherein, in the event that a diagonal first-direction sliding operation is performed on the information display screen 12A, menu icons are displayed at a present final display position on the display screen in a superimposed manner, an arrangement may be made wherein, as shown in FIGS. 37A and 37B, in the event that a diagonal first-direction sliding operation is performed on the information display screen 12A, the touch course is detected as described above, and one or multiple menu icons are displayed in a superimposed manner within a fan-shaped display region from an arc-shaped virtual line of the touch course on the display screen, drawn by the thumb of the dominant hand holding the main unit 11 (i.e., the hand of which thumb has been moved to perform the diagonal first-direction sliding operation), to around the base of the thumb.

Accordingly, with such a configuration, even in the event that the way each user holds the main unit 11 (the way in which the palm of the hand and the fingers come into contact with the main unit 11), the size of the hand, the length of the thumb, and so forth, differ among users, each user can easily bring his/her thumb into contact with the predetermined region corresponding to the display portion of menu icons on the information display screen 12A, in a sure manner. Accordingly, all users can perform touch operations within the predetermined region corresponding to the display portion of menu icons on the information display screen 12A, to input commands.

Figure 38A:
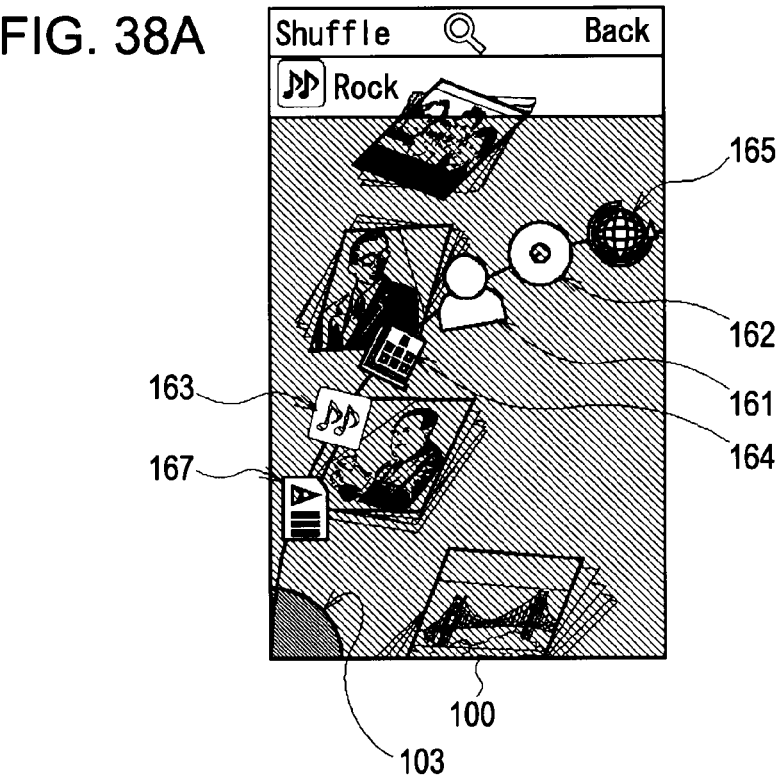
FIG. 38 is a frontal view outline drawing for description of a second superimposed display of menu icons on a display screen according to another embodiment.
Figure 38B:
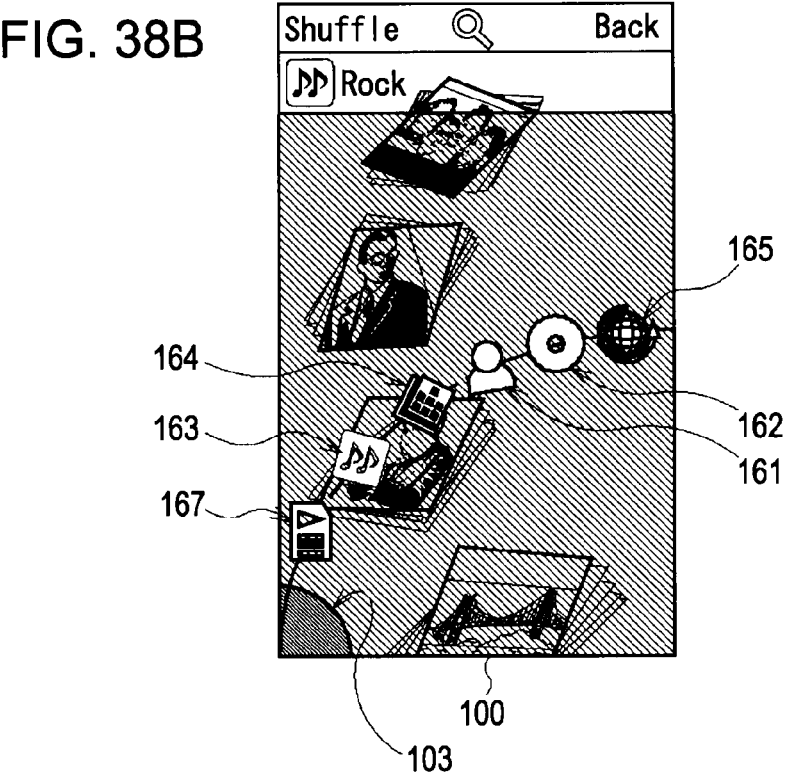

Alternatively, an arrangement may be made wherein, as shown in FIGS. 38A and 38B, in the event that a diagonal first-direction sliding operation is performed on the information display screen 12A, the touch course is detected as described above, and one or multiple menu icons are displayed on the touch course (i.e., so as to be arrayed on the touch course) on the display screen in a superimposed manner. According to this configuration, menu icons can be displayed when the thumb of the user can reach, so all users can perform touch operations within the predetermined region corresponding to the display portion of menu icons on the information display screen 12A, to input commands.

Now, an arrangement may be made regarding the configurations shown in FIGS. 37 through 38B wherein as many menu icons as can be disposed within the fan-shaped display region or on the touch course are displayed (i.e., the size of the menu icons themselves is not changed). Alternatively, arrangements may be made wherein the size of the menu icons is greater in the event that the area of the fan-shaped display region is great or the touch course is long, and the size of the menu icons is smaller in the event that the area of the fan-shaped display region is small or the touch course is short, i.e., the size of the menu icons is changed such that all menu icons prepared beforehand to be displayed are displayed in the fan-shaped display region or on the touch course.

(4-4) Fourth Modification

While description has been made by way of the above first and second embodiments regarding a case wherein touch region notification portions 49, 55, 65, 74, 93, 103, 113, and 124 are provided within the display screens such as the genre selection screens 40 and 90, artist selection screens 50 and 100, and so forth, described with reference to FIGS. 16 through 25, and displayed in a color different from other portions (i.e., different display color), the present invention is not restricted to this arrangement, and the operation start touch region may be notified by various other configuration, such as providing an icon within the display screen to notify the user of the operation start touch region, providing touch region notification portions to notify the user by blinking periodically, and so forth.

Figure 39:
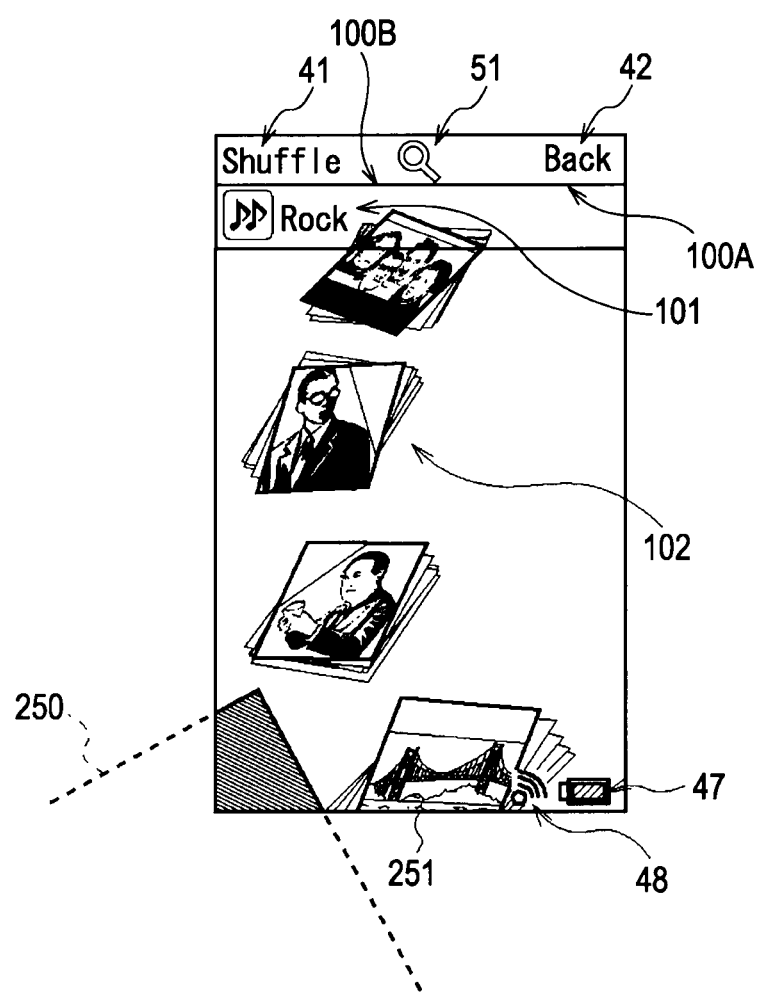
FIG. 39 is a frontal view outline drawing for description of notification of an operation start touch region according to another embodiment.

Note that in the case of employing the above-described Second Modification, an arrangement may be made wherein a portion such as one corner of a display screen 250, displayed due to a diagonal first-direction sliding operation having been performed as shown in FIG. 39, is displayed overlapping a predetermined portion of a display screen 251 corresponding to the operation start touch region, thereby notifying the user of the position of the operation start touch region.

Note that color and shape of the touch region notifying portion or the icon for notifying the operation start touch region within the display screen may be changed depending on the types, number, size, etc. of information displayed additionally due to the diagonal first-direction sliding operation, for example. Also, in the event that the portable player device 10 is to be held in only one holding orientation and the operation start touch region is to be fixed regardless of the dominant hand of the user, for example, an configuration may be made wherein no touch region notifying portion is provided to the display screen. According to this configuration, the entire display screen can be effectively used for presenting information.

(4-5) Fifth Modification

While description has been made by way of the above first and second embodiments regarding a case wherein the position of the operation start touch region is changed for each display form of the display screen, the position of the operation start touch region is unchanged from the preset position for the same display form, but the present invention is not restricted to this arrangement, and an arrangement may be made wherein, regardless of the display form of the display screen or the holding orientation of the main unit 11, the user is made to actually hold the main unit 11 at the time of startup of the portable player device 10 for example, and to touch the information display screen 12A with the ball of the thumb of the hand which will perform touch operations, such that the position where the ball of the thumb has touched is set as the position of the operation start touch region. According to such a configuration, even in the event that the way each user holds the main unit 11 (the way in which the palm of the hand and the fingers come into contact with the main unit 11), the size of the hand, the length of the thumb, and so forth, differ among users, each user can easily bring his/her thumb into contact with the operation start touch region corresponding to the display portion of menu icons on the information display screen 12A and perform the diagonal first-direction sliding operation, in a sure manner.

Note that in the event of making the position of the operation start touch region to be optionally set, the position thereof is not restricted to the edge of the information display screen 12A, but rather set so as to be positioned closer to the middle. Also, even in cases wherein the operation start touch region is set beforehand, the position thereof may be set so as to be closer to the middle.

(4-6) Sixth Modification

While description has been made by way of the above first and second embodiments regarding a case wherein, in the event that a diagonal first-direction sliding operation is performed with the thumb on the information display screen 12A with a predetermined speed or faster, or for a predetermined distance or longer, the menu icons are displayed at the final display position on the display screen, and in the event that the thumb is moved on the information display screen 12A slower than the predetermined speed, or is removed from the information display screen 12A before reaching the predetermined distance, the menu icons are put out to the outside of the operation start touch region, and arrangement may be made wherein, in the event that the diagonal first-direction sliding operation is performed on the information display screen 12A and the thumb temporarily stops on the information display screen 12A before reaching the final display position of the menu icons on the display screen, the movement of the menu icons also temporarily stops, and if the thumb resume movement the menu icons also resume movement to be displayed at the final display region on the display screen, but if the thumb which has temporarily stopped on the information display screen 12A is removed therefrom, the menu icons are put out to the outside of the operation start touch region.

According to such a configuration, the user can check the types of menu icons which will be displayed partway through the diagonal first-direction sliding operation, and then decide to display or remove the menu icons. Particularly, in the event that the types of information which can be displayed by the diagonal first-direction sliding operation differ for each display screen, and there is a great number thereof, the user can first check the content of the information partway through the diagonal first-direction sliding operation and then decide to display the menu icons or to cancel the display thereof.

(4-7) Seventh Modification

While description has been made by way of the above first and second embodiments regarding a case wherein the hand performing the diagonal first-direction sliding operation is performed on the information display screen 12A is constantly one hand, but the present invention is not restricted to this arrangement, and an arrangement may be made wherein both a right-handed diagonal first-direction sliding operation and a left-handed diagonal first-direction sliding operation can be performed at the information display screen 12A at all times.

In the case of this configuration, an arrangement may be made such that, in the case of holding the main unit in the vertical holding orientation, the right-handed and left-handed operation start touch regions are set separately, and in the case of holding the main unit in the horizontal holding orientation, the right-handed and left-handed operation start touch regions are set separately, or alternatively, an arrangement may be made wherein one operation start touch region is shaped by the left hand and right hand. Also, an arrangement may be made with the configuration wherein a right-handed diagonal first-direction sliding operation and a left-handed diagonal first-direction sliding operation input the same input command, or input different input commands.

With such a configuration, in the case that the right-handed diagonal first-direction sliding operation and left-handed diagonal first-direction sliding operation are set to input the same input commands, the diagonal first-direction sliding operation can be performed without giving consideration to the dominant hand, thereby improving operability. On the other hand, in the even that the right-handed diagonal first-direction sliding operation and left-handed diagonal first-direction sliding operation are set to input different input commands, the user can input a greater number of input commands by the diagonal first-direction sliding operation which is easy to perform.

(4-8) Eighth Modification

Figure 40:
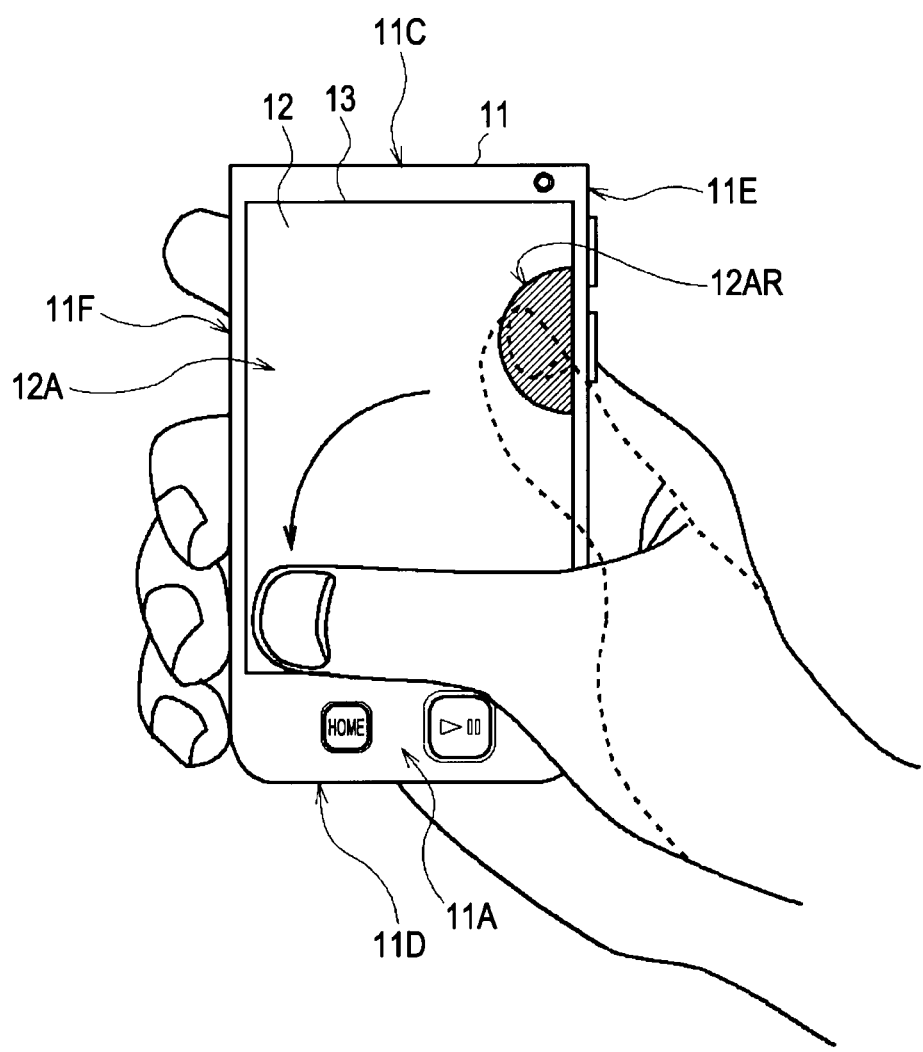
FIG. 40 is a frontal view outline drawing for description of a diagonal first-direction sliding operation in a case where the main unit is held in the right hand in a vertical orientation, according to another embodiment.

While description has been made by way of the above first and second embodiments regarding a case wherein the thumb of the hand holding the main unit 11 is moved from the side of the little finger of that hand in the first diagonal direction toward the base side of the index finger, to perform a diagonal first-direction sliding operation. The present invention is not restricted to such an arrangement, and an arrangement may be made wherein the thumb of the hand holding the main unit 11 is moved from the side of the base of the index finger toward the little finger to perform the diagonal first-direction sliding operation. That is to say, as shown in FIG. 40, a fan-shaped operation start touch region 12AR is provided to the portable player device 10 at the middle portion of the side at the base of the index finger of the right hand on the information display screen 12A (the portion corresponding to the middle of the right side on the display screen) with the main unit 11 held in the vertical holding orientation with the right hand. The portable player device 10 may be arranged such that a touch operation, wherein the thumb of the right hand is brought into contact with the operation start touch region 12AR on the information display screen 12A at the touch operation start point-in-time, and then slid from the operation start touch region 12AR in a first diagonal direction toward the corner at the little finger of the right hand (i.e., toward the lower left of the display screen), is the diagonal first-direction sliding operation.

Figure 41:
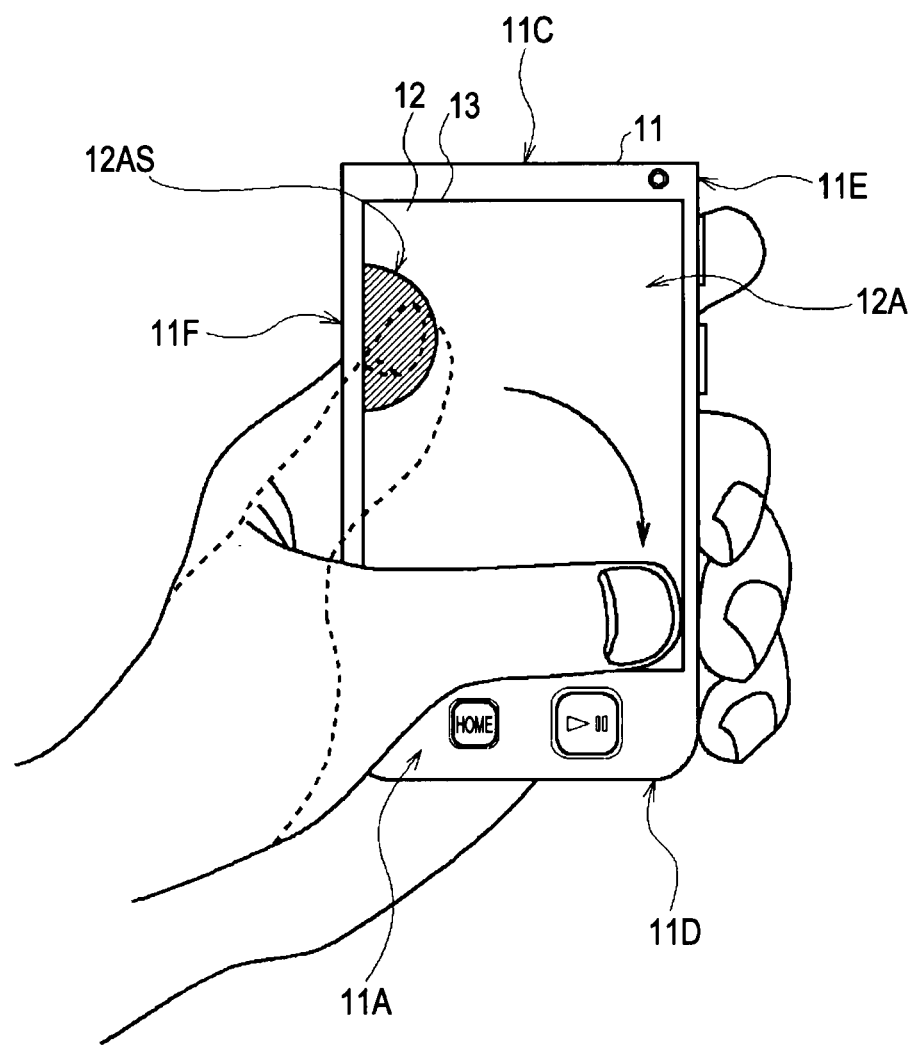
FIG. 41 is a frontal view outline drawing for description of a diagonal first-direction sliding operation in a case where the main unit is held in the left hand in a vertical orientation, according to another embodiment.

Also, as shown in FIG. 41, a fan-shaped operation start touch region 12AS is provided to the portable player device 10 at the middle portion of the side at the base of the index finger of the left hand on the information display screen 12A

(the portion corresponding to the middle of the left side on the display screen) with the main unit 11 held in the vertical holding orientation with the left hand. The portable player device 10 may be arranged such that a touch operation, wherein the thumb of the left hand is brought into contact with the operation start touch region 12AS on the information display screen 12A at the touch operation start point-in-time, and then slid from the operation start touch region 12AS in a first diagonal direction toward the corner at the little finger of the left hand (i.e., toward the lower right of the display screen), is the diagonal first-direction sliding operation.

Figure 42:
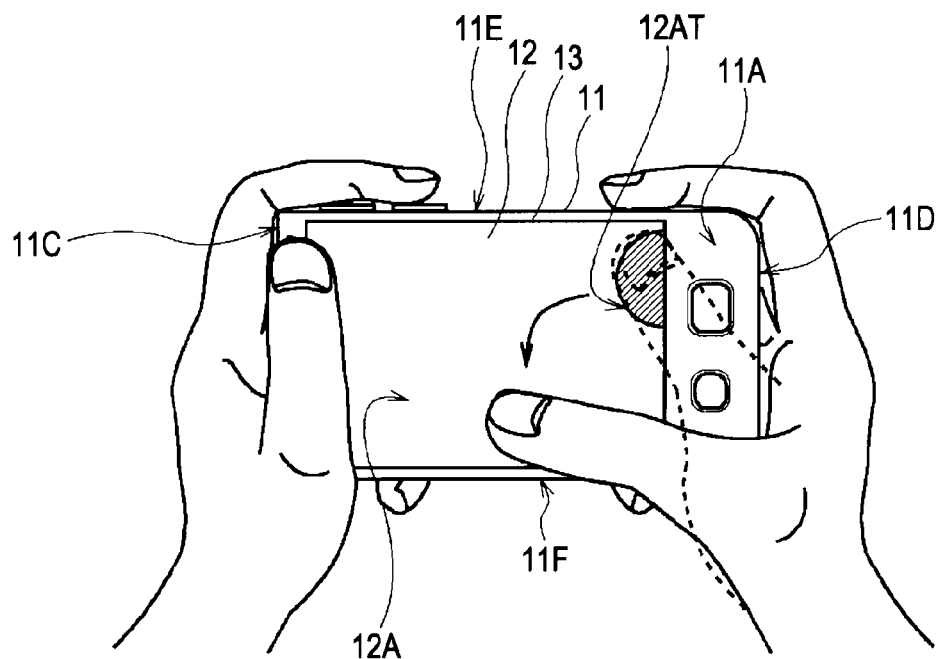
FIG. 42 is a frontal view outline drawing for description of a diagonal first-direction sliding operation with the right hand in a case where the main unit is held in both hands in a right-handed horizontal holding orientation, according to another embodiment.

Also, as shown in FIG. 42, a fan-shaped operation start touch region 12AT is provided to the portable player device 10 at the portion of the information display screen 12A at the side of the base of the index finger (i.e., the edge at the corner between the second end 11D and the first side 11E, also corresponding to the upper right corner of the display screen) with the main unit 11 held in the right-handed horizontal holding orientation. The portable player device 10 may be arranged such that a touch operation, wherein the thumb of the right hand is brought into contact with the operation start touch region 12AT on the information display screen 12A at the touch operation start point-in-time, and then slid from the operation start touch region 12AT in a first diagonal direction toward the middle of the second side 11F (i.e., toward the middle of the lower side of the display screen), is the diagonal first-direction sliding operation.

Figure 43:
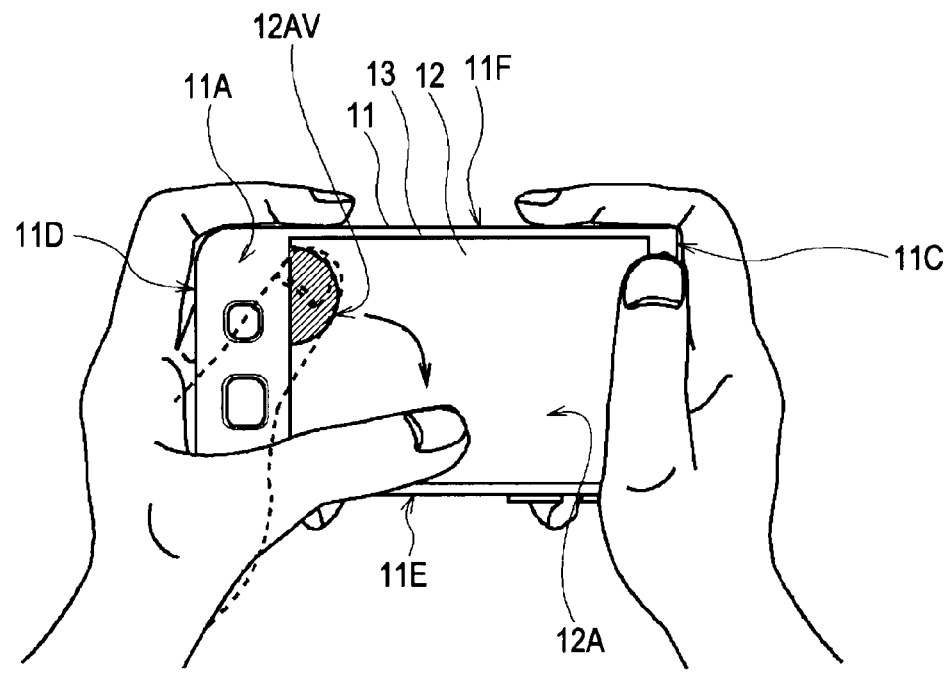
FIG. 43 is a frontal view outline drawing for description of a diagonal first-direction sliding operation with the left hand in a case where the main unit is held in both hands in a left-handed horizontal holding orientation, according to another embodiment.

Moreover, as shown in FIG. 43, a fan-shaped operation start touch region 12AV is provided to the portable player device 10 at the portion of the information display screen 12A at the side of the base of the index finger (i.e., the edge at the corner between the second end 11D and the second side 11F, also corresponding to the upper left corner of the display screen) with the main unit 11 held in the left-handed horizontal holding orientation. The portable player device 10 may be arranged such that a touch operation, wherein the thumb of the right hand is brought into contact with the operation start touch region 12AV on the information display screen 12A at the touch operation start point-in-time, and then slid from the operation start touch region 12AV in a first diagonal direction toward the middle of the first side 11E (i.e., toward the middle of the lower side of the display screen), is the diagonal first-direction sliding operation.

With such configurations of the portable player device 10 as well, commands can be input with the simple operation of sliding the thumb of the hand holding the main unit 11, as with the case of the first and second embodiments.

Note that with the case of the portable player device 10 as shown in FIG. 40, an arrangement may be made wherein, in the event that the main unit 11 is held in the vertical holding orientation by the right hand which is the dominant hand, a touch operation wherein the thumb of the right hand is brought into contact with a portion around the corner between the second end 11D and the second side 11F on the information display screen 12A, and then slid in that state toward the operation start touch region 12AR in a second diagonal direction, is the diagonal second-direction sliding operation.

Also, with the case of the portable player device 10 as shown in FIG. 41, an arrangement may be made wherein, in the event that the main unit 11 is held in the vertical holding orientation by the left hand which is the dominant hand, a touch operation wherein the thumb of the left hand is brought into contact with a portion around the corner between the second end 11D and the first side 11E on the information display screen 12A, and then slid in that state toward the operation start touch region 12AS in a second diagonal direction, is the diagonal second-direction sliding operation.

Further, with the case of the portable player device 10 as shown in FIG. 42, an arrangement may be made wherein, in the event that the main unit 11 is held in the right-handed horizontal holding orientation, a touch operation wherein the thumb of the right hand which is the dominant hand is brought into contact with a portion around the middle of the second side 11F then slid in that state toward the operation start touch region 12AT in a second diagonal direction, is the diagonal second-direction sliding operation.

Moreover, with the case of the portable player device 10 as shown in FIG. 43, an arrangement may be made wherein, in the event that the main unit 11 is held in the left-handed horizontal holding orientation, a touch operation wherein the thumb of the left hand which is the dominant hand is brought into contact with a portion around the middle of the first side 11E then slid in that state toward the operation start touch region 12AV in a second diagonal direction, is the diagonal second-direction sliding operation.

With such configurations of the portable player device 10 as well, commands can be input with the simple operation of sliding the thumb of the hand holding the main unit 11, regarding not only the diagonal first-direction sliding operation but also the diagonal second-direction sliding operation, as with the case of the first and second embodiments.

(4-9) Ninth Modification

While description has been made by way of the above first and second embodiments regarding a case wherein touch operations performed on the information display screen 12A include a wide variety of touch operations, such as the tap operation, long hold operation, screen sliding operations, diagonal first-direction sliding operation, and diagonal second-direction sliding operation, but the present invention is not restricted to this arrangement, and an arrangement may be made wherein only the diagonal first-direction sliding operation, or a combination of the diagonal first-direction sliding operation and the diagonal second-direction sliding operation, are set as touch operations to be performed on the information display screen 12A. According to this configuration, the operability is improved since the user does not have to think about various types of touch operations available at the time of inputting commands.

(4-10) Tenth Modification

While description has been made by way of the above first and second embodiments regarding a case wherein, in response to a screen-right-direction sliding operation or a screen-left-direction sliding operation being performed on the information display screen 12A, the display mode of the display screen displayed on the information display screen 12A is switched over, the present invention is not restricted to this arrangement, and an arrangement may be made wherein various other switchovers are performed in response to a screen-right-direction sliding operation or a screen-left-direction sliding operation being performed on the information display screen 12A, such as switching between a display screen for selecting music data to be played and a display screen for selecting video data to be played, or information to be played/reproduced such as video and photograph images or the like, for example.

(4-11) Eleventh Modification

While description has been made by way of the above first and second embodiments regarding a case wherein the information processing device is applied to the information processing device 1, portable player device 10, and portable player device 200, described with reference to FIGS. 1 through 43, the present invention is not restricted to such an arrangement, and can be applied to a wide variety of other information processing devices, such as cellular telephones, PDAs (Personal Digital Assistants), gaming devices, portable information processing devices, and so on.

Figure 44:
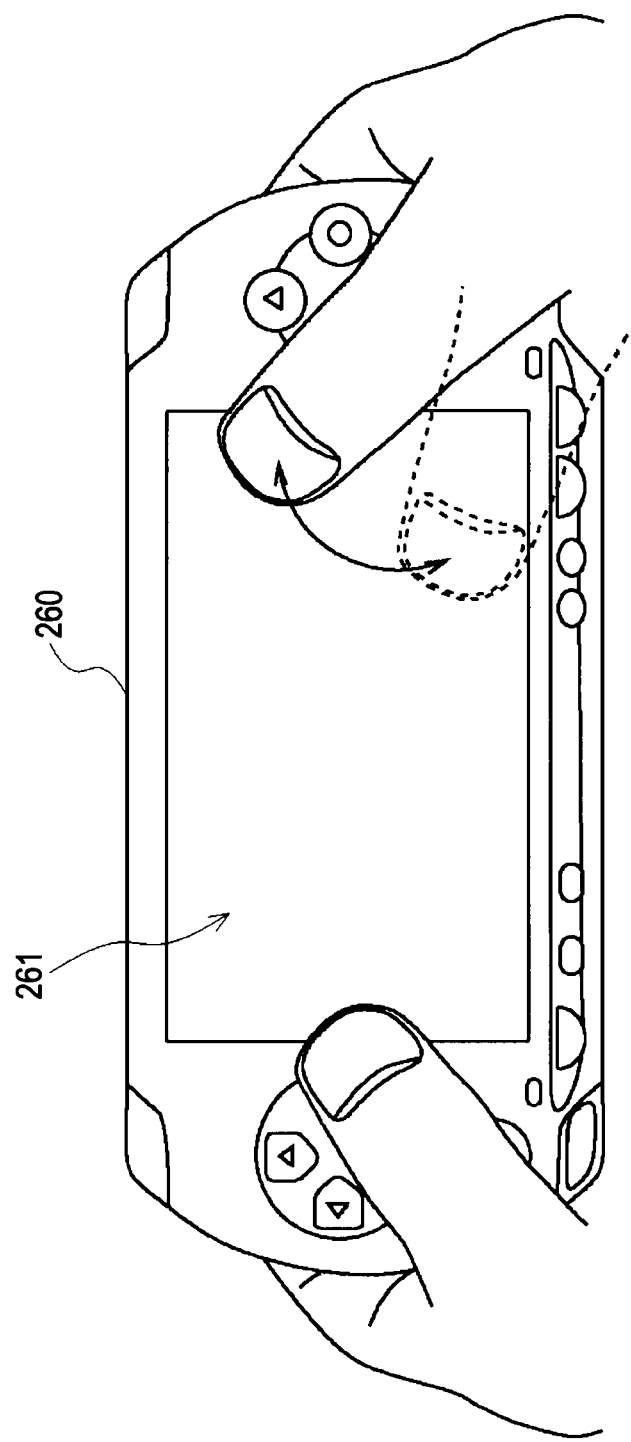
FIG. 44 is an outline drawing illustrating the external configuration of a game device according to another embodiment.

For example, in the event of applying to a gaming device 260 such as shown in FIG. 44, an arrangement may be made wherein both the right-handed diagonal first-direction sliding operation and the left-handed diagonal first-direction sliding operation can be performed on an information display screen 261, as described with the Seventh Modification above.

Further, application may be made to devices having large-size displays, such as television receivers for example, as well. In such a case, the fact that the human arm can easily draw an arc by pivoting on the elbow or the shoulder is employed such that the arm is swung facing the information display screen of the display so as to perform a diagonal first-direction sliding operation or diagonal second-direction sliding operation as touch operations on the information display screen of the display, and thereby input commands. According to this configuration, the user can input commands simply be facing the information display screen 12A and swinging the arm.

(4-12) Twelfth Modification

While description has been made by way of the above first and second embodiments regarding a case wherein the main unit 2 or flat main unit 11 described with reference to FIGS. 1 through 44 is a main unit which can be held, the present invention is not restricted to this arrangement, and can be applied to a wide variety of main units of other shapes, such as a flat shape wherein the front face and another face are formed in the form of ovals.

(4-13) Thirteenth Modification

While description has been made by way of the above first and second embodiments regarding a case wherein the information display screen is disposed on the front face of the main unit, and the display units 3 or 12 or the display 206 described with reference to FIGS. 1 through 44 are applied as a display unit for displaying information on the information display screen, the present invention is not restricted to this arrangement, and can be applied to a wide variety of display units of other configurations, such as display panels with touch-panel functions built in (i.e., a display with an integrated touch panel).

(4-14) Fourteenth Modification

While description has been made by way of the above first and second embodiments regarding a case wherein the touch position detecting units 4 and 24 and the touch panel driver 205 and touch panel 207 described with reference to FIGS. 1 through 44 are applied as a touch position detecting unit which detects the touch position on the information display screen of the display unit, and generates touch position detection data represented in terms of coordinates based on two axes intersecting at the detected touch position, the present invention is not restricted to this arrangement, and can be applied to a wide variety of touch position detecting units of other configurations, such as display panels with touch-panel functions built in (i.e., a display with an integrated touch panel) and touch panel driver.

(4-15) Fifteenth Modification

While description has been made by way of the above first and second embodiments regarding a case wherein the control units 5 and 20 and CPU 204 described with reference to FIGS. 1 through 44 are applied as a control unit which, upon detecting continuous displacement of a touch position on the information display screen of the display unit from within a predetermined region on the information display screen in a direction diagonal to two directions following two axes, based on touch detection data generated by the touch position detection unit, predetermined information is displayed on the information display screen of the display unit, the present invention is not restricted to such an arrangement, and other control units of a wide variety of configurations, such as microprocessors, can be applied.

(4-16) Sixteenth Modification

While description has been made by way of the above first and second embodiments regarding a case wherein the dominant hand detecting unit 28 and CPU 204 described with reference to FIGS. 1 through 44 are applied as a dominant hand detecting unit for detecting a dominant hand, the present invention is not restricted to such an arrangement, and other dominant hand detecting units of a wide variety of configurations, such touch panels and touch panel drivers, can be applied.

Note that in the event that a touch panel and touch panel driver are used as the dominant hand detecting unit, an arrangement may be made wherein, at the time of starting up the information processing device, the user performs a diagonal first-direction sliding operation with the hand holding the main unit, whereby the direction of motion of the thumb is detected, based upon which the dominant hand is detected.

(4-17) Seventeenth Modification

While description has been made by way of the above first and second embodiments regarding a case wherein the determination conditions changing unit 27 and CPU 204 described with reference to FIGS. 1 through 44 are applied as a changing unit for changing the position of a predetermined region within the information display screen of the display unit, and also re-stipulating the first diagonal direction to be used for determining the diagonal first-direction sliding operation, the present invention is not restricted to such an arrangement, and other determination conditions changing units of a wide variety of configurations, such as microprocessors, can be applied.

(4-18) Eighteenth Modification

While description has been made by way of the above first and second embodiments regarding a case wherein the orientation detection unit 26 described with reference to FIGS. 1 through 44 is applied as a orientation detection unit for detecting the holding orientation of the main unit, the present invention is not restricted to such an arrangement, and other orientation detection units of a wide variety of configurations, such as gyro sensors, can be applied.

Note that in the case of applying a gyro sensor as the orientation detection unit, the main unit tends to tilt to the right in the event that the user holds the main unit of the information processing device in the right hand alone, the main unit tends to tilt to the left in the event that the user holds the main unit of the information processing device in the left hand alone, and the main unit is generally horizontal in the event that the user holds the main unit of the information processing device in both hands, so an arrangement may be made wherein the tilt of the main unit is detected by the gyro sensor, and the holding orientation of the main unit is detected based on the detection results.

(4-19) Nineteenth Modification

While description has been made by way of the above first and second embodiments regarding a case wherein the determination conditions changing unit 27 and CPU 204 described with reference to FIGS. 1 through 44 are applied as a changing unit for changing the position of a predetermined region within the information display screen of the display unit, and also re-stipulating the first diagonal direction to be used for determining the diagonal first-direction sliding operation, in accordance with the holding orientation of the main unit detected by the orientation detecting unit, the present invention is not restricted to such an arrangement, and other determination conditions changing units of a wide variety of configurations, such as microprocessors, can be applied.

The present application contains subject matter related to that disclosed in Japanese Priority Patent Application JP 2008-186228 filed in the Japan Patent Office on Jul. 17, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
a housing configured to be held by a user;
a display provided on said housing such that an information display screen is positioned on a front face of said housing, said display configured to display information on said information display screen; and
circuitry configured to:
detect a touch position on said information display screen of said display when the user starts a touch operation on said information display screen;
generate touch position detection data represented in terms of coordinates;
determine whether a displacement distance in a predetermined first diagonal Direction exceeds a predetermined comparative reference displacement distance, wherein the displacement distance is calculated, according to said touch position detection data, between a start position of the touch operation and an end position of the touch operation when the user continually displaces said touch position on said information display screen of said display along a single convex arc from a touch operation start area toward a touch operation end area within a predetermined region on said information display screen;
determine whether a touch operation duration time of being continually displaced along the single convex arc from the touch operation start area toward the touch operation end area exceeds a predetermined comparative reference time; and
display, only when the displacement distance in the predetermined first diagonal direction exceeds the predetermined comparative reference displacement distance and the touch operation duration time exceeds the predetermined comparative reference time, predetermined information on said information display screen according to said touch position detection data generated by said circuitry, wherein
the predetermined region on said information display screen corresponds to a sweepable range of the user.

2. The information processing device according to claim 1, wherein when the displacement distance in the predetermined first diagonal direction exceeds the predetermined comparative reference displacement distance and the touch operation duration time exceeds the predetermined comparative reference time, said circuitry displays display indicators indicating items of a processing menu as said predetermined information on said predetermined region on said information display screen, and
when the displacement distance in the predetermined first diagonal direction fails to exceed the predetermined comparative reference displacement distance and the touch operation duration time fails to exceed the predetermined comparative reference time, said circuitry determines said touch position to be a position of another touch operation including a tap operation and a long hold operation.

3. The information processing device according to claim 2, wherein when the displacement distance in the predetermined first diagonal direction exceeds the predetermined comparative reference displacement distance and the touch operation duration time exceeds the predetermined comparative reference time, said circuitry displays the display indicators so as to be moved in said first diagonal direction from the side of said predetermined region on said information display screen of said display.

4. The information processing device according to claim 3, wherein
when the displacement distance in the predetermined first diagonal direction exceeds the predetermined comparative reference displacement distance and the touch operation duration time exceeds the predetermined comparative reference time, said circuitry detects whether or not said touch position is being displaced in said first diagonal direction from within said predetermined region at the edge of said information display screen at a comparative reference speed or faster,
when said touch position is being displaced in said first diagonal direction from within said predetermined region at the edge of said information display screen at a comparative reference speed or faster, said circuitry displays said display indicators being moved in said first diagonal direction from within said predetermined region at a final display position, and
when said touch position is being displaced in said first diagonal direction from within said predetermined region at the edge of said information display screen at a comparative reference speed or faster, said circuitry displays said display indicators so as to be moved in said first diagonal direction from within said predetermined region at a speed following that of the displacement of said touch position.

5. The information processing device according to claim 4, wherein
when the displacement distance in the predetermined first diagonal direction exceeds the predetermined comparative reference displacement distance and the touch operation duration time exceeds the predetermined comparative reference time, said circuitry detects that said touch position is being displaced in said first diagonal direction from within said predetermined region at the edge of said information display screen and accordingly displaying said display indicators at said final display position, and
wherein said circuitry determines whether a second displacement distance in a predetermined second diagonal direction opposite to said first diagonal direction exceeds predetermined comparative reference displacement distance, wherein the second displacement distance is calculated, according to said touch position detection data, between a start position of the touch operation and an end position of the touch operation when the user continually displaces said touch position on said information display screen of said display along a single convex arc from the touch operation end area toward the touch operation start area within the predetermined region on said information display screen, and
said circuitry determines whether a second touch operation duration time of being continually displaced along the single convex arc from the touch operation end area toward the touch operation start area in said predetermined second diagonal direction exceeds the predetermined comparative reference time, and when the second displacement distance in the predetermined second diagonal direction exceeds the predetermined comparative reference displacement distance and the second touch operation duration time exceeds the predetermined comparative reference time, said circuitry moves said display indicators at said final display position within said information display screen of said display, to said predetermined region side of said information display screen so as to be removed.

6. The information processing device according to claim 2, wherein when the displacement distance in the predetermined first diagonal direction exceeds the predetermined comparative reference displacement distance and the touch operation duration time exceeds the predetermined comparative reference time, said circuitry displays one or a plurality of said display indicators on the course of displacement of said touch position on said information display screen of said display.

7. The information processing device according to claim 6, herein when the displacement distance in the predetermined first diagonal direction exceeds the predetermined comparative reference displacement distance and the touch operation duration time exceeds the predetermined comparative reference time, said circuitry displays one or a plurality of said display indicators on said information display screen of said display, at a size corresponding to the length of the course of displacement of said touch position.

8. The information processing device according to claim 2, wherein when the displacement distance in the predetermined first diagonal direction exceeds the predetermined comparative reference displacement distance and the touch operation duration time exceeds the predetermined comparative reference time, said circuitry displays one or a plurality of said display indicators within a fan-shaped region specified by the course of displacement of said touch position said information display screen of said display.

9. The information processing device according to claim 8, wherein when the displacement distance in the predetermined first diagonal direction exceeds the predetermined comparative reference displacement distance and the touch operation duration time exceeds the predetermined comparative reference time, said circuitry displays one or a plurality of said display indicators on said information display screen of said display, at a size corresponding to the area of a display region.

10. The information processing device according to claim 2, wherein when said housing is being held by a hand of the user in such a state that the portion of a palm of the hand that is at the base of a thumb of the user is pressed against one side face of the housing and the palm of the hand cradles the back face of the housing such that fingers other than the thumb of the user are pressed against the other side face of the housing, when said touch position is determined to be continually displaced along said single convex arc from within said predetermined region provided in a corner of said information display screen of said display at the side where the little finger of said hand holding said housing is situated, which is said edge thereof, said circuitry displays said display indicators on said information display screen of said display.

11. The information processing device according to claim 1, wherein when the displacement distance in the predetermined first diagonal direction exceeds the predetermined comparative reference displacement distance and the touch operation duration time exceeds the predetermined comparative reference time, while sequentially switching and displaying a plurality of information generated hierarchically on said information display screen of said display, said circuitry displays, on said information display screen of said display, said predetermined information corresponding to a hierarchical level of said information displayed on said information display screen of said display at the time of said detection.

12. The information processing device according to claim 11, wherein when the circuitry temporarily detects that said touch position within said predetermined region on said information display screen of said display, said circuitry executes processing corresponding to temporary detection of said touch position within said predetermined region.

13. The information processing device according to claim 12, wherein when the circuitry temporarily detects that said touch position within said predetermined region on said information display screen of said display, said circuitry displays, instead of said predetermined information displayed on said information display screen of said display at the time of temporarily detecting said touch position within said predetermined region, information of a higher hierarchical level than that of said predetermined information.

14. The information processing device according to claim 1, wherein the circuitry is further configured to:
detect a dominant hand;
change the position of said predetermined region within said information display screen of said display, in accordance with said dominant hand detected by said circuitry; and
re-stipulate said first diagonal direction.

15. The information processing device according to claim 1, wherein the circuitry is further configured to:
detect a holding orientation of said housing;
change the position of said predetermined region within said information display screen of said display, in accordance with said holding orientation detected by said circuitry; and
re-stipululate said first diagonal direction.

16. The information processing device according to claim 1, wherein the circuitry is configured to display the predetermined information on said information display screen of said display, based on a detection that said touch position on said information display screen of said display is being continually displaced along said single convex arc, a display orientation of the information display screen, and a speed of the continual displacement along said single convex arc.

17. The information processing device according to claim 1, wherein
the entire concave side of the single convex arc faces one lower corner of the display,
the single convex arc starts from a first edge of the display and ends at a second edge of the display that is perpendicular to the first edge, and
the predetermined first diagonal direction is the only one of the two directions that causes the predetermined information to be displayed.

18. An information processing met of an information processing device, the information processing method comprising:
detecting a touch position on a display provided on a housing configured to be held by a user such that an information display screen is positioned on a front face of said housing when the user starts a touch operation on said information display screen;
generating touch position detection data represented in terms of coordinates;
determining, by circuitry of the information processing device, whether a displacement distance in a predetermined first diagonal direction exceeds a predetermined comparative reference displacement distance, wherein the displacement distance is calculated, according to said touch position detection data, between a start position of the touch operation and an end position of the touch operation when the user continually displaces said touch position on said information display screen of said display along a single convex arc from a touch operation start area toward a touch operation end area within a predetermined region on said information display screen;

determine, by the circuitry, whether a touch operation duration time of being continually displaced along the single convex arc from the touch operation start area toward the touch operation end area exceeds a predetermined comparative reference time; and displaying, by the circuitry only when the displacement distance in the predetermined first diagonal direction exceeds the predetermined comparative reference displacement distance and the touch operation duration time exceeds the predetermined comparative reference time, predetermined information on said information display screen according to said generated touch position detection data, wherein the predetermined region on said information display screen corresponds to a sweepable range of the user.

19. The method according to claim 18, wherein the entire concave side of the single convex arc faces one lower corner of the display, the single convex arc starts from a first edge of the display and ends at a second edge of the display that is perpendicular to the first edge, and the predetermined first diagonal direction is the only one of the two directions that causes the predetermined information to be displayed.

20. A non-transitory computer-readable storage medium storing executable instructions which, when executed by circuitry of an information processing device, causes the information processing device to:

detect a touch position on a display provided on a housing configured to be held by a user such that an information display screen is positioned on a front face of said housing when the user starts a touch operation on said information display screen;

generate touch position detection data represented in terms of coordinates;

determine whether a displacement distance in a predetermined first diagonal direction exceeds a predetermined comparative reference displacement distance, wherein the displacement distance is calculated, according to said touch position detection data, between a start position of the touch operation and an end position of the touch operation when the user continually displaces said touch position on said information display screen of said display along a single convex arc from a touch operation start area toward a touch operation end area within a predetermined region on said information display screen;

determine whether a touch operation duration time of being continually displaced along the single convex arc from the touch operation start area toward the touch operation end area exceeds a predetermined comparative reference time; and display, only when the displacement distance in the predetermined first diagonal direction exceeds the predetermined comparative reference displacement distance and the touch operation duration time exceeds the predetermined comparative reference time, predetermined information on said information display screen according to said generated touch position detection data, wherein the predetermined region on said information display screen corresponds to a sweepable range of the user.

\* \* \* \* \*